(12) United States Patent
Kats et al.

(10) Patent No.: US 9,319,279 B2
(45) Date of Patent: *Apr. 19, 2016

(54) TOPOGRAPHICAL DISPLAY GENERATOR FOR AD HOC NETWORK

(71) Applicant: Intech 21, Inc., Port Washington, NY (US)

(72) Inventors: Marat Kats, Rockaway Beach, NY (US); Igor Tchibirev, Sea Cliff, NY (US); Victor Zelmanovich, Deer Park, NY (US); George Bilenko, Stamford, CT (US); Helena Zelmanovich, Deer Park, NY (US)

(73) Assignee: Intech 21, Inc., Port Washington, NY (US)

( * ) Notice: Subject to any disclaimer, the term of this patent is extended or adjusted under 35 U.S.C. 154(b) by 265 days.

This patent is subject to a terminal disclaimer.

(21) Appl. No.: 14/065,160

(22) Filed: Oct. 28, 2013

(65) Prior Publication Data

US 2014/0119236 A1  May 1, 2014

Related U.S. Application Data

(63) Continuation of application No. 12/595,995, filed as application No. PCT/US2008/062119 on Apr. 30, 2008, now Pat. No. 8,621,360.

(60) Provisional application No. 60/914,938, filed on Apr. 30, 2007.

(51) Int. Cl.
*G06F 3/00* (2006.01)
*H04L 12/24* (2006.01)
(Continued)

(52) U.S. Cl.
CPC ............... *H04L 41/12* (2013.01); *H04W 16/18* (2013.01); *G06F 11/2257* (2013.01); *G06F 11/3006* (2013.01)

(58) Field of Classification Search
CPC combination set(s) only.
See application file for complete search history.

(56) References Cited

U.S. PATENT DOCUMENTS 5,768,552 A * 6/1998 Jacoby ................. G06T 11/206
 345/418
5,910,803 A * 6/1999 Grau ....................... H04L 41/12
 709/224

(Continued)

OTHER PUBLICATIONS

Becker et al.; Graphical Methods to analyze Network Data; © 1993; IEEE; 6 pages.*

(Continued)

*Primary Examiner* — Linh K Pham
(74) *Attorney, Agent, or Firm* — Brad M. Behar & Associates, PLLC

(57) ABSTRACT

The present invention comprises a computer apparatus for displaying the topology of a timely organized ad hoc network, the apparatus including a processor, a memory, a computer-readable medium, an input device coupled to the processor, a radio frequency transceiver coupled to the processor; a communications interface coupled to the memory, a display coupled to the processor, and software copied from the computer-readable medium into the memory by the processor that, when executed, causes the processor to obtain a diagram of the network location from the input device or computer readable medium, obtain the identities of the devices comprising the network from the input device or computer readable medium, determine the communication links between the network devices, and graphically represent on the display the devices and the connection links on the diagram.

10 Claims, 48 Drawing Sheets

(51) Int. Cl.
*H04W 16/18* (2009.01)
*G06F 11/22* (2006.01)
*G06F 11/30* (2006.01)

(56) References Cited

U.S. PATENT DOCUMENTS

| | | | | |
|---|---|---|---|---|
| 6,377,987 | B1* | 4/2002 | Kracht | H04L 41/0213 370/254 |
| 7,315,985 | B1* | 1/2008 | Gauvin | H04L 41/12 715/734 |
| 2001/0042118 | A1* | 11/2001 | Miyake | H04L 41/22 709/223 |
| 2002/0165934 | A1 | 11/2002 | Conrad et al. | |
| 2003/0033470 | A1 | 2/2003 | Saito et al. | |
| 2003/0103077 | A1 | 6/2003 | Despotidis et al. | |
| 2004/0172466 | A1 | 9/2004 | Douglas et al. | |
| 2004/0203889 | A1* | 10/2004 | Karaoguz | H04L 29/06 455/456.1 |
| 2005/0226195 | A1* | 10/2005 | Paris | H04L 1/16 370/338 |
| 2006/0168207 | A1* | 7/2006 | Choong | H04L 41/12 709/224 |
| 2007/0018984 | A1* | 1/2007 | Sauvageau | G06T 11/206 345/440 |
| 2007/0097883 | A1* | 5/2007 | Liu | H04L 41/12 370/254 |
| 2007/0161371 | A1* | 7/2007 | Dobrowski | H04L 41/00 455/423 |
| 2007/0204231 | A1* | 8/2007 | Cunningham | H04L 41/22 715/734 |
| 2008/0101258 | A1* | 5/2008 | Cheng | H04L 12/66 370/254 |
| 2008/0101330 | A1* | 5/2008 | Cheng | H04W 24/02 370/350 |
| 2008/0229370 | A1 | 9/2008 | Zustak et al. | |
| 2009/0031222 | A1* | 1/2009 | Nakamura | G06F 17/509 715/735 |
| 2009/0245138 | A1* | 10/2009 | Sapsford | G06F 17/30961 370/254 |
| 2009/0327903 | A1* | 12/2009 | Smith | H04L 12/2697 715/737 |
| 2010/0058188 | A1* | 3/2010 | Shah | G06F 9/44505 715/734 |
| 2012/0172056 | A1* | 7/2012 | Karaoguz | H04L 29/06 455/456.1 |

OTHER PUBLICATIONS

Marsan et al.; TOPNET: A Tool for the Visual Simulation of Communication Networks; © 1990; IEEE; 13 pages.*
Becker, Richard A. et al.; Graphical Methods to analyze Network Data; © 1993; IEEE; 6 pages.
Marsan, M. Ajmone et al.; TOPNET: A Tool for the Visual Stimulation of Communication Networks; © 1990; IEEE; 13 pages.
Pham, Linh K, Office Action for U.S. Appl. No. 12/595,995, filed Jun. 21, 2012, 7 pages.
Pham, Linh K, Office Action for U.S. Appl. No. 12/595,995, field Jan. 4, 2013, 19 pages.

* cited by examiner

TOPOGRAPHICAL DISPLAY GENERATOR FOR AD HOC NETWORK

CROSS REFERENCE TO RELATED APPLICATION

This application is a continuation of, and claims the benefit of U.S. application Ser. No. 12/595,995 filed on Oct. 15, 2009, which claims the benefit of PCT/US2008/062119 filed on Apr. 30, 2008, which claims the benefit of U.S. Application Ser. No. 60/914,938 filed on Apr. 30, 2007, each which is expressly incorporated herein in its entirety by reference thereto.

FIELD OF THE INVENTION

The present invention relates to computer networks, and in particular a graphical user interface tool for troubleshooting wireless computer networks and network protocols.

BACKGROUND OF THE INVENTION

In certain locations, such as residential, commercial and industrial buildings, etc., it may be desirous to monitor, control and/or collect information (e.g., node information) generated by one or more sensors and/or measuring or control devices distributed throughout the location. Previous inventions have disclosed network nodes operable to wirelessly transmit and receive its respective network node information to and from a centralized location.

However, it is believed that such a system is difficult to implement, considering low power transmission requirements and possibly disadvantageous environmental conditions, if at least one of the network nodes is blocked, for example, by an obstacle, ambient noise, interference, etc., from transmitting or receiving its related node information.

U.S. Pat. Nos. 6,850,511 and 7,002,944, hereby incorporated by reference herein, teach a timely organized wireless ad hoc network or networks to overcome these shortcomings. But, each network node in the plurality of network nodes is assigned only one time slot during the time-slotted communications interval. Such a network does not provide for the network node to report more information than can fit within an assigned time slot and does not provide advantageous error handling.

Traditional networks are static, i.e., the relationship between various nodes are established when the network is designed and rarely changes thereafter. However, in an ad hoc network, such as Intech 21's wireless ad hoc network, communications paths between nodes are often dynamic. A network administrator may wish to monitor and troubleshoot such networks.

Thus, there is a need to automatically generate diagrams illustrating in a topographical fashion the relationship between various nodes in such timely organized ad hoc networks.

BRIEF SUMMARY OF THE INVENTION

The present invention comprises a topographical display generator for ad hoc network.

In one aspect, the present invention is directed to a computer apparatus comprising a processor, a memory, a computer-readable medium, an input device coupled to the processor, a radio frequency transceiver coupled to the processor; a communications interface coupled to the memory, a display coupled to the processor, and software copied from the computer-readable medium into the memory by the processor that, when executed, causes the processor to obtain a diagram of the network location from the input device or computer readable medium, obtain the identities of the devices comprising the network from the input device or computer readable medium, determine the communication links between the network devices, and graphically represent on the display the devices and the connection links on the diagram.

BRIEF DESCRIPTION OF THE DRAWINGS

For the purposes of illustrating the present invention, there is shown in the drawings a form which is presently preferred, it being understood however, that the invention is not limited to the precise form shown by the drawing in which.

DETAILED DESCRIPTION OF THE INVENTION

Figure 1:
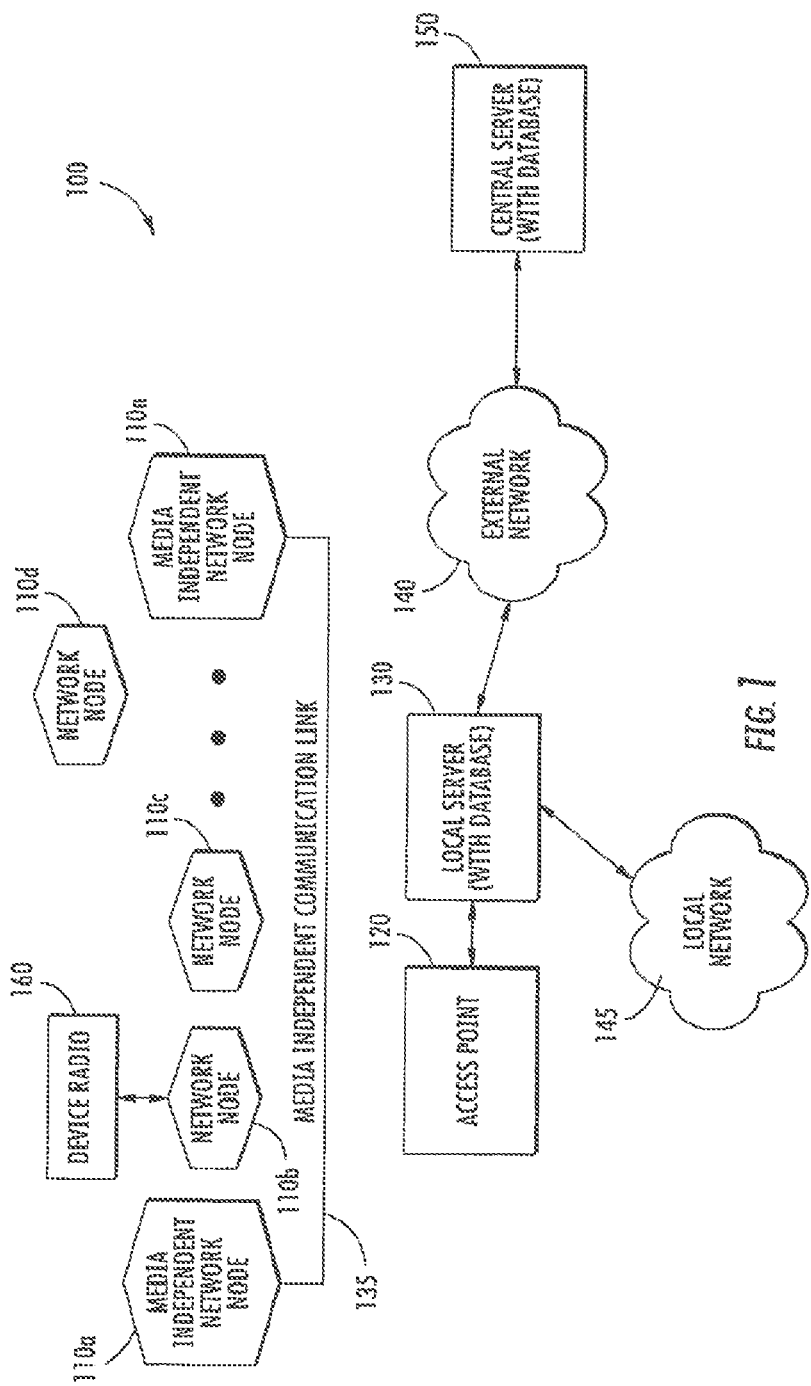
FIG. 1 is a block diagram of a first exemplary ad hoc wireless network according to the present invention.

Referring to FIG. 1, there is seen a first exemplary ad hoc wireless network 100 according to the present invention. Wireless network 100 includes a plurality of network nodes 110a, 110b, 110c, . . . , 110n, some which are media independent network nodes (110a and 110n), at least one access point 120, a local server (with database) 130 communicatively coupled to the access point 120, media independent communication link 135 communicatively coupling media independent network nodes, an internal network 145 and an external network 140 communicatively coupled to the local server (with database) 130, a device radio 160 communicatively coupled to at least one of the network nodes 110a, 110b, 110c, . . . , 110n, and a central server (with database) 150 communicatively coupled to the external network 140. Wireless ad hoc network 100 may be used, for example, to communicate node information within or outside a structure, such as an apartment building, a house, an office building, a residential building, a commercial building, an industrial building, etc.

The local server (with database) 130 includes a workstation, which executes specific software algorithms for monitoring and controlling devices connected to at least one of the network nodes 110a, 110b, 110c, . . . , 110n or to the device radio 160. The local server (with database) 130 collects and stores information and presents the information to a user connected to the same local network 145, for example, an Intranet.

The at least one access point 120 is the final destination of node information transmitted by one or more of the network nodes 110a, 110b, 110c, . . . , 110n. The node information may be received from or transmitted to one or more sensors, measuring and control devices (not shown), and may include, for example, the temperature of a room, lighting conditions of a room, energy usage, smoke and CO detector data, elevator(s) conditions, door activation data, heating ventilation and air conditioning (HVAC) system parameters and controls, pressure data, vibration data, etc.

The device radio 160 functions similarly to at least one of the network nodes 110a, 110b, 110c, . . . , 110n, except that the device radio 160 is battery powered and does not participate in network routing. For this purpose, the device radio 160 is configured to communicate with at least one network node during the random access time interval (or specially assigned time interval), after which the device radio may, for example, enter a "sleep mode" to conserve energy.

The central server (with database) 150 is responsible for collecting information from at least one local server, as well as from at least one database. The central server (with database) 150 is also configured to monitor and control the one or more sensors and/or measuring devices (not shown) connected to the network nodes 110a, 110b, 110c, . . . , 110n and/or to the device radio 160. The central server (with database) 150 may also be communicatively coupled to other computers, for example, via an Internet connection. In this manner, the central server (with database) 150 is operable to provide services to users wishing to control the ad hoc wireless network 100 from at least one remote location.

The external network 140 may include, for example, a wide area network (WAN), a local area network (LAN), an Intranet, the Internet, etc. The external network 140 communicatively couples the local server (with database) 130 with the central server (with database) 150. In this manner, the external network 140 permits the local server (with database) 130 and the central server (with database) 150 to communicate across relatively large distances.

The local server (with database) 130 is configured to provide information concerning the layout of the physical site, within which the ad hoc wireless network is implemented. The local server (with database) 130 is also configured to update newly added sensors and/or measuring devices (not shown) connected to the ad hoc network. The central server (with database) 150 may, for example, provide software updates, new administration information, new software parameters, etc., to the local server (with database) 130.

When wirelessly transmitting node information to the access point 120, each of the network nodes 110a, 110b, 110c, . . . , 110n may utilize any radio communication method suitable for multiple access communications, such as spread spectrum, Frequency Division Multiple Access, and/or Time Division Multiple Access (TDMA).

A spread spectrum communication method, which may include Direct Sequence Spread Spectrum (DSSS) or Frequency Hoping Spread Spectrum (FHSS), "spreads" a transmitted signal across a frequency bandwidth much greater than that necessary to send the original signal. For this purpose, the signal may be spread using a pseudorandom code independent of the signal. This may result in many benefits, such as immunity to interference and jamming. After transmission, a spread spectrum receiver synchronizes to the spread spectrum signal (i.e., acquires the spread spectrum signal) and de-spreads the data. The use of independent respective pseudorandom codes allows multiple users, for example, the network nodes 110a, 110b, 110c, . . . , 110n, to simultaneously transmit in the same frequency band.

FDMA is yet another radio communication method that permits multiple access communications. In FDMA, each of the multiple users, for example, the network nodes 110a, 110b, 110c, . . . , 110n, is assigned a unique frequency bandwidth, within which it may transmit its node information. The mutual exclusivity of each of the unique frequency bandwidths permits each of the multiple users, for example, the network nodes 110a, 110b, 110c, . . . , 110n, to transmit its respective node information at the same time without interference.

TDMA is still another radio communication method that permits multiple access communications. In TDMA, each of multiple users, for example, the network nodes 110a, 110b, 110c, . . . , 110n, is assigned a specific time slot, during which it may transmit its node information. In this manner, TDMA permits the users to access the same frequency bandwidth at different times. As discussed below, any radio communications method that permits timely organized radio communication may be used. In this manner, it is believed that a timely organized radio communication method, introduces order into an otherwise random transmission multi-node ad hoc wireless network. In this manner, a timely organized radio communication method, may allow for a robust, self-building, self-routing, dynamic ad hoc network architecture, which is easily expandable.

In the various exemplary ad hoc networks according to the present invention described below, a timely organized radio communication method is utilized. However, persons having ordinary skill in the art will recognize that the present invention is independent of any modulation schemes, such as phase modulation schemes, frequency modulation schemes, amplitude modulation schemes, pulse modulation schemes and/or any combination of these modulation schemes. Furthermore, although the timely organized radio communication method described below utilizes a single frequency band, persons having ordinary skill in the art will recognize that the present invention may simultaneously utilize different frequency bands to increase the number of network nodes 110a, 110b, 110c, . . . , 110n and/or the amount of information capable of being transmitted through the network.

Figure 2:
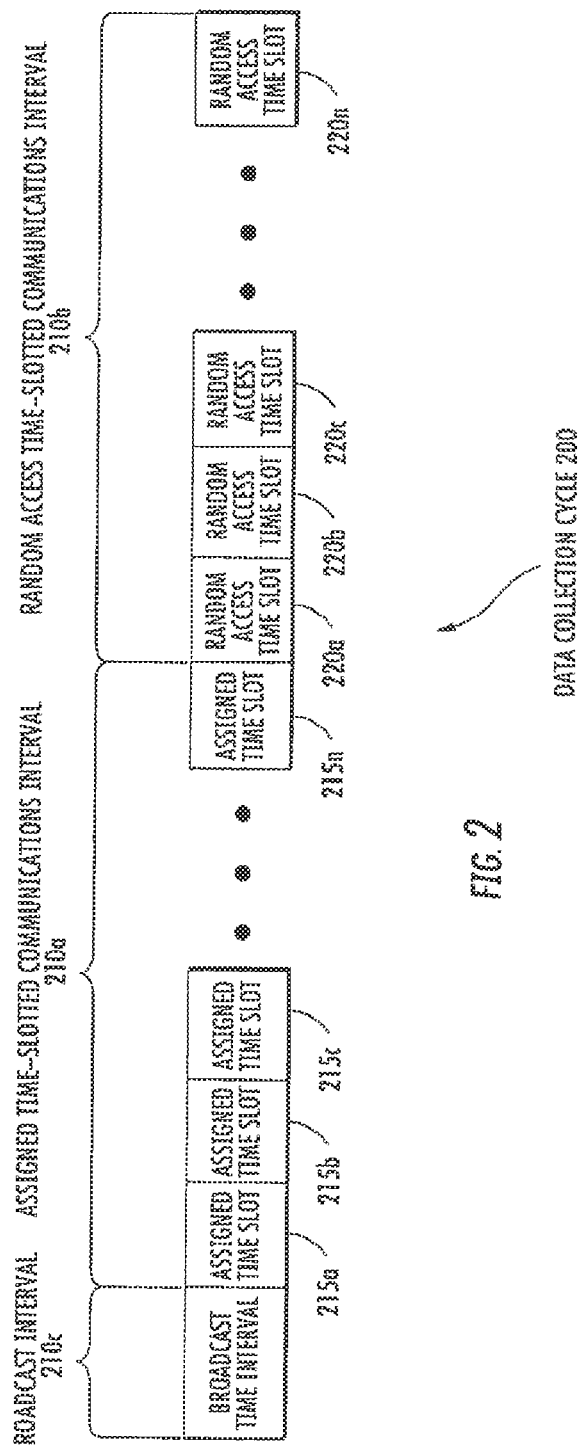
FIG. 2 is a diagram of an exemplary data collection cycle according to the present invention.

Referring now to FIG. 2, there is seen an exemplary timely organized data collection cycle 200 according to the present invention, data collection cycle 200 being indefinitely repetitive. Data collection cycle 200 is divided into a broadcast interval 210c, an assigned time-slotted communications interval 210a, and a random access time-slotted communications interval 210b. The assigned time-slotted communication interval 210a includes a plurality of assignable time slots 215a, 215b, 215c, . . . , 215n, and the random access time-slotted communication interval 210b includes a plurality of random access time slots 220a, 220b, 220c, . . . , 220n.

At any given time, each of the network nodes 110a, 110b, 110c, . . . , 110n, is either assigned to one of the assignable time slots 215a, 215b, 215c, . . . , 215n or assigned to none of the assignable time slots 215a, 215b, 215c, . . . , 215n. If a network node, for example, network node 110a, is not assigned to one of time slots 215a, 215b, 215c, . . . , 215n, that node transmits node information during one of the random access time slots 220a, 220b, 220c, . . . , 220n of the random access time-slotted communication interval 210b, until the network node receives information from the access point 120 that permits it to determine which of time slots 215a, 215b, 215c, . . . , 215n to transmit node information in.

After determining the assignable time slot 215a, 215b, 215c, . . . , 215n within which to transmit, the network node, for example, network node 110a, stops transmitting during the random access time-slotted communication interval 210b and begins transmitting during its newly assigned time slot 215a, 215b, 215c, . . . , 215n of the assigned time-slotted communication interval 210a.

Figure 3A:
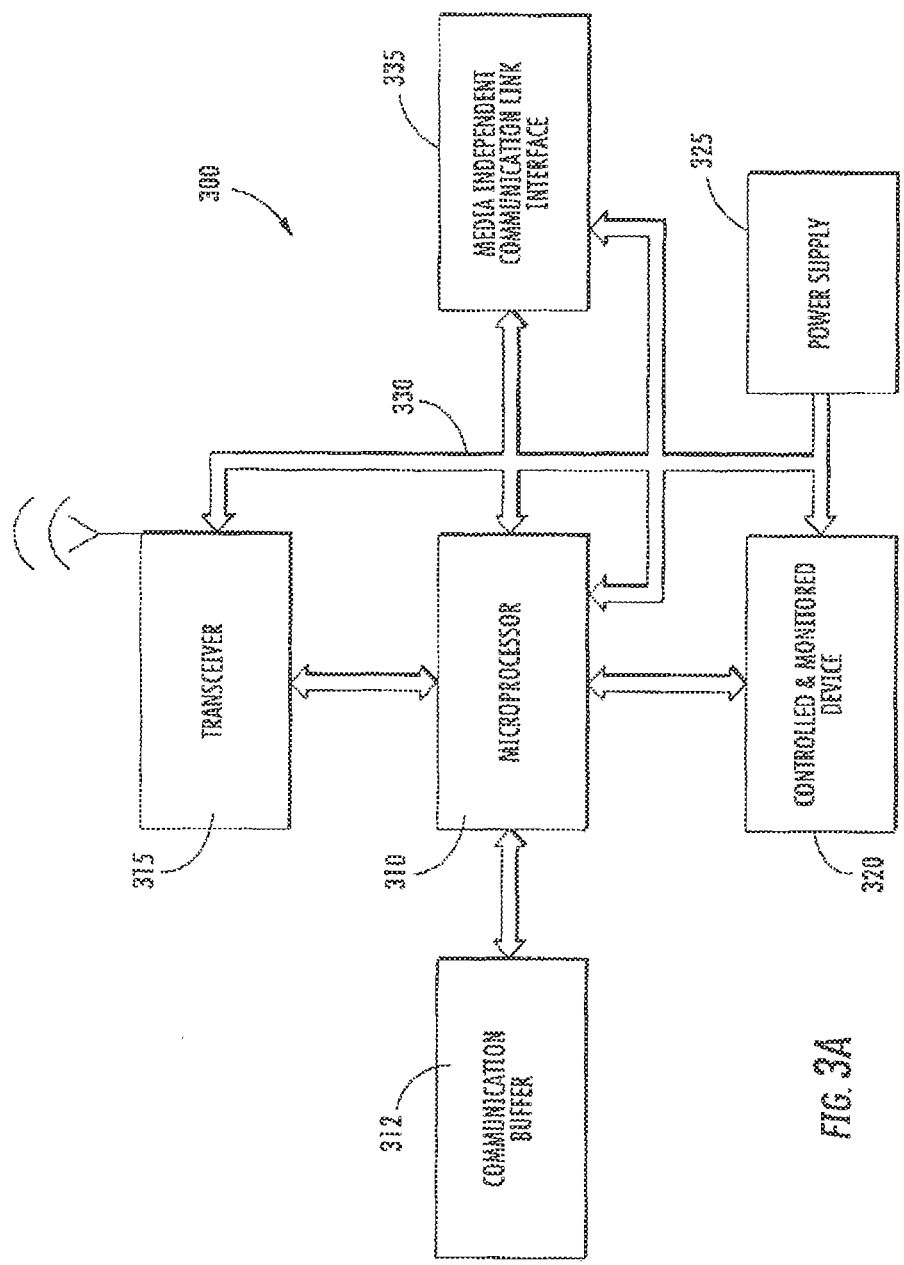
FIG. 3a is a block diagram of an exemplary network node having an optional media-independent communication link interface according to the present invention.

Referring now to FIG. 3a, there is seen a block diagram of an exemplary network node (NN) 300 according to the present invention. Network node 300 includes a microprocessor 310, a transceiver 315 communicatively coupled to the microprocessor 310, a device 320 also communicatively coupled to the microprocessor 310, a communication buffer 312, and a power supply 325 for providing power to each of the microprocessor 310, the transceiver 315, the communication buffer 312, and the device 320 via power bus 330. The device 320 may be, for example, a sensor, a measuring and/or controlling device, or an interface. Network Node 300 could include an optional media independent communication interface 335. When the optional media independent communication interface is connected to a media independent communication link the network node 300 will be a media independent network node (MINN) 300, as illustrated in FIGS. 1, 100a and 100n. All wirelessly transmitted messages from MINN 300 will appear on the media independent communication link.

Figure 3B:
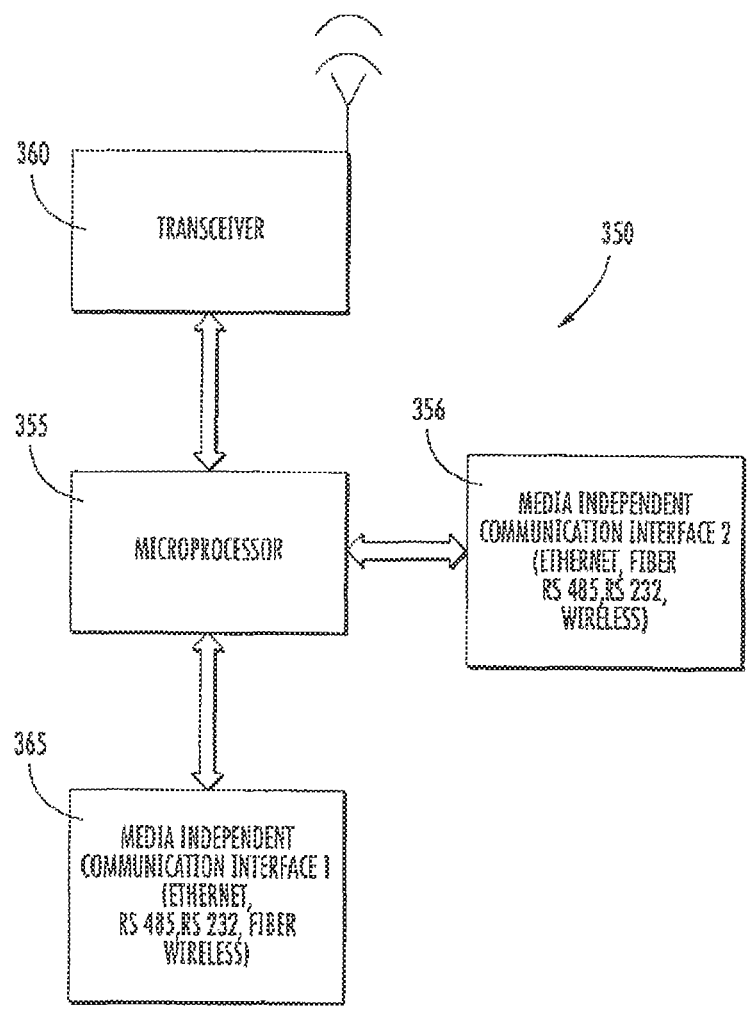
FIG. 3b is a block diagram of an exemplary access point according to the present invention with an optional second media independent communication link.

Referring now to FIG. 3b, there is seen a block diagram of an exemplary access point 350 according to the present invention. Access point 350 includes a microprocessor 355, a transceiver 360 communicatively coupled to the microprocessor 355, a primary media independent communications interface-1 (for access points and/or local server) 365 and a secondary media independent communications interface-2 (for the MINN's) 336, communicatively coupled to the microprocessor 355.

The access point 350 operates as a communication interface to the radio transceiver 360, the local server (with database) 130 and to other access points (not shown), using independent communication processes. For this purpose, the access point 350 may be provided, for example, with a communication buffer (not shown). It is believed to be advantageous to provide large area installations with a plurality of distributed access points, each of which is communicatively coupled to the same communication line or network. In this manner, each of the access points operates independently, i.e., with no master-slave relationships.

In operation, each of the network nodes 110a, 110b, 110c, . . . , 110n is operable to wirelessly communicate its respective node information to the access point 120 via its respective transceiver 315. In this manner, each of the network nodes 110a, 110b, 110c, . . . , 110n operates as a source of information to be transmitted. A source network node transmits its respective node information only during its assigned time slot 215a, 215b, 215c, . . . , 215n, or during one of the random access time slots 220a, 220b, 220c, . . . , 220n if the none of the time slots 215a, 215b, 215c, . . . , 215n are assigned to the source network node.

Additionally, each of the network nodes 110a, 110b, 110c, . . . , 110n is operable to repackage and retransmit node information transmitted by at least one neighboring network node 110a, 110b, 110c, . . . , 110n. This "retransmission" may be required, for example, if a neighboring network node 110a, 110b, 110c, . . . , 110n is prevented from directly transmitting its node information to the access point 120, for example, due to obstacles, interference, noise, jamming, power limitations, propagation losses, etc. In this case, a "transmission chain" is utilized, in which a "chain" of network nodes 110a, 110b, 110c, . . . , 110n serially retransmits the node information originally transmitted by a source network node (i.e., the network nodes that originates the node information). In this manner, the node information has a higher probability of reaching the access point 120. A network node retransmitting information during a "chain transmission" (intervening transmission), does so during the time slot 215a, 215b, 215c, . . . , 215d assigned to the source network node, or during one of the random access time slots 220a, 220b, 220c, . . . , 220n (which is chosen by the source network node itself) if none of the time slots 215a, 215b, 215c, . . . , 215n are assigned to the source network node.

Each of the network nodes 110a, 110b, 110c, . . . , 110n dynamically assigns itself a hierarchal level based on information (e.g., data packets) received from other network nodes 110a, 110b, 110c, . . . , 110n. The hierarchal level is self-assigned in accordance with the shortest path to the access point 120. That is, the hierarchal level depends on the number of intervening transmissions to other network nodes 110a, 110b, 110c, . . . , 110n required to ensure that the original transmission (i.e., node information) reaches the access point 120. Thus, if a network node, for example, network node 110a, is capable of transmitting its node information to the access point directly, without an intervening transmission to another network node, it will self-assign a hierarchal level that is different (e.g., lower) than the hierarchal level of another network node that must initiate at least one intervening transmission to a neighboring network node to ensure that its node information reaches the access point 120.

In one exemplary embodiment according to the present invention, the access point is assigned a hierarchal level of, for example, "1", and each of the network nodes 110a, 110b, 110c, ..., 110n assigns itself a hierarchal level, for example, equal to the incremented minimum hierarchal level of the neighboring (e.g., intervening) network nodes it is capable of directly communicating with. For this purpose, each of the network nodes 110a, 110b, 110c, ..., 110n transmits data packets including that node's hierarchal level, as well as an ID value that uniquely identifies the transmitting network node. These transmitted data packets may be received by neighboring network nodes 110a, 110b, 110c, ..., 110n, each of which stores the transmitted hierarchal level and the transmitting network node's ID value in a Last In First Out (LIFO) memory buffer, so that the ID and hierarchal level of the neighboring network node with the lowest hierarchal level is kept at the top of the LIFO stack. In this manner, when a particular one of the network nodes 110a, 110b, 110c, ..., 110n transmits node information (e.g., data packets), the node information is addressed and sent to the network node and/or the access point 120 at the top of the stack (or to the network node addressed by a PARENT_ID, as more fully described below).

Figure 4:
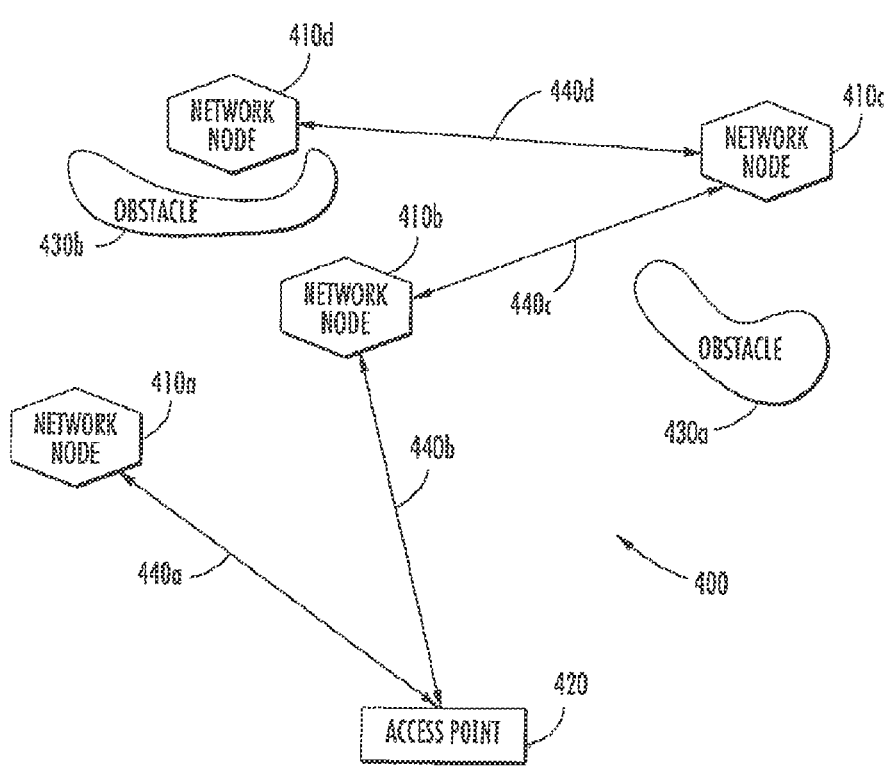
FIG. 4 is a block diagram of a second exemplary ad hoc wireless network according to the present invention.

Referring now to FIG. 4, there is seen an exemplary ad hoc network 400 according to the present invention, in which network nodes have self-assigned hierarchal levels. Add hoc network 400 includes access point 420 and network nodes 410a, 410b, 410c, 410d. The network 400 also includes transmission paths 440a, 440b, 440c, 440d, as well as obstacles 430a, 430b, which block direct transmission from network nodes 410c and 410d, respectively. In this exemplary embodiment, the access point 420 is fixedly assigned a hierarchal level of "1", and network nodes 410a, 410b each assign themselves a hierarchal level of "2", since each of these nodes 410a, 410b is capable of transmitting node information directly to the access point 420 via transmission paths 440a, 440b, respectively.

Network node 410c is not capable of transmitting its node information directly to the access point 420, due to obstacle 430a. Thus, network node 410c must engage in a "chain transmission." That is, network node 410c must engage in at least one intervening transmission to network node 410b to ensure that its node information reaches the access point 420. For this purpose, network node 410c transmits its node information directly to network node 410b via transmission path 440c, after which network node 410b repackages and retransmits the node information directly to the access point 420 via transmission path 440b. Since network node 410c must initiate one intervening transmission to network node 410b, the network node 410c assigns itself a hierarchal level of "3".

In similar fashion, obstacle 430b prevents network node 410d from directly transmitting node information to network nodes 410a, 410b and the access point 420. Thus, network node 410d must transmit its node information to network node 410c via transmission path 440d, after which network node 410c repackages and retransmits the node information to network node 410b via transmission path 440c, and then network node 410b repackages and retransmits the node information directly to the access point 420 via transmission path 440b. Since network node 410d must engage in two intervening transmissions to network nodes 410d, 410b, network node 410d assigns itself a hierarchal level of "4".

It should be noted that obstacles 430a, 430b may include any device, object, mechanism, or phenomenon capable of preventing a direct wireless transmission. For example, obstacles 430a, 430b may include a wall, ambient noise, a moving object (such as a person), propagation losses, and/or a jamming device operable to prevent direct wireless transmission.

It should also be noted that, although FIG. 4 shows only four network nodes 410a, 410b, 410c, 410d and one access point 420, the timely organized ad hoc wireless network 400 may include any number of network nodes and any number of access points, for example, one or many network nodes and one access point, five network nodes and three access points, 7100 network nodes and six access points, etc.

It should also be noted that, although FIG. 4 shows each of network nodes 410a, 410b, 410c, 410d self-assigning a hierarchal level that increases with the required number of intervening transmissions, the hierarchal level may be assigned in other ways. For example, each of the network nodes 410a, 410b, 410c, 410d may assign itself a hierarchical level that decreases with the required number of intervening transmissions. Or, alternatively, each of the network nodes 410a, 410b, 410c, 410d may assign itself a hierarchical level having no chronological correlation to the required number of intervening transmissions. Or, alternatively, each of the network nodes 410a, 410b, 410c, 410d may assign itself a hierarchical level in accordance with a suitably designed algorithm that depends on the number of intervening transmissions to neighboring network nodes required to ensure that node information reaches the access point 420.

Figure 5:
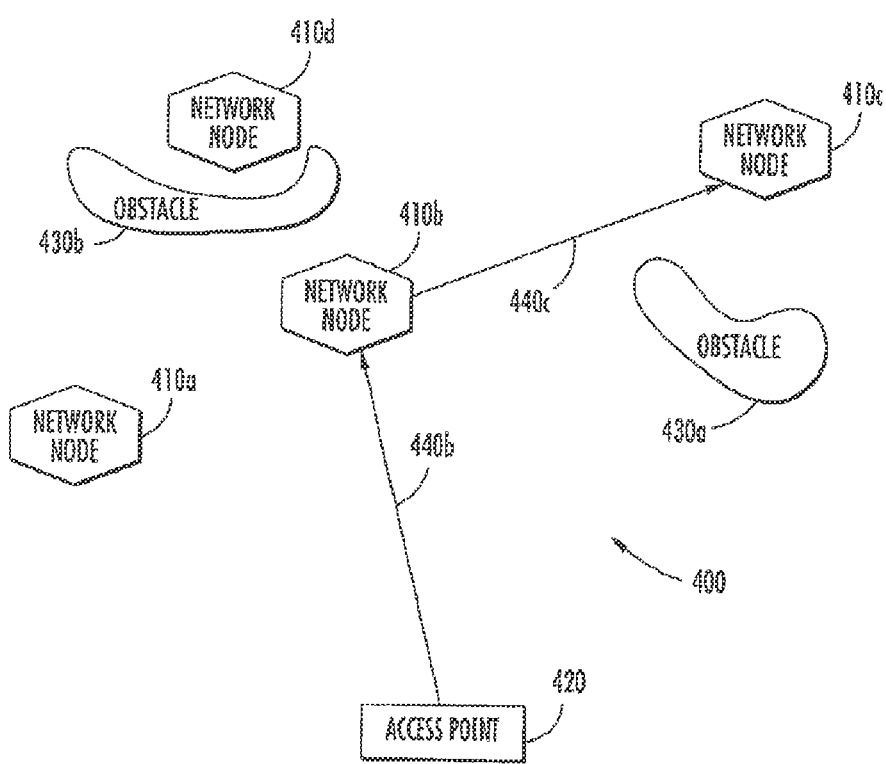
FIG. 5 is a block diagram of the second exemplary ad hoc wireless network of FIG. 4, in which an access point transmits acknowledgment and/or command information to a network node.

Referring now to FIG. 5, there is seen the exemplary ad hoc wireless network 400 shown in FIG. 4, in which the access point 420 transmits acknowledgment and/or command information to network node 410c to acknowledge receipt of node information originally transmitted by source network node 410c and/or give some command to source network node 410c. In this exemplary embodiment, network node 410c is the "source" of node information transmitted during one of its assigned time slot 215a, 215b, 215c, ..., 215n or random access time slots 220a, 220b, 220c, ..., 220n. To ensure that the node information transmitted by network node 410c reaches the access point 420, network node 420b engages in a "chain transmission" by retransmitting the node information to the access point 420. After receiving the node information originated by source network node 410c, the access point 420 transmits acknowledgment and/or command information to source network node 410c via the same transmission path (i.e., the same chain transmission path) used to communicate the node information to the access point 420, except in reverse order. Thus, the access point 420 transmits the acknowledgment and/or command information to network node 410b, after which network node 410b retransmits the acknowledgment and/or command information to source network node 410c.

The communications between the access point 120 and each of the network nodes 110a, 110b, 110c, ..., 110n may be accomplished, for example, using differently formatted data packets, for example, three differently formatted data packets. Below is described an exemplary 3-type data packet communications scheme for communications between the network nodes 110a, 110b, 110c, ..., 110n and the access point 120. Alternatively, other types of data communications schemes may be employed, such as a 2-type data packet scheme, a 5-type data packet scheme, etc, and each of the packets may be transmitted, for example, as a serial stream of smaller packets, if and when the communication channel becomes less reliable.

As stated above, the exemplary timely organized ad hoc wireless network 100 may utilizes a 3-type data packet communications scheme, which may include, for example, a broadcast data packet (BCDP), a network node data packet (NNDP), and a acknowledge/command data packet (CDP).

The BCDP data packet is a data packet transmitted by the access point 120 to all of the network nodes 110a, 110b, 110c, . . . , 110n during the broadcast interval 210c of each data collection cycle 200. To help ensure that all of the network nodes 110a, 110b, 110c, . . . , 110n receive the BCDP data packet, each of the network nodes 110a, 110b, 110c, . . . , 110n, receiving the BCDP subsequently retransmits the BCDP data packet after a randomly calculated delay. In this manner, the BCDP has a higher probability of reaching all the network nodes 110a, 110b, 110c, 110n. The BCDP data packet contains information that permits the network nodes 110a, 110b, 110c, . . . , 110n to synchronize to one another. This "synchronization" may be necessary, for example, in a timely organized time-slotted communication method, since each of the network nodes 110a, 110b, 110c, . . . , 110n must determine its time to transmit information (TTT) with respect to all other network nodes.

The NNDP data packet is a data packet transmitted by one of the network nodes 110a, 110b, 110c, . . . , 110n, the NNDP data packet being ultimately destined for the access point 120. The NNDP data packet contains node information received from one or more sensors, measuring and/or controlling devices (not shown). The node information may include, for example, the temperature of a room, lighting conditions of a room, energy usage, etc. The NNDP data packet is originally transmitted by a source network node and repackaged and retransmitted by at least one neighboring network node, if a "chain transmission" is required to ensure that the NNDP data packet reaches the access point 120. Both the original transmission of the NNDP data packet and any required retransmissions of the NNDP data packet occur during the same time slot used by the source network node to transmit the NNDP data packet (i.e., one of assignable time slots 215a, 215b, 215c, . . . , 215d or random access time slot 220a, 220b, 220c, . . . , 220n). In a timely organized communication method, for example, each of the network nodes 110a, 110b, 110c, . . . , 110n may originally transmit at least one NNDP data packet during its assigned time slot. Depending on its self-assigned hierarchical level, the NNDP may be directly transmitted to the access point 120 or may be transmitted to at least one other network node 110a, 110b, 110c, . . . , 110n, if a chain transmission is required. The NNDP data packet contains the respective node information, as well as auxiliary information used by other network nodes 110a, 110b, 110c, . . . , 110n for routing the node information to the access point 120, if a chain transmission is required. Depending on the type of network node and the amount of data contained within the node information, any of the network nodes 110a, 110b, 110c, . . . , 110n may transmit more than one, for example, five, NNDP data packets during one transmission session, for example, during one assigned time slot 215a, 215b, 215c, . . . , 215n or random access time slots 220a, 220b, 220c, 220n in a timely organized communication method.

The CDP data packet is a data packet transmitted by the access point 120 to the source network node after the access point 120 receives the NNDP data packet(s) originally transmitted by the source network node. The CDP data packet includes acknowledgment information, as well as optional command information. The acknowledgment information may be used by the source network node, for example, to determine its assigned time slot 215a, 215b, 215c, . . . , 215n. The optional command information may include, for example, at least one command to be executed by the source network node. The command may, for example, turn off/on an air conditioner, regulate the opening of the steam valve for heating, set and update certain parameters for a local controller, turn on an alarm, display certain message(s), etc.

The access point 120 transmits the CDP data packet during the same time slot used by the source network node to transmit the NNDP data packet(s) (i.e., during one of assignable time slots 215a, 215b, 215c, . . . , 215d or random access time slot 220a, 220b, 220c, . . . , 220n) 215a, 215b, 215c, . . . , 215n).

In one exemplary embodiment according to the present invention, the access point 120 transmits the CDP data packet to the source network node using the same path (i.e., the same transmission chain) used by the source network node to transmit its NNDP data packet(s) to the access point 120. For example, referring again to FIGS. 4 and 5, since network node 410c transmits its NNDP data packet(s) to the access point 420 via network node 410b, the access point 420 transmits the corresponding CDP data packet to network node 410c via network node 410b.

Figure 6:
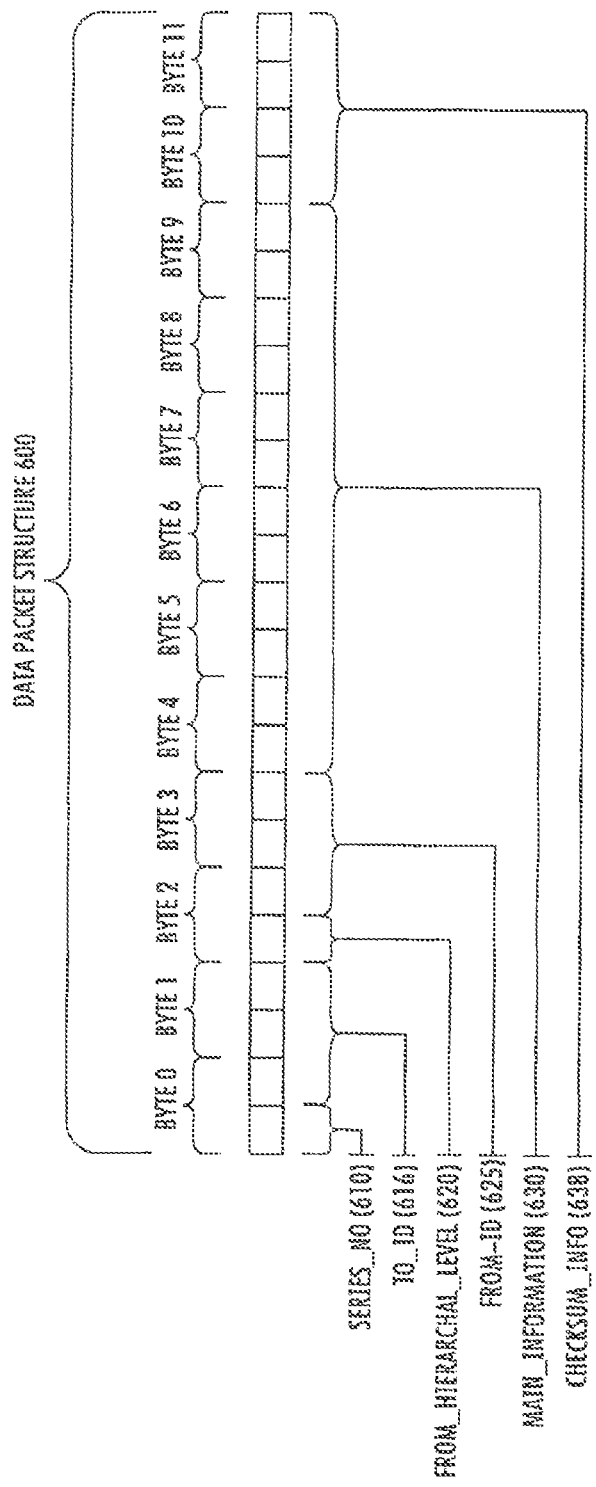
FIG. 6 is a diagram of an exemplary data packet structure according to the present invention.

As described above, the CDP data packet may contain, for example, information that permits the source network node to determine its assigned time slot 215a, 215b, 215c, . . . , 215n. However, once assigned, the time slot may be lost if, for example, the NNDP data packet transmitted by the source network node never reaches the access point 120 or if the CDP data packet transmitted by the access point 120 never reaches the source network node, for example, due to noise, interference, jamming, etc. If this is the case, those network nodes 110a, 110b, 110c, . . . , 110n, which have not yet received a data packet (e.g., a CDP data packet), as well as those network nodes 110a, 110b, 110c, . . . , 110n which have lost their time slot, transmit their respective NNDP data packet(s) during one of the random access time slots 220a, 220b, 220c, . . . , 220n of the random access communications interval 210b. In this manner, the access point 120 may receive the NNDP data packet(s) transmitted during the random access communications interval 210b, after which it may transmit appropriately addressed CDP data packets. As described above, each of the CDP data packets contains information that permits a respective network node to determine its assigned time slot 215a, 215b, 215c, . . . , 215n, which may then be used during the next data collection cycle 200. Referring now to FIG. 6, there is seen further detail of an exemplary data packet structure 600 according to the present invention. Each of the BCDP, NNDP, and CDP data packets may include, for example, 12 bytes (0 through 11). Bytes 0 and 1 are a combination of a Series No 610 (1/2 Byte), indicating the data collection cycle number originated by the access point, and a to_ID 615 (11/2 Bytes) that uniquely identifies the intended destination of the data packet, such as one of the neighboring network nodes 110a, 110b, 110c, . . . , 110n or the access point 120. For a BCDP data packet, the to_ID 615 does not address a particular network node, since every network node 110a, 110b, 110c, . . . , 110n is an intended destination of the BCDP data packet. Instead, the to_ID may be set to, for example, all binary is (hexadecimal: FFF). The first nibble (i.e., 4 bits) of byte 2 contains the from_hierarchical_level 620, which is either the hierarchal level of the transmitting network node, or the hierarchical level of the transmitting access point 120 (e.g., "1"). The second nibble of byte 2 and byte 3 contain a from_ID 625 that uniquely identifies either the transmitting network node, i.e., one of the network nodes 110a, 110b, 110c, . . . , 110n or the transmitting access point 120.

Bytes 4 9 contain the main_information 630. The format and content of the main_information 630 depend on the type of data packet (e.g., BCDP, NNDP, CDP), as described below. Bytes 10 and 11 contain checksum_info 635 used to store a calculated checksum of the transmitted data packet. This may permit, for example, the intended destination of the data packet to detect bit errors in a received data packet and, if necessary, initiate appropriate measures. In lieu of or in addition to checksum_info 635, bytes 10 and 11 may contain other information suitable to detect and/or correct errors in the received data packet, such as a hash code, error correction codes, etc.

Figure 7:
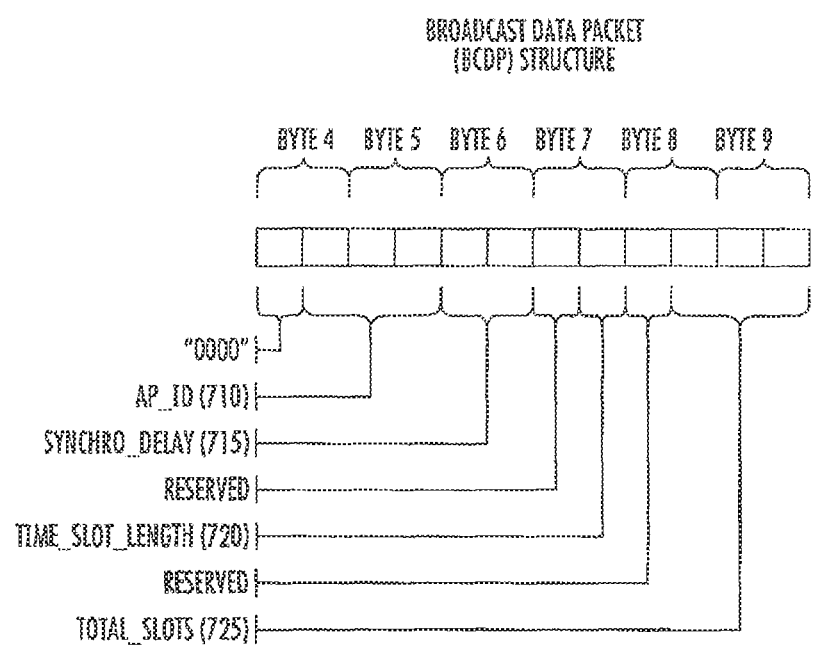
FIG. 7 is a diagram of an exemplary data structure of bytes 4-9 of a BCDP data packet.

The format and content of bytes 4 9 depend on the type of data packet. Referring now to FIG. 7, there is seen an exemplary data structure of bytes 4 9 of a BCDP data packet. The first nibble of byte 4 is set to, for example, "0000". The second nibble of byte 4 and byte 5 contain the AP_ID 710, i.e., a unique identifier assigned to the access point 120 (11/2 bytes). Byte 6 contains a synchro_delay 715, which is used by the network nodes 110a, 110b, 110c, ..., 110n to synchronize to one another. Synchronization may be necessary, for example, in a timely organized communications scheme, in which each of the network nodes 110a, 110b, 110c, ..., 110n is assigned a respective time slot 215a, 215b, 215c, ..., 215n, within which to transmit its information. The synchro_delay 715 is set in accordance with a subsequent time at which the network node assigned to the first time slot 215a should begin transmission of a first NNDP data packet. Each of the network nodes 110a, 110b, 110c, ..., 110n uses the synchro_delay 715 to calculate a timeout between the moment of receiving the BCDP data packet and this subsequent time to transmit. Upon retransmitting the BCDP data packet to neighboring network nodes 110a, 110b, 110c, ..., 110n, each of the network nodes 110a, 110b, 110c, ..., 110n recalculates and changes the synchro_delay 715 by subtracting a value representing the delay between receiving the BCDP data packet and retransmitting it.

The first nibble of byte 7 is reserved in this exemplary embodiment. However, it should be appreciated that the first nibble of byte 7 may contain any additional information.

The second nibble of byte 7 includes a time_slot_length 720, which indicates the size of each respective time slot 215a, 215b, 215c, ..., 215d assigned to each of the network nodes 110a, 110b, 110c, ..., 110n. In this exemplary embodiment, each time slot 215a, 215b, 215c, ..., 215d has the same length. The time_slot_length 720 is calculated in accordance with the total number of network nodes 110a, 110b, 110c, ..., 110n and the maximum time required for the network node assigned the highest hierarchical level to transmit its node information to the access point 120. Thus, the time_slot_length 720 necessarily determines the maximum number of NNDP data packets that may be transmitted and/or retransmitted by a network node and the maximum number of network nodes 110a, 110b, 110c, ..., 110n required for chain transmission during its respective time slot 215a, 215b, 215c, ..., 215n or random access time slot 220a, 220b, 220c, ..., 220n.

The first nibble of byte 8 is reserved in this exemplary embodiment. However, it should be appreciated that the first nibble of byte 8 may contain any additional information.

The second nibble of byte 8 and byte 9 contain total_slots 725, which include the total number of assignable time slots 215a, 215b, 215c, ..., 215d in the assigned time-slotted communications interval 210a, which depends on the total number of network nodes 110a, 110b, 110c, ..., 110n in the timely organized ad hoc wireless network 100.

Figure 8:
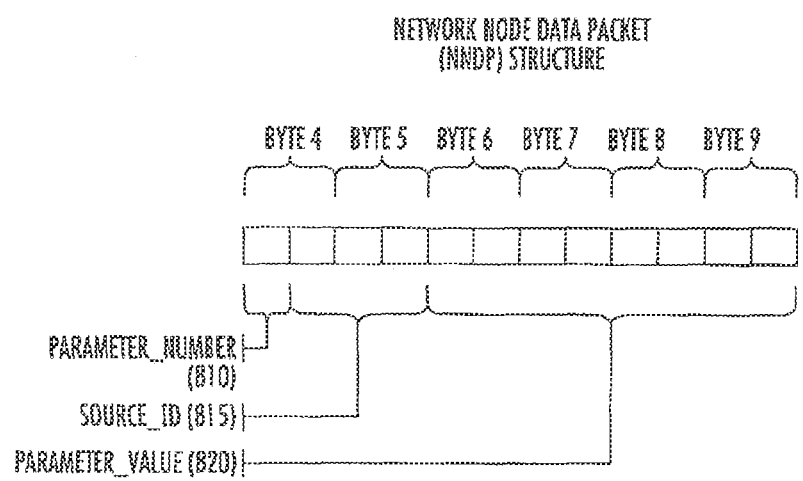
FIG. 8 is a diagram of an exemplary data structure of bytes 4-9 of a NNDP data packet according to the present invention.

Referring now to FIG. 8, there is seen an exemplary data structure of bytes 4-9 of an NNDP data packet. The first nibble of byte 4 contains a parameter_number 810 that uniquely identifies a particular NNDP data packet within a series of NNDP data packets transmitted by a source network node during a respective time slot 215a, 215b, 215c, ..., 215n or random access time slot 220a, 220b, 220c, ..., 220n. For example, if network node 110a transmits three NNDP data packets during its assigned time slot, the first NNDP may have a parameter_number 810 of "0000", the second NNDP may have a parameter_number 810 of "0001", and the third NNDP may have a parameter_number 810 of "0010". It should be appreciated, however, that the parameter_number 810 need not be consecutively assigned to a respective NNDP data packet. For example, a special parameter_number 810, such as "1111" or "1110", may be used to indicate the last NNDP data packet transmitted within an assigned time slot.

The second nibble of byte 4 and byte 5 contain a source_ID 815 that uniquely identifies the network node that is the source of the originally transmitted NNDP data packet(s) (i.e., the source network node).

Bytes 6 9 contain a parameter_value 820, i.e., the main node information, for example, the temperature of a room, the lighting conditions of a room, the energy usage, etc.

Figure 9:
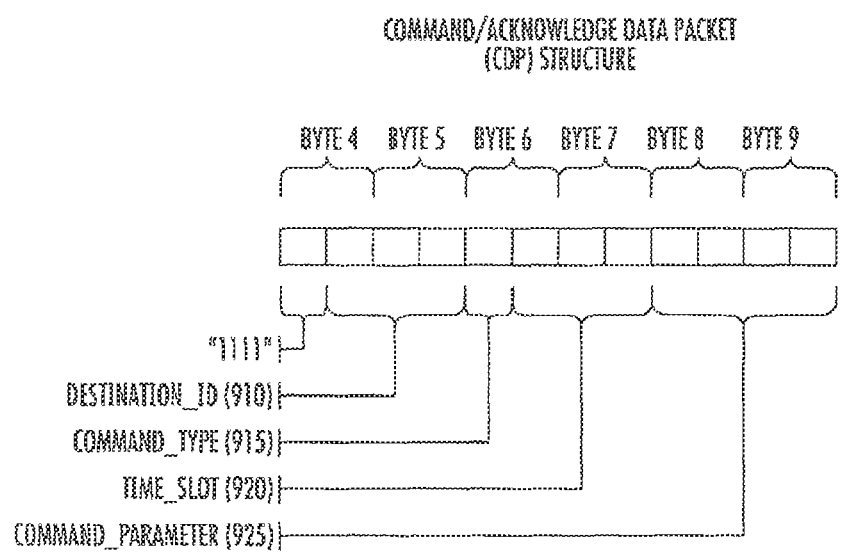
FIG. 9 is a diagram of an exemplary data structure of bytes 4-9 of a CDP data packet according to the present invention.

Referring now to FIG. 9, there is seen an exemplary data structure of bytes 4 9 of a CDP data packet. The first nibble of byte 4 contains hex F or "1111," in which hex F indicates that the CDP data packet is addressed to the source network node, and "1111" indicates otherwise.

The second nibble of byte 4 and byte 5 contain the destination ID 910 of the network node intended to receive and process the CDP data packet (i.e., the network node 110a, 110b, 110c, ..., 110n that was the source of the last received NNDP data packet(s)).

The first nibble of byte 6 contains a command-type 915, which indicates one of a series of commands to be executed by the network node identified by the destination_ID 910. If the CDP data packet does not include a command to be executed, the command_type 915 may be assigned to a default value, for example, "0000".

The second nibble of byte 6 and byte 7 contain the time slot 920, which indicates the time slot 215a, 215b, 215c, ..., 215d assigned to the network node identified by the destination_ID 910 (i.e., the network node that originated the NNDP data packet(s) last received by the access point 120).

Bytes 8 and 9 contain command_parameters 925, which are used in conjunction with the command_type 915 to execute a command issued by the access point 120.

Figure 10:
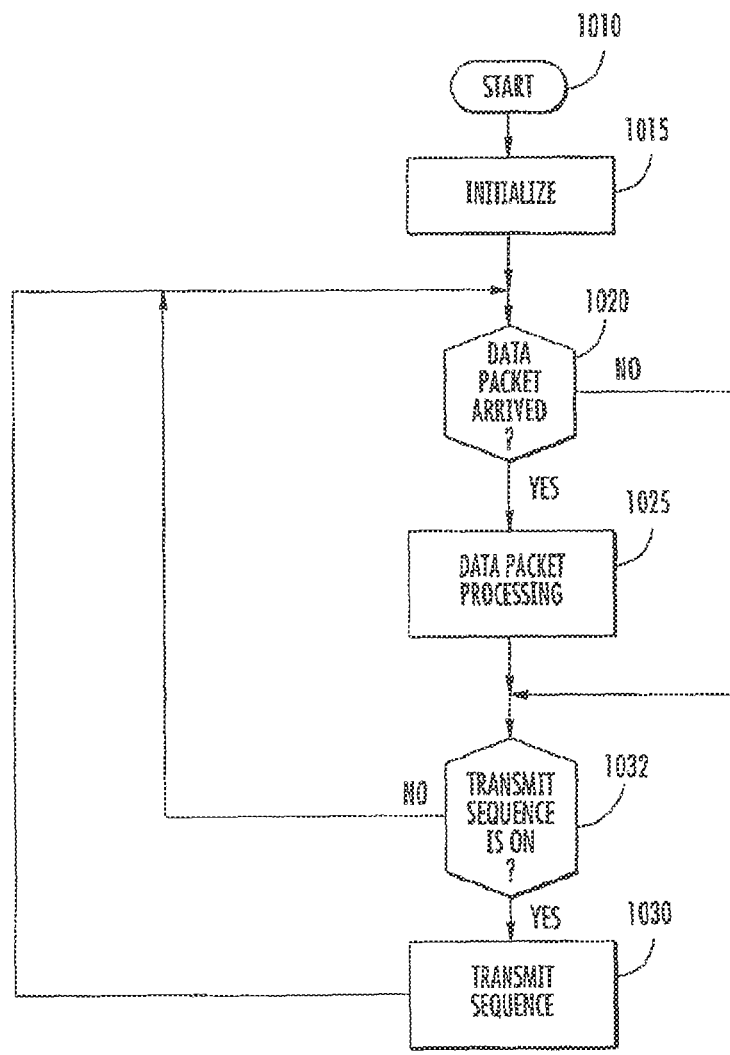
FIG. 10 is a flow diagram of the operational sequence of an exemplary network node according to the present invention.

Referring now to FIG. 10, there is seen a flow diagram of the operational sequence of an exemplary network node, for example, network node 110a, according to the present invention. The operational sequence may be stored, for example, in a memory device, (not shown) or in the microprocessor internal program or data memory, of the network node for execution on microprocessor 310. Or, at least a portion of the operational sequence may be implemented on, for example, a Field Programmable Gate Array (FPGA), an Application Specific Integrated Circuit (ASIC), discrete logic circuits, etc.

The following is a description of exemplary variables, e.g., memory variables, used by the operational sequence shown in FIG. 10. These variables may be stored, for example, in the memory device (not shown) or in the microprocessor internal memory of the network node. MY_SLOT: This variable stores which of the assignable time slots 215a, 215b, 215c, ..., 215n the network node is assigned to. A MY_SLOT value of "null" indicates that the network node has not yet received an assigned time slot or has lost its assigned time slot. MY_ID The unique identifier assigned to the network node. MY_H_LVL: The hierarchal level assigned to the network node. PARENT_ID: The unique ID of the neighboring network node to which all subsequent data packets are addressed, until communications fails, i.e., until an acknowledgment NNDP data packet is not received, or until a neighboring network node with a lower hierarchal level is detected. PARENT_H_LVL: The hierarchal level of the neighboring network node identified by the PARENT_ID. LAST_FROM_ID: The ID of the neighboring network node that has just transmitted an NNDP data packet to the current network node. This variable is required to help route a subsequent CDP data packet transmitted by the access point to the source network node. LAST_SOURCE: The ID of the network node that is the source of the NNDP data packet(s) last received by the current network node.

As shown in FIG. 10, the operational sequence begins at step 1010, after which step 1015 is executed. In step 1015, the network node executes initialization procedures, which may include, for example, preparing communication buffers, updating, timers, and/or enabling a receive mode of the transceiver 315.

In step 1020, it is determined whether a data packet (i.e., NNDP, CDP, or BCDP) has been received by the network node. If so, step 1025 is executed, in which the data packet is processed. After processing the received data packet, or if no data packets have been received, step 1032 is executed, in which it is determined whether the transmit sequence is operational. If so, and if transmission is needed, transmit sequence step 1030 is executed. If not, step 1020 is executed, in which it is checked whether a data packet has arrived.

Figure 11:
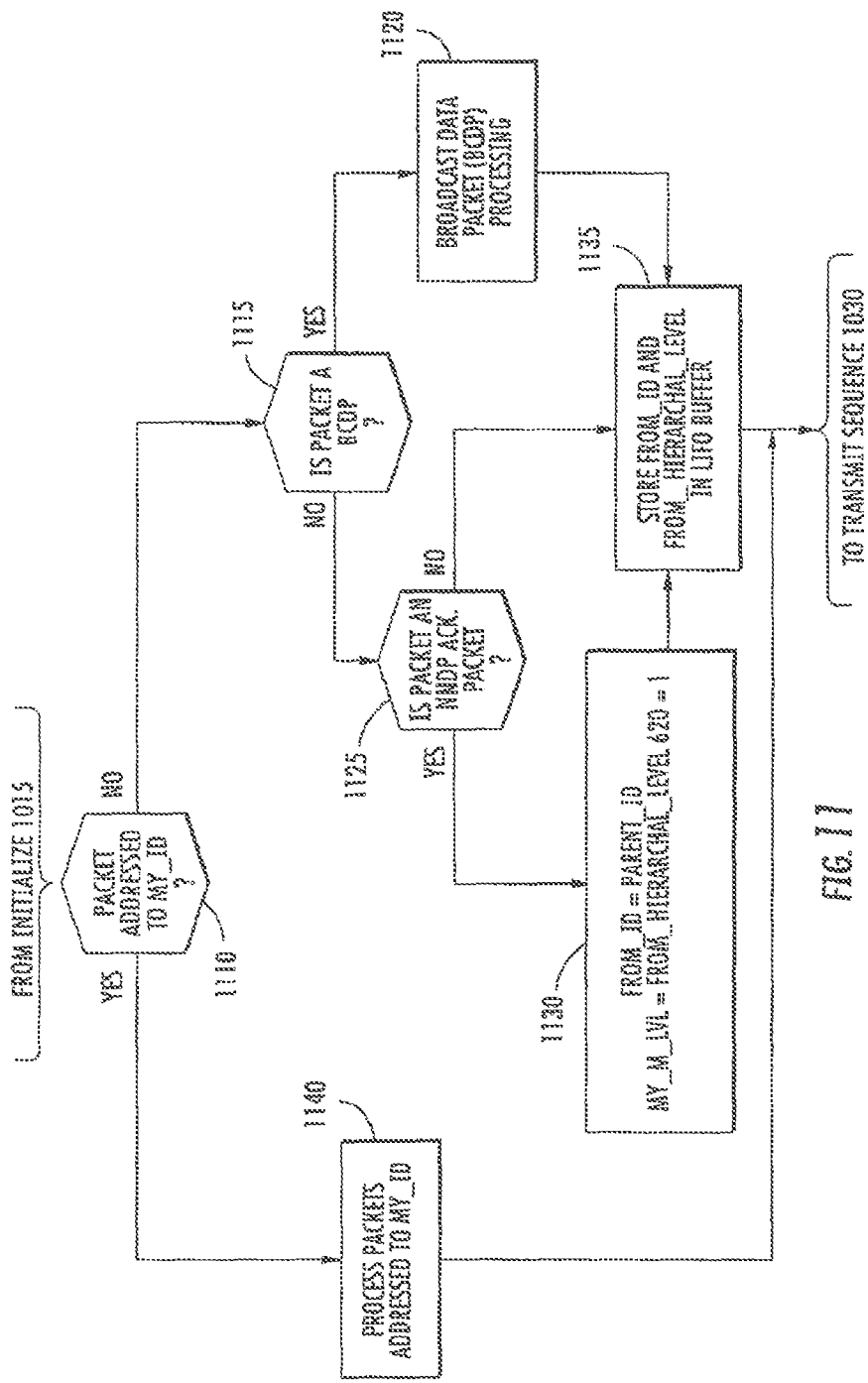
FIG. 11 is a flow diagram of an exemplary data packet processing sequence according to the present invention.

Referring now to FIG. 11, there is seen an exemplary data packet processing sequence 1025 as shown in FIG. 10. The data packet processing sequence 1025 begins by checking whether the to_ID 615 of the received data is addressed to the network node (i.e., whether the network node is the intended destination of the received data packet). If not, the data packet is either a BCDP data packet (i.e., a broadcast data packet, which is not addressed to any individual network node), an NNDP data packet addressed to either another network node or the access point 120, or a CDP data packet addressed to another network node.

If the data packet's to_ID 615 is not addressed to the network node, step 1115 is executed, in which it is determined whether the received data packet is a BCDP data packet. If so, step 1120 is executed, in which processing of the BCDP is performed.

During the BCDP data packet processing step 1120, the network node synchronizes to other network nodes, thereby permitting the network node to determine the start of its respective time slot 215a, 215b, 215c, . . . , 215n. For this purpose, it is determined whether the network node's currently assigned time slot, i.e., MY_SLOT, is set to the "null" time slot. MY_SLOT will be assigned the "null" time slot, for example, upon powering up the network node or, for example, if the network node loses its assigned time slot (e.g., if the access point 120 does not receive NNDP data packet(s) originated by the network node or if the network node does not receive a CDP data packet acknowledging the received NNDP data packet(s) originated by the network node).

In this exemplary embodiment according to the present invention, the "null" time slot is time slot "0".

If the network node's time slot (MY_SLOT) is set to the "null" time slot, i.e., the 0.sup.th time slot, the network node configures itself to transmit during one of the random access time slots 220a, 220b, 220c, . . . , 220n of the random access communications interval 210b. To determine which of the random access time slots 220a, 220b, 220c, . . . , 220n to transmit in, the network node uses the information contained in the BCDP data packet, for example, the synchro_delay 715, the time_slot_length 720, and the total_slots 725. Using this information, the network node may determine its time to transmit, for example, by the following equation: Time to Transmit (TTT)=synchro_delay 715+(total_slots 725+random integer)*time_slot_length 720.

The random access time slotted interval may, for example, have a fixed amount of time slots or, alternatively, a certain percentage of the total number of assigned time slots may be assigned to the random access time slotted interval, for example, 10%.

If, however, MY_SLOT is not set to the "null" time slot, i.e., one of the time slots 215a, 215b, 215c, . . . , 215n of the time-slotted communications interval 210a is assigned to the network node, the network node may determine its time to transmit, for example, using the following equation: Time to Transmit (TTT)=synchro_delay 715+ (MY_SLOT*time_slot_length 720).

After the network node synchronizes, i.e., determines the time to transmit, the synchro_delay 715 of the BCDP data packet is recalculated, and then the modified BCDP data packet is stored in a transmit buffer for subsequent retransmission during the Broadcast interval 210c after a random delay. The random delay is necessary to prevent simultaneous retransmission of the BCDP data packet by those network nodes 110a, 110b, 110c, . . . , 110n receiving the BCDP data packet essentially at the same time. The synchro_delay 715 is recalculated before each retransmission of the BCDP data packet to ensure, or at least makes more probable, that the synchro_delay 715 will expire at the same time for each of the network nodes 110a, 110b, 110c, . . . , 110n. For this purpose, the synchro_delay 715, may be recalculated, for example, according to the following equation: new synchro_delay 715=(received synchro_delay 715-delay between receipt of the BCDP data packet and retransmission of the BCDP after the random timeout).

If the data packet received is an NNDP data packet transmitted by a neighboring network node, step 1125 is executed, in which it is determined whether the NNDP data packet is an acknowledgment NNDP data packet. A received NNDP data packet is an acknowledgment NNDP data packet if the NNDP data packet is a retransmission of the network node's NNDP data packet by a neighboring network node. For example, referring back to FIG. 4, after network node 410c transmits an NNDP data packet to network node 410b, network node 410b retransmits the NNDP data packet to the access point 420. Network node 410c also receives this retransmission of the NNDP data packet from network node 410b to the access point 420. By receiving the retransmission of the NNDP data packet, network node 410c verifies that network node 410b received the original transmission of the NNDP data packet from network node 410c to network node 410b (i.e., network node 410c verifies the integrity of the transmission chain). That is, with respect to node 410c the NNDP data packet is an acknowledgment or verification data packet. For this purpose, network node 410c checks the from_ID 625 and the main information 630 (i.e., the parameter_number 810, the source_ID 815, and the parameter_value 820) of the NNDP data packet. If the from_ID 625 of the NNDP data packet transmitted by network node 410b is the same as the to_ID 615 of the NNDP data packet transmitted by network node 410c to network node 410b, and the main information 630 of the NNDP data packet transmitted by network node 410b is the same as the main information 630 of the NNDP data packet transmitted by network node 410c to network node 410b, the NNDP data packet is considered an acknowledgment NNDP data packet. Thus, if, for example, network node 410b fails to retransmit the NNDP data packet to the access point 420, for example, due to noise or interference blocking the original transmission of the NNDP data packet from network node 410c to network node 410b, network node 410c may retransmit the NNDP data packet to a different neighboring network node. In this manner, network node 410c may ensure, or at least make it more likely, that its NNDP data packet will eventually reach the access point 420.

Referring back to FIG. 11, if the NNDP data packet is an acknowledgment NNDP data packet, step 1130 is executed, in which the network node stores the from_ID 625 and the from_hierarchal_level 620 of the NNDP data packet as the PARENT_ID and a PARENT_H_LVL, respectively. Then, the network node assigns itself a hierarchal level (i.e., MY_H_LVL) equal to the PARENT_H_LVL+1. In this manner, all subsequent data packets will be addressed to the network node identified by the PARENT_ID, until communications fails, i.e., until an acknowledgment NNDP data packet is not received or until a neighboring network node with a lower hierarchal level is detected (see below).

If it is determined, in step 1125, that the received data packet is not an NNDP acknowledgment data packet, this indicates that the received packet is either a non-acknowledgment type NNDP data packet or a CDP data packet addressed to another network node. The network node ignores these types of packets, with the exception of the processing performed by step 1135.

In step 1135, the LIFO stack is updated if the received data packet has a from_hierarchal_level 620 that is either less than or equal to the hierarchal level of the network node's ID currently stored at the top of the LIFO stack. Effectively, the network node processes data packets not addressed to the network node to ensure that at least one neighboring network node's ID and hierarchal level is stored at the top of the LIFO stack. The LIFO stack, the PARENT_ID, and PARENT_H_LVL comprise the dynamic self-routing protocol.

Figure 12:
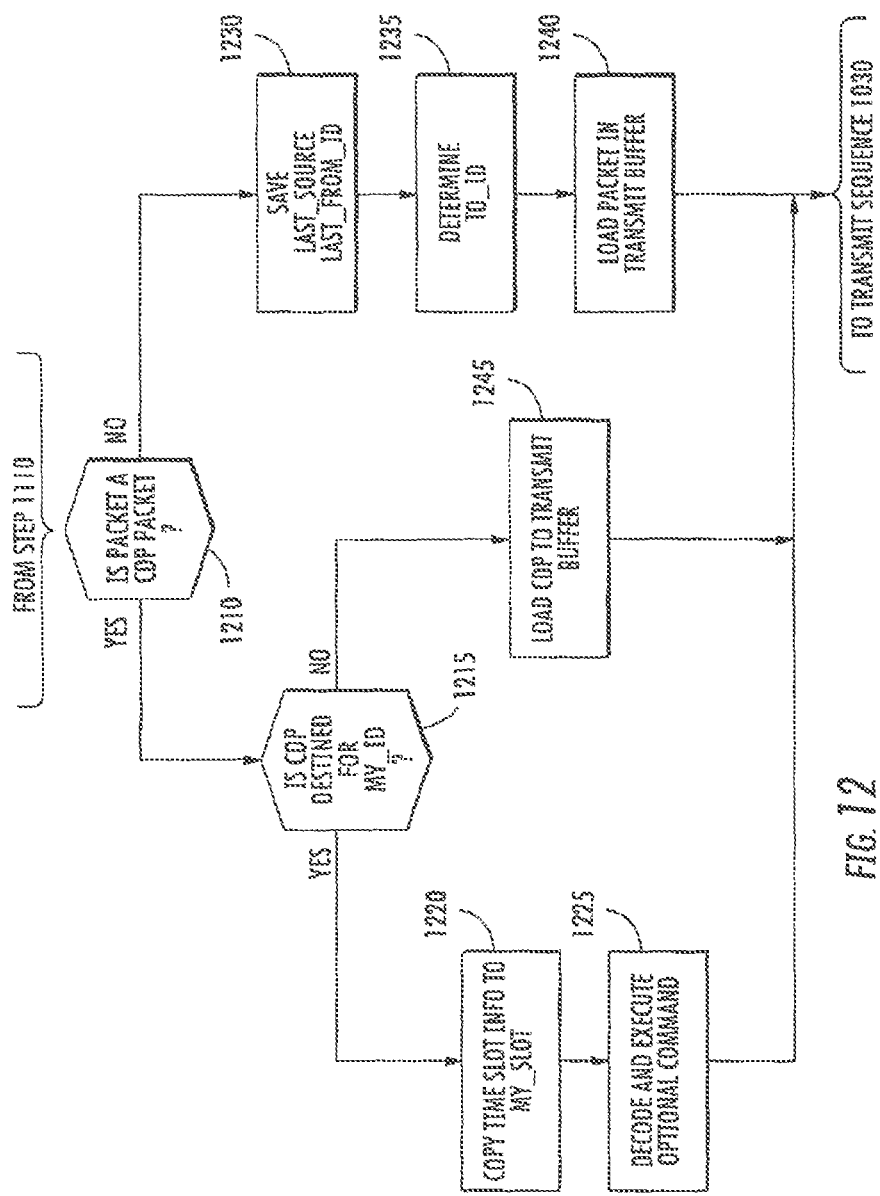
FIG. 12 is a flow diagram of an exemplary sequence for processing data packets addressed to a network node according to the present invention.

If the received data packet is addressed to the network node, step 1140 is executed, in which packets addressed to the network node are processed. Referring now to FIG. 12, there is seen an exemplary sequence 1140 for processing data packets addressed to the network node. If the received data packet is addressed to MY_ID, i.e., the network node, then the received data packet is either a CDP data packet destined for the network node (i.e., the destination_ID 910 is equal to MY_ID), a CDP data packet destined for another network node (i.e., the destination_ID 910 is not equal to MY_ID), or an NNDP data packet transmitted by another network node and destined for the access point 120.

In step 1210, it is determined whether the received data packet is a CDP data packet. If not, step 1230 is executed, in which the network node processes the NNDP data packet transmitted by another network node. As described above, the network node may be the intended destination of the NNDP data packet, if the source network node (i.e., the source of the NNDP data packet) requires intervening transmission to other network nodes to ensure that its respective node information reaches the access point. For example, referring back to FIG. 4, network node 410c must transmit its NNDP data packet(s) to 410b, which then retransmits the NNDP data packet(s) to the access point 420 (i.e., the final destination of the NNDP data packet(s)). Thus, network node 410b is the intended destination of the NNDP data packet transmitted by network node 410c.

Referring back to FIG. 12, the network node copies the from_ID 625 of the NNDP data packet to the internal memory variable LAST_FROM_ID. This step is required because the access point 120 will subsequently transmit a CDP data packet to the source of the NNDP data packet using the same transmission chain, but in reverse order. Thus, when the current network node subsequently receives a CDP data packet destined to the source of the current NNDP data packet, the network node will retransmit the CDP data packet to the network node identified by the LAST_FROM_ID. The network node also copies the destination_ID 910 of the CDP data packet to the variable LAST_SOURCE. In this manner, the network node keeps track of the source of the NNDP data packet.

Then, step 1235 is executed, in which the network node determines which neighboring network node to retransmit the NNDP data packet to by changing the to_ID 615 of the NNDP data packet to either the PARENT_ID or the ID at the top of the LIFO stack. In this manner, the network node will retransmit the NNDP data packet to the neighboring network node identified by the PARENT_ID, unless an acknowledgment NNDP data packet was not detected from the PARENT_ID or if the network node at the top of the LIFO stack has a hierarchal level less than the PARENT_H_LVL, in which case the network node will retransmit the NNDP data packet to the neighboring network node identified by the ID at the top of the LIFO stack. If the network node retransmits the NNDP data packet to the neighboring network node identified by the ID at the top of the LIFO stack, the ID is then removed from the stack. In this manner, the LIFO stack is constantly updated with current routing information.

Then, step 1240 is executed, in which the modified NNDP data packet is loaded in the transmit buffer. Before doing so, however, the network node updates the from_hierarchal_level 620 and the from_ID 625 of the NNDP data packet to indicate the hierarchal level (i.e., MY_H_LVL) and ID (i.e., MY_ID) of the network node, respectively. In this manner, the NNDP is retransmitted to the next neighboring network node in the transmission chain or, alternatively, is transmitted directly to the access point 120. The network node transmits the NNDP directly to the access point 120 if the network node is the last network node in a transmission chain or if the network node is a source network node neighboring the access point 120 (i.e., the network node's hierarchal level permits direct transmission to the access point).

If step 1210 indicates that the received data packet is a CDP data packet, step 1215 is executed, in which it is determined whether the CDP data packet is destined for the current network node (i.e., whether the destination_ID 910 is equal to MY_ID). If so, step 1220 is executed, in which the information contained in the CDP data packet is used to determine the network node's assigned time slot 215a, 215b, 215c, . . . , 215n. Specifically, the network node copies time_slot 930 of the CDP data packet to the variable MY_SLOT. Then, step 1225 is executed, in which it is determined whether the access point 120 requires the network node to execute a command based on the command_type 915 and the command_parameters 925 of the CDP data packet. If so, the network node decodes and executes the command.

If step 1215 indicates that the CDP data packet is not destined for the current network node (i.e., the destination ID 910 of the CDP data packet is not equal to MY_ID), step 1245 is executed, in which the network node loads the CDP data packet into the transmit buffer for subsequent transmission to the neighboring network node identified by the LAST_FROM_ID. For this purpose, the network node modifies the CDP data packet by changing the to_ID 615 to LAST_FROM_ID, the from_ID 625 to MY_ID, and the from_hierarchal_level 620 to MY_H_LVL. In this manner, the CDP data packet is eventually received by the source of the last transmitted NNDP data packet(s) using the same transmission chain as was used to transmit the NNDP data packet(s) to the access point.

Figure 13:
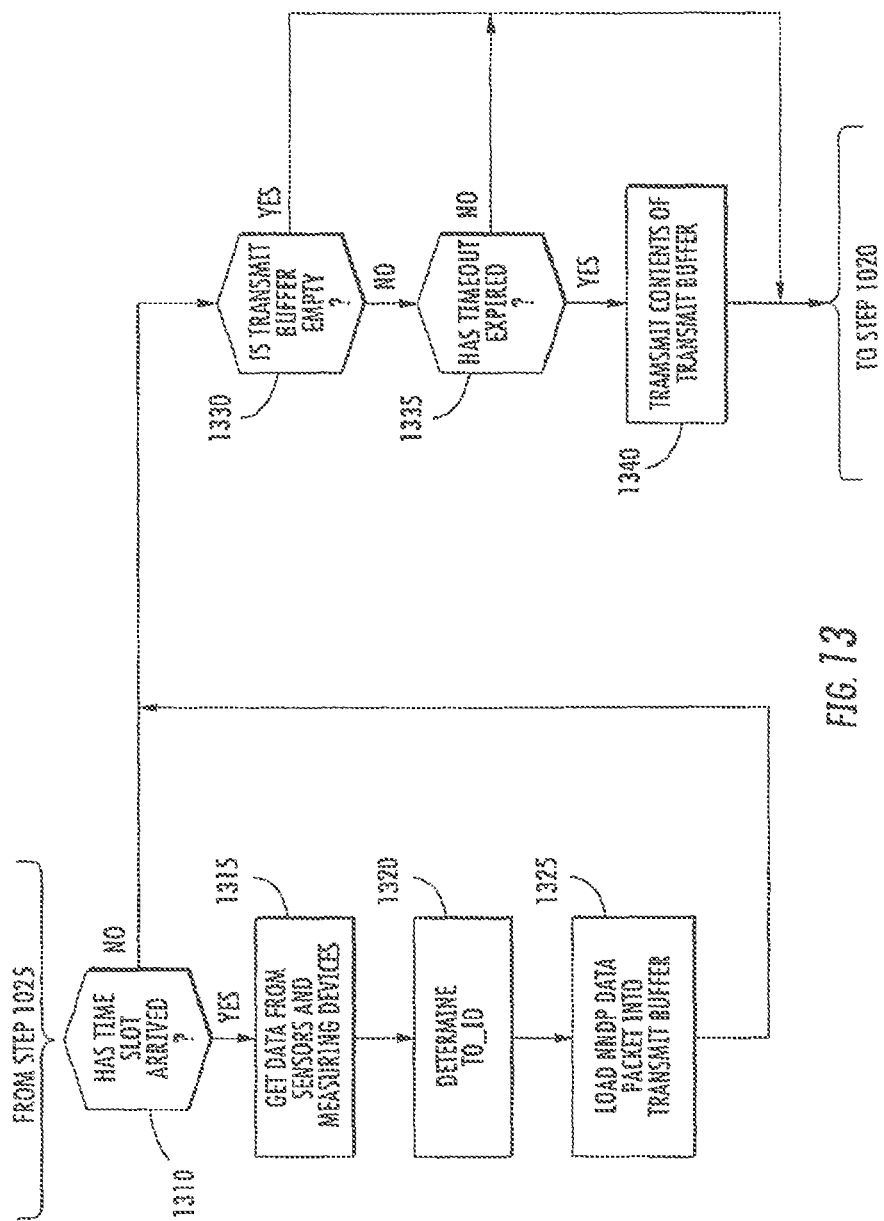
FIG. 13 is a flow diagram of an exemplary transmit sequence according to the present invention.

Referring now to FIG. 13, there is seen an exemplary transmit sequence 1030 according to the present invention. In step 1310, it is determined whether the time to transmit has arrived, i.e., whether the time slot 215a, 215b, 215c, ..., 215d assigned to the current network node has arrived. If so, step 1315 is executed, in which data from sensors and measuring devices is obtained (e.g., temperature of a room, energy usage, etc.) and packaged into one or more NNDP data packets (e.g., packaged into the parameter value 820 of one or more NNDP data packets). Then, step 1320 is executed, in which the network node determines which neighboring network node to transmit the newly packaged NNDP data packet(s) to by setting the to_ID 615 of the NNDP data packet to either the PARENT_ID or the ID at the top of the LIFO stack. Specifically, the network node will transmit the NNDP data packet(s) to the neighboring network node identified by the PARENT_ID, unless an acknowledgment NNDP data packet is not detected from the network node identified by the PARENT_ID or if the network node at the top of the LIFO stack has a hierarchal level less than the PARENT_H_LVL. If either of these events occurs, the network node will transmit the NNDP data packet(s) to the neighboring network node identified by the ID at the top of the LIFO stack, after which the ID is removed from the stack. Then, step 1325 is executed, in which the newly packaged NNDP data packet(s) is/are loaded in the transmit buffer.

Steps 1330, 1335, 1340 operate together to transmit information contained in the transmit buffer. First, in step 1330, it is determined whether the transmit buffer is empty. If so, no information is transmitted, and the operational sequence loops back to step 1020. If the transmit buffer is not empty, step 1335 is executed, in which it is determined whether a random timeout has expired. If not, the operational sequence loops back to step 1020. If so, step 1340 is executed, in which the contents of the transmit buffer are transmitted. Then, the operational sequence loops back to step 1020.

The random delay defined by the random timeout only exists when the network node is transmitting information in a time slot assigned to another network node. Thus, when the network node is originating an NNDP data packet, the random timeout is "0".

Figure 15A:
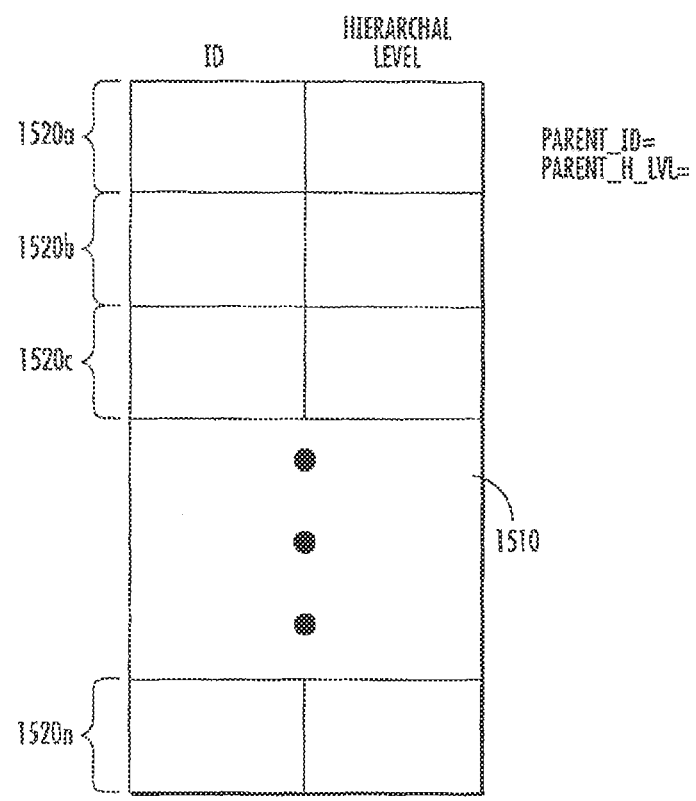
FIGS. 15a through 15e are diagrams showing an exemplary dynamic self-routing protocol according to the present invention.

Referring now to FIGS. 15a through 15e, there is seen an exemplary dynamic self-routing protocol according to the present invention. FIG. 15 shows a LIFO stack 1510 and the PARENT_ID memory variable of network node 410c shown in FIG. 4. LIFO stack 1510 includes a plurality of levels 1520a, 1520b, 1520c, ..., 1520n, each of which is operable to store a network node ID and a network node hierarchal level. As described above with reference to FIG. 4, the access point 420 has a hierarchal level of "1", each of network nodes 410a, 410b has a hierarchal level of "2", network node 410c has a hierarchal level of "3", and network node 410d has a hierarchal level of "4". As shown in FIG. 15a, network node 410c has not yet assigned any of network nodes 410a, 410b, 410d or the access point 420 to either the LIFO stack or the PARENT_ID memory variable.

Figure 15B:
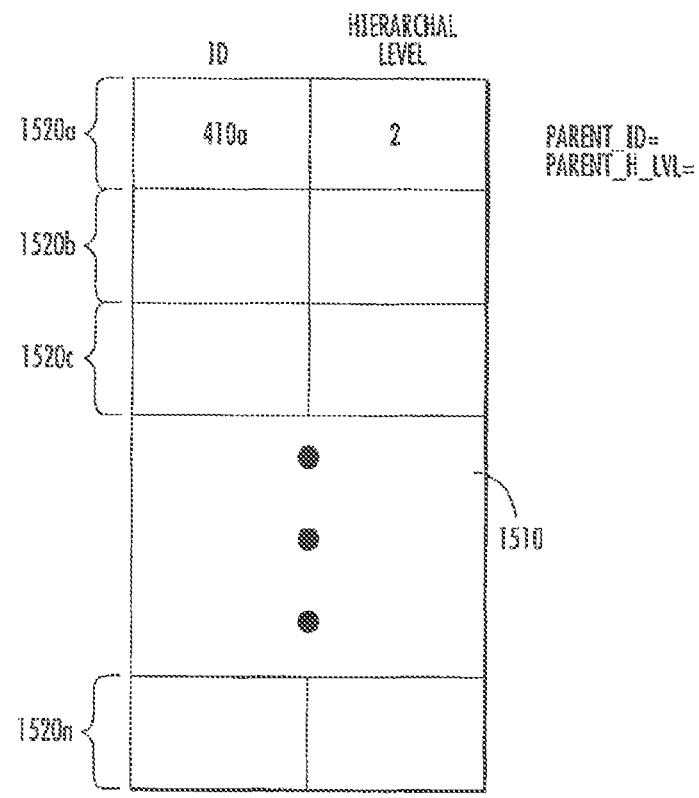

For exemplary purposes only, network node 410a transmits a single NNDP data packet to the access point 420 during its assigned time slot, for example, the 1.sup.st assigned time slot 215a. This NNDP data packet is received by network node 410c, which proceeds to process the NNDP data packet in the manner described above. As shown in FIG. 15b, network node 410c copies the ID and hierarchal level of network node 410a to the top of LIFO stack 1510, since network node 410c has not yet assigned a network node to the LIFO stack 1510.

Then, at a subsequent point in time, network node 410d transmits a single NNDP data packet to network node 410c. As described above, network node 410c retransmits this NNDP data packet to network node 410b, since obstacle 430b prevents network node 410d from directly transmitting the NNDP data packet to the access point 420. However, since the hierarchal level of network node 410d is not less than or equal to the hierarchal level of the ID at the top of the LIFO stack 1510 (i.e., 4 is not less than or equal to 2), network node 410c does not copy the ID of network node 410d to the top of the LIFO stack 1510.

Figure 15C:
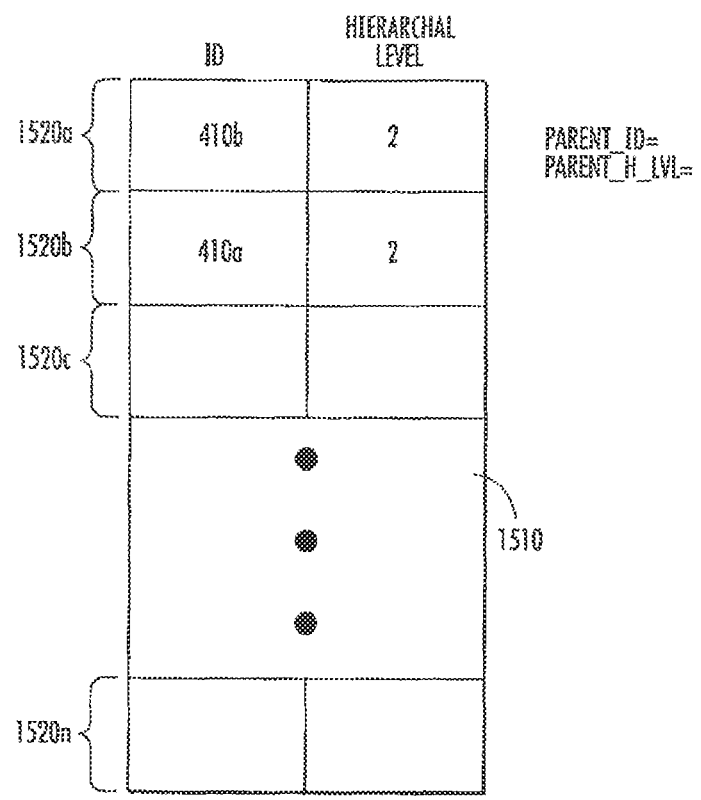

Then, at a subsequent point in time, network node 410b transmits a single NNDP data packet to the access point 420 during its assigned time slot, for example, the 3rd assigned time slot 215c. This NNDP data packet is received by network node 410c, which proceeds to process the NNDP data packet in the manner described above. As shown in FIG. 15c, network node 410c copies the ID of network node 410b to the top of LIFO stack 1510, since network node 410b has a hierarchal level that is less than or equal to the hierarchal level of the ID at the top of the LIFO stack 1510 (i.e., 2 is equal to 2). In doing so, the ID of network node 410a is pushed downward into the second position of the LIFO stack 1510.

Figure 15D:
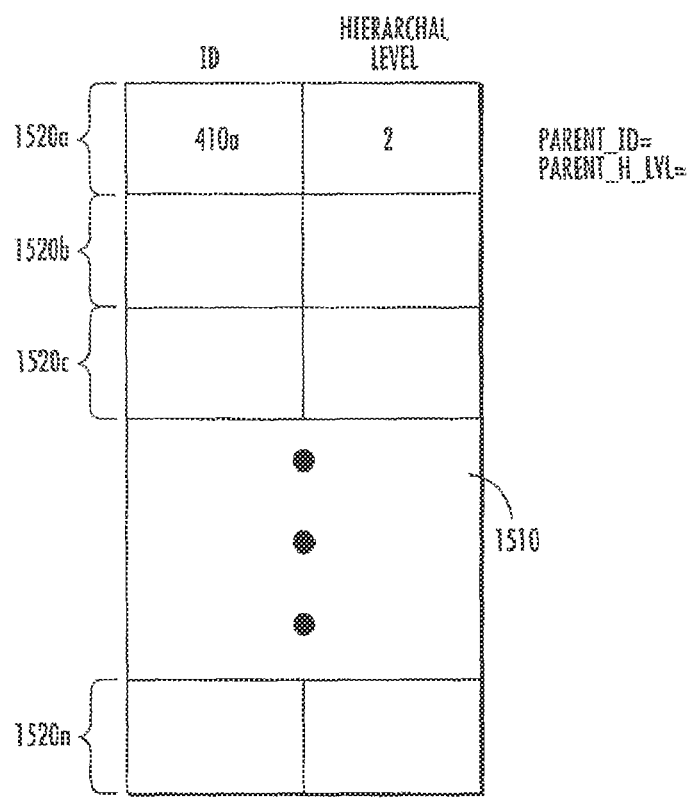

Then, at a subsequent point in time, network node 410c transmits a single NNDP data packet ultimately destined for the access point 420. Since no network node has been assigned to the PARENT_ID, network node 410c transmits the NNDP data packet to the network node at the top of the LIFO stack 1510, i.e., network node 410b. As shown in FIG. 15d, network node 410c then removes network node 410b from the top of the LIFO stack 1510, causing network node 410a to advance to the it position of the LIFO stack 1510.

Figure 15E:
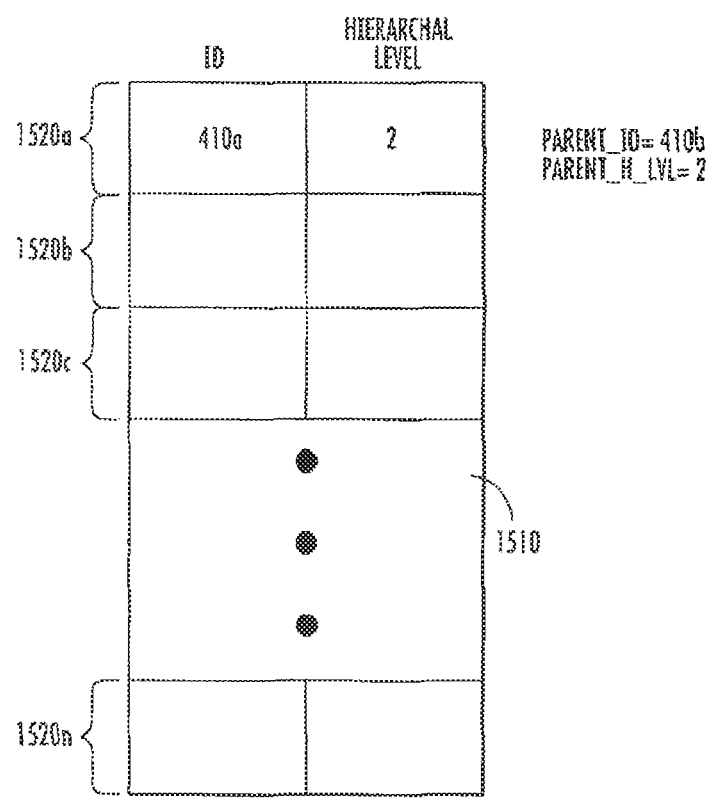

After receiving the NNDP data packet, network node 410b retransmits the NNDP data packet to the access point 420. This "retransmission" is received by network node 410c, thereby permitting network node 410c to acknowledge that the NNDP data packet transmitted from network node 410c was actually received by network node 410b. That is, the retransmitted NNDP data packet is also an "acknowledgment" NNDP data packet. At this point, as shown in FIG. 15e, network node 410c copies the ID of network node 410b as the PARENT_ID. In this manner, all subsequent transmissions from network node 410c will be directed to network node 410b, until communications fails, i.e., until an acknowledgment NNDP data packet is not received, or until a neighboring network node with a lower hierarchal level is detected and placed on top of the LIFO stack.

Figure 14A:
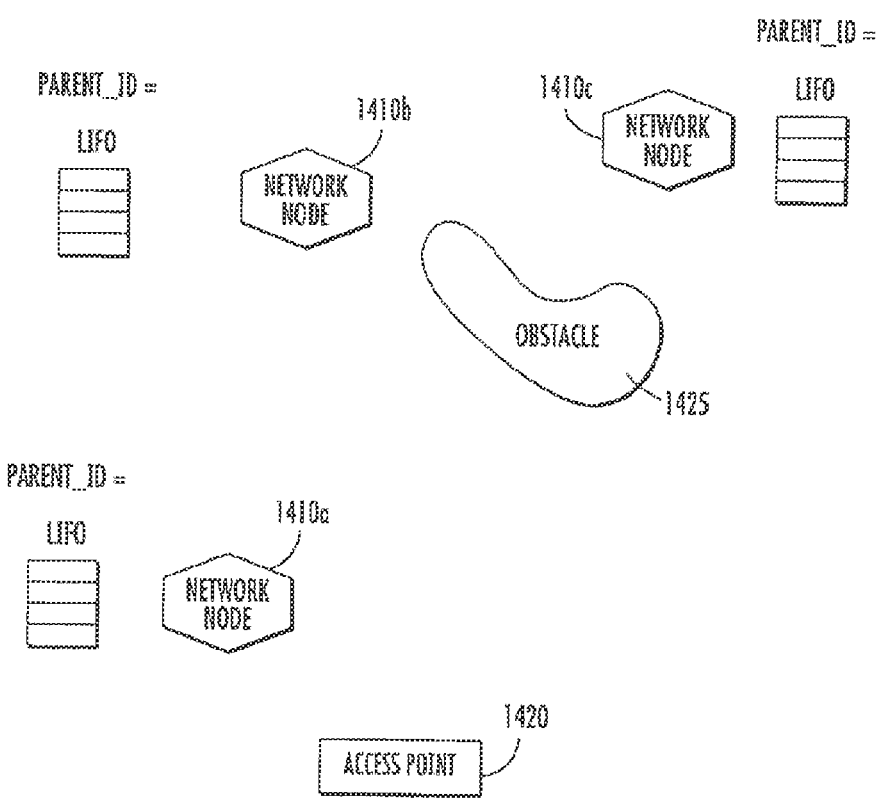
FIGS. 14a through 14l are a series of block diagrams showing an operational sequence of a third exemplary ad hoc wireless network upon power up.

Referring now to FIGS. 14a through 14l, there is seen an exemplary ad hoc wireless network 1400 upon power up. As shown in FIG. 14a, the hoc wireless network 1400 includes network nodes 1410a, 1410b, and 1410c, as well as access point 1420. In this exemplary embodiment, network nodes 1410a, 1410b are capable of directly communicating with the access point 1420. Network node 1410c, however, is prevented from directly communicating with both the access point 1420 and network node 1410a by obstacle 1425. As shown in FIG. 14a, upon power up, none of the network nodes 1410a, 1410b, 1410c has assigned itself a hierarchal level or a PARENT_ID, and none of the network nodes 1410a, 1410b, 1410c has an network node ID at the top of its respective LIFO stack.

In this state, each of the network nodes 1410a, 1410b, 1410c is in a "listening" state, in which it waits for a BCDP data packet to be received.

Figure 14B:
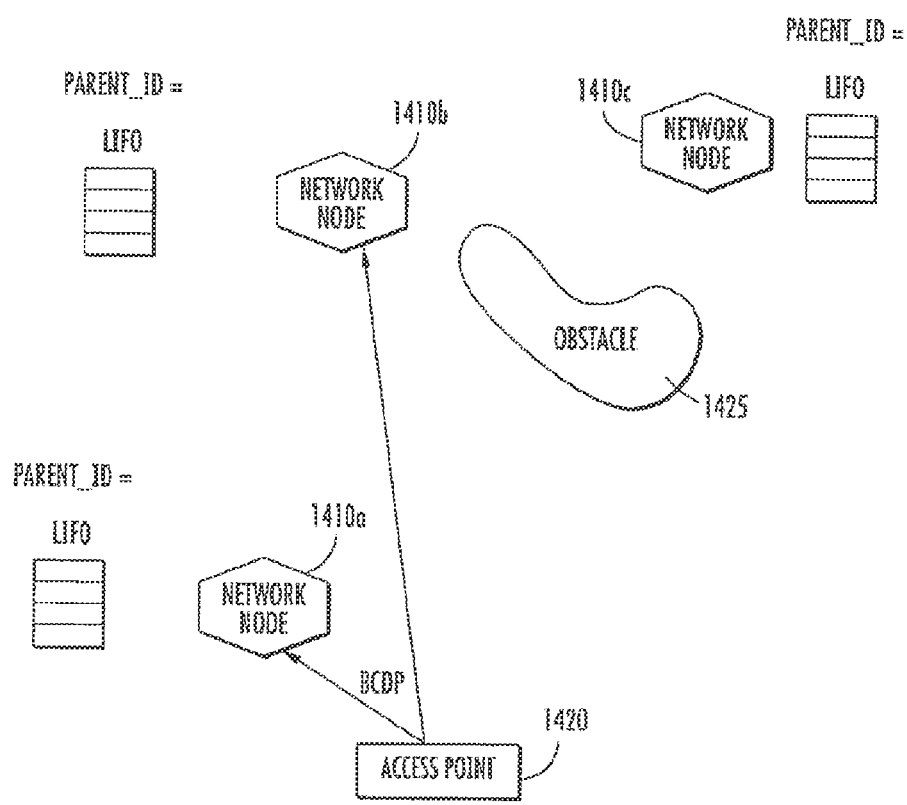

Referring now to FIG. 14b, the access point 1420 transmits the first BCDP data packet during the broadcast interval 210c. The BCDP data packet is then received by network nodes 1410*a*, 1410*b*. Each of network nodes 1410*a*, 1410*b* processes the BCDP data packet according to step 1120 of FIG. 11, as described above. In this manner, each of network nodes 1410*a*, 1410*b* determines that the BCDP data packet was transmitted by the access point 1420, since the from_ID 625 of the BCDP identifies the access point 1420.

Figure 14C:
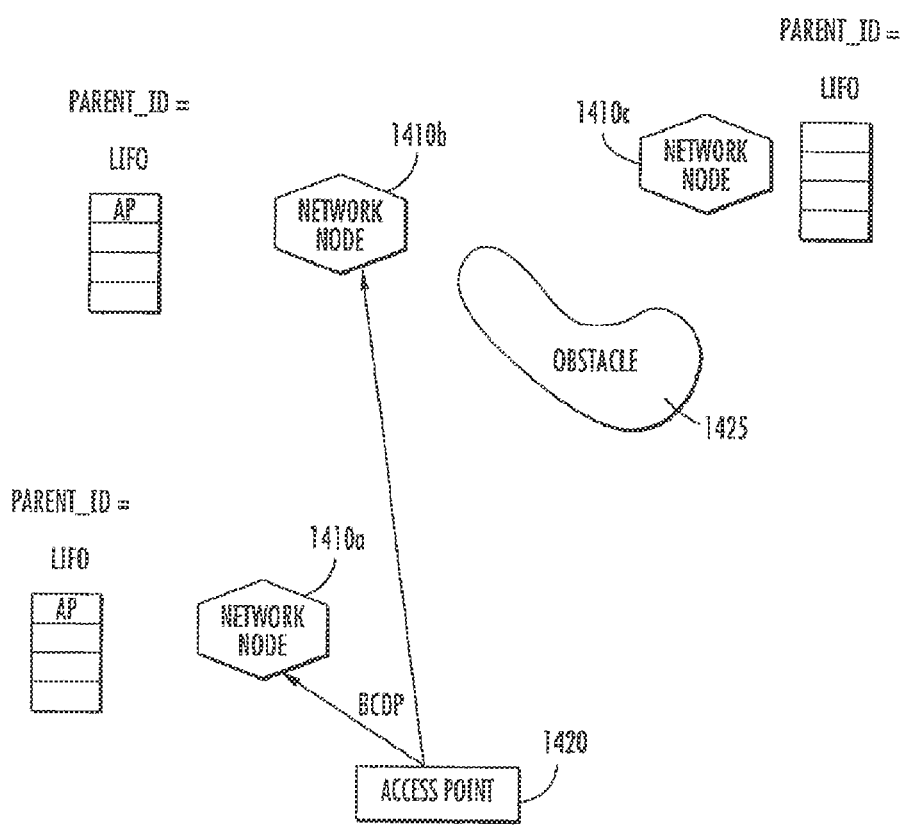

Referring now to FIG. 14*c*, each of the network nodes 1410*a*, 1410*b* copies the from_ID 625 (i.e., the access point) and the from_hierarchal_level 620 (i.e., level "1" for the access point) of the BCDP data packet to the top of the LIFO stack.

Figure 14D:
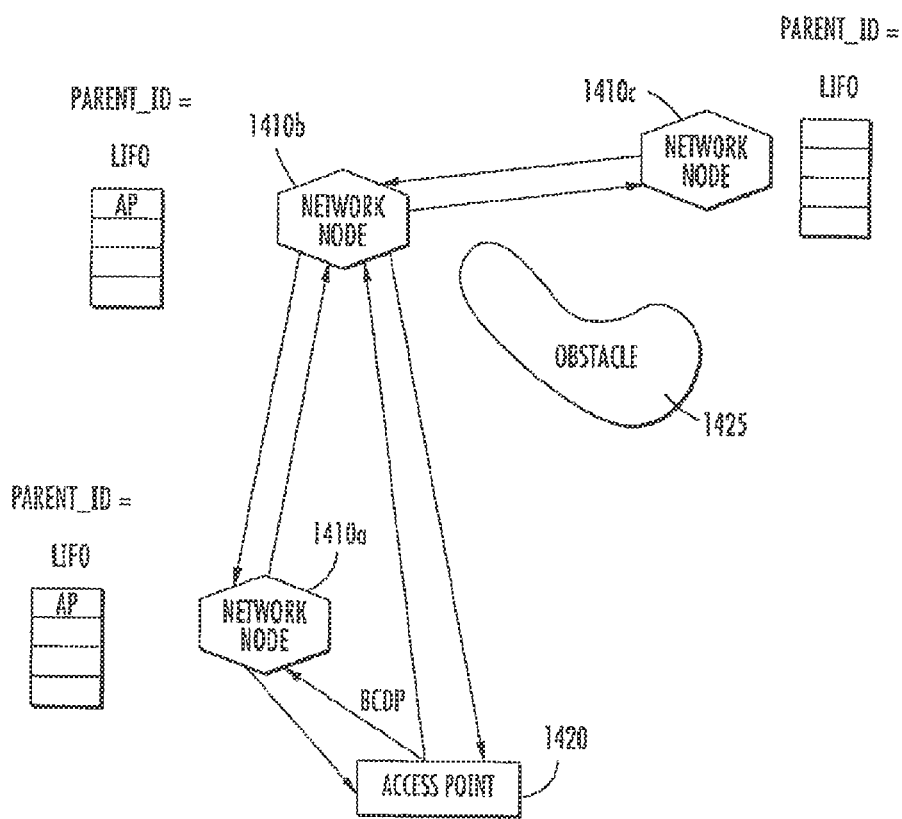

Then, as shown in FIG. 14*d*, each of network nodes 1410*a*, 1410*b* retransmits the BCDP after a random delay, as described above. In this manner, the network node 1410*c* receives the BCDP and then retransmits the BCDP data packet after a random delay. At this point, since each of the network nodes 1410*a*, 1410*b*, 1410*c* has received the BCDP data packet, each of the network nodes is synchronized, i.e., each knows the time of the first assignable time slot 215*a*.

Once synchronized, each of the network nodes 1410*a*, 1410*b* begins to transmit NNDP data packet(s) during one of the random access time slots 220*a*, 220*b*, 220*c*, . . . , 220*d* of the random access communications interval 210*b*, since none of the network nodes 1410*a*, 1410*b* has yet been assigned one of the assignable time slots 215*a*, 215*b*, 215*c*, . . . , 215*n* of the time-slotted communications interval 210*a*. Network node 1410*c*, although synchronized, does not begin to transmit NNDP data packet(s) because it has not yet assigned any of the neighboring network nodes 1410*a*, 1410*b* to the top of its LIFO stack. That is, network node 1410*c* has not yet determined where to transmit subsequent NNDP data packets.

Figure 14E:
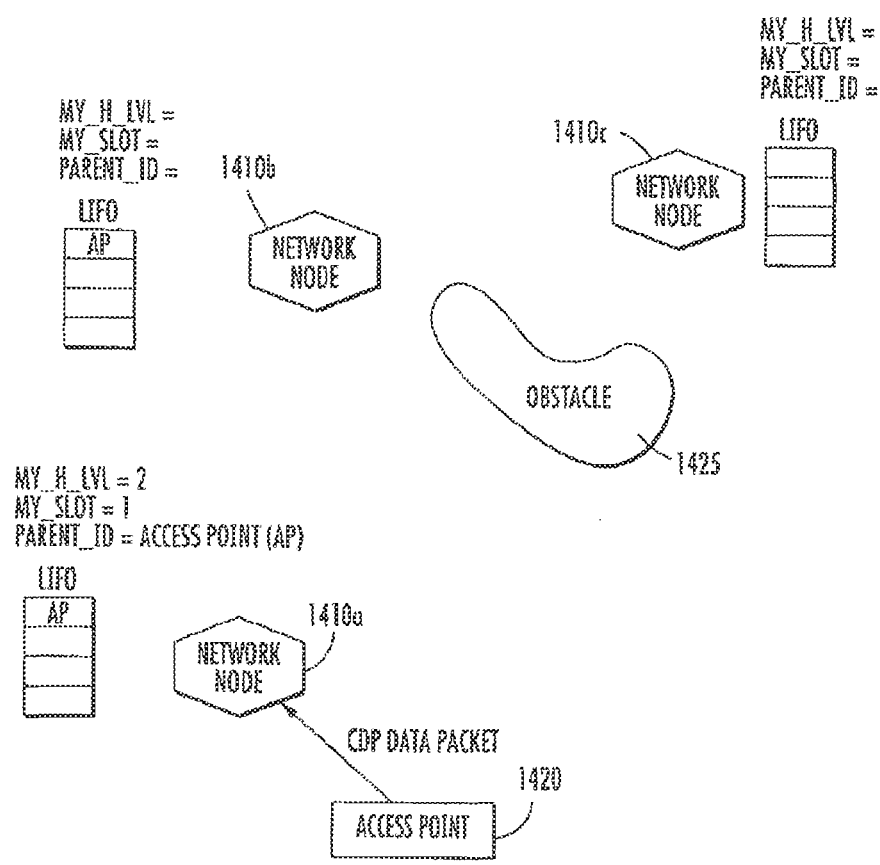

For exemplary purposes only, access point 1420 receives the NNDP data packet(s) of network node 1410*a* first, for example, during the first random access time slot 220*a*. At this point, as shown in FIG. 14*e*, the access point 1420 transmits a CDP data packet to network node 1410*a* during the first random access time slot 220*a*. After the network node 1410*a* receives the CDP data packet, it copies the time_slot information 920 to MY_SLOT. In this manner, network node 1410*a* is assigned one of the assignable time slots 215*a*, 215*b*, 215*c*, . . . , 215*n*. In this exemplary embodiment, network node 1410*a* is assigned the 1.sup.st time slot 215*a*.

The CDP also acts as an "acknowledgment" data packet for all network nodes (i.e., network nodes 1410*a*, 1410*b*) capable of directly communicating with the access point 1420. Thus, as shown in FIG. 14*e*, network node 1410*a* assigns the ID of the access point as the PARENT_ID and assigns the hierarchal level of the access point 1420 (e.g., level "1") to the PARENT_H_LVL and also assigns itself an incremented hierarchal level of the hierarchal level of the access point 1420 (i.e., 1+1="2").

Figure 14F:
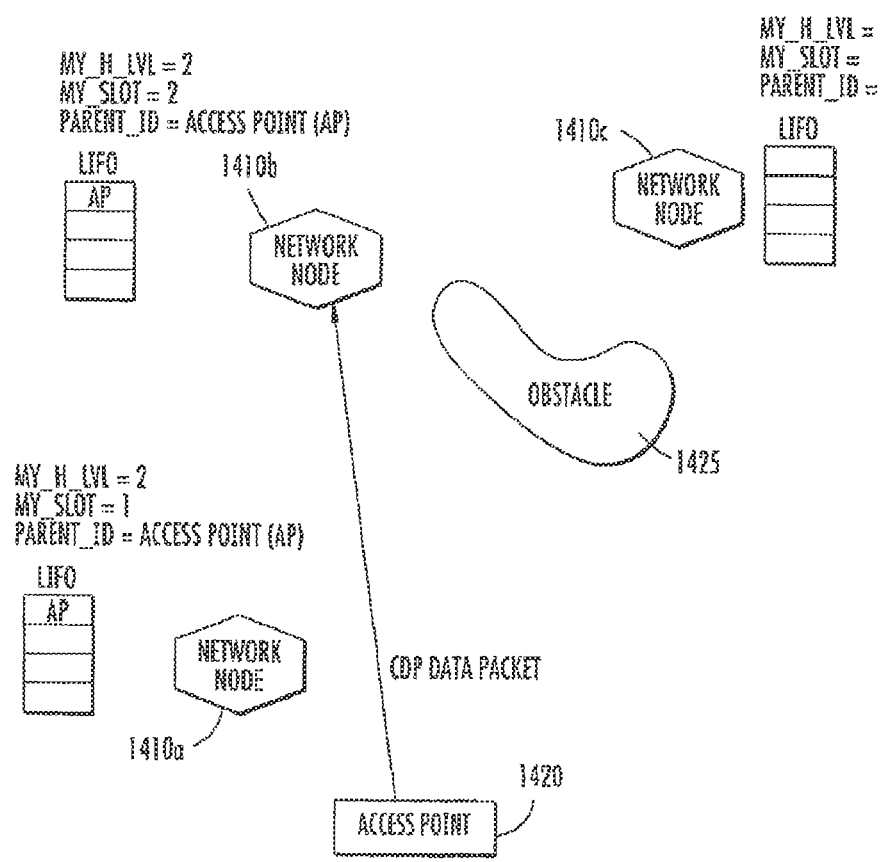

Then, access point 1420 receives the NNDP data packet(s) of network node 1410*b*, for example, during the third random access time slot 220*c*. At this point, as shown in FIG. 14*f*, the access point 1420 transmits a CDP data packet to network node 1410*b* during the third random access time slot 220*c*. After the network node 1410*b* receives the CDP data packet, it copies the time_slot information 920 to MY_SLOT. In this manner, network node 1410*b* is assigned one of the assignable time slots 215*a*, 215*b*, 215*c*, . . . , 215*n*. In this exemplary embodiment, network node 1410*b* is assigned the 2.sup.nd time slot 215*b*.

The CDP also acts as an "acknowledgment" data packet for network node 1410*b*. Thus, as shown in FIG. 14*f*, network node 1410*b* assigns the ID of the access point as the PARENT_ID and assigns the hierarchal level of the access point (e.g., level "1") to the PARENT_H_LVL and also assigns itself an incremented hierarchal level of the hierarchal level of the access point 1420 (i.e., 1+1="2").

Figure 14G:
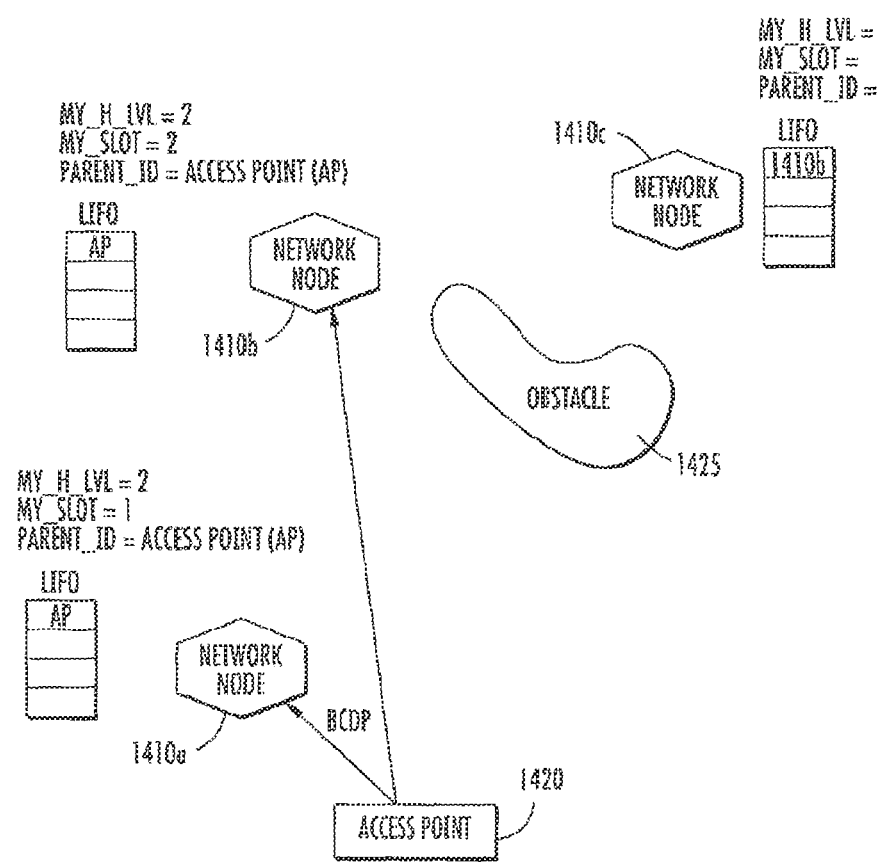
Figure 14H:
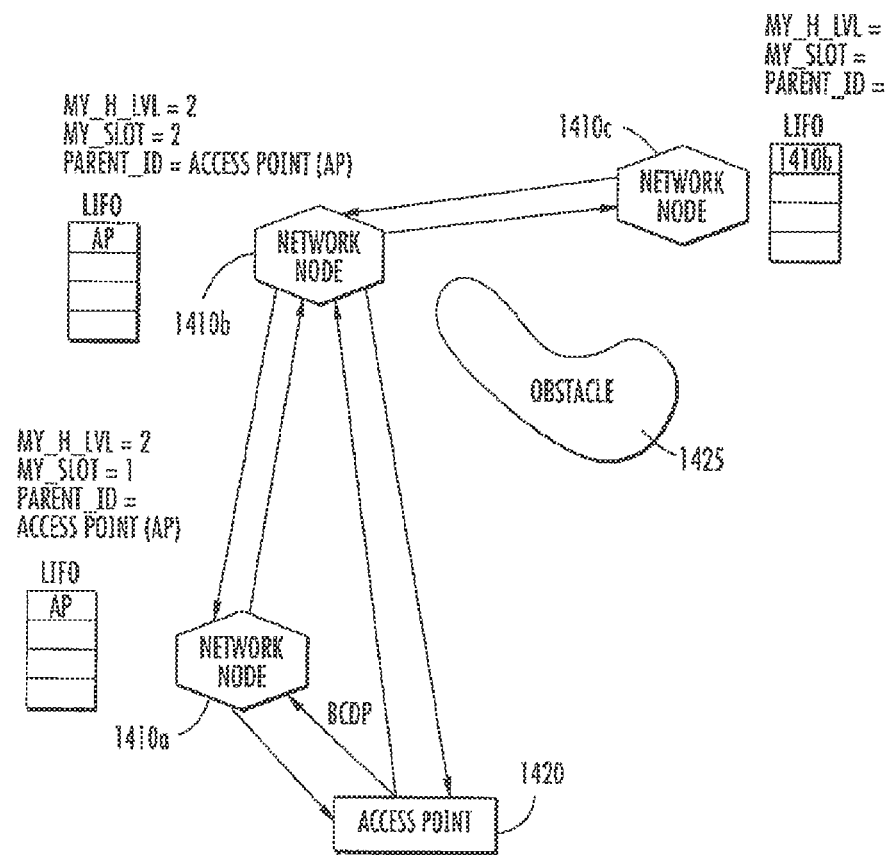

At this point, the first data collection cycle 200 ends and the 2.sup.nd data collection cycle begins. As shown in FIG. 14*g*, the access point 1420 transmits a second BCDP data packet during the broadcast interval 210*c*, the BCDP data packet being received by network nodes 1410*a*, 1410*b*. Then, as shown in FIG. 14*h*, network nodes 1410*a*, 1410*b* retransmit the BCDP after a random time delay. However, unlike the first data collection cycle 200, network node 1410*b* retransmits the BCDP with its hierarchal level (i.e., "2") to network node 1410*c*, which then proceeds to copy the from_ID 625 and the from_hierarchal_level 620 of the BCDP data packet to the top of the stack. That is, the network node 1410*c* places the ID and the hierarchal level of network node 1410*b* on top of its stack.

At this point, the network node 1410*c* begins transmitting NNDP data packet(s) during one of the random access time slots 220*a*, 220*b*, 220*c*, . . . , 220*d* of the random access communications interval 210*b*, since network nodes 1410*c* has not yet been assigned one of the assignable time slots 215*a*, 215*b*, 215*c*, . . . , 215*n* of the time slotted communications interval 210*a*. Network nodes 1410*a*, 1410*b*, however, have already received their respective time slots and, thus, transmit in time slot 215*a*, 215*b* respectively.

Figure 14I:
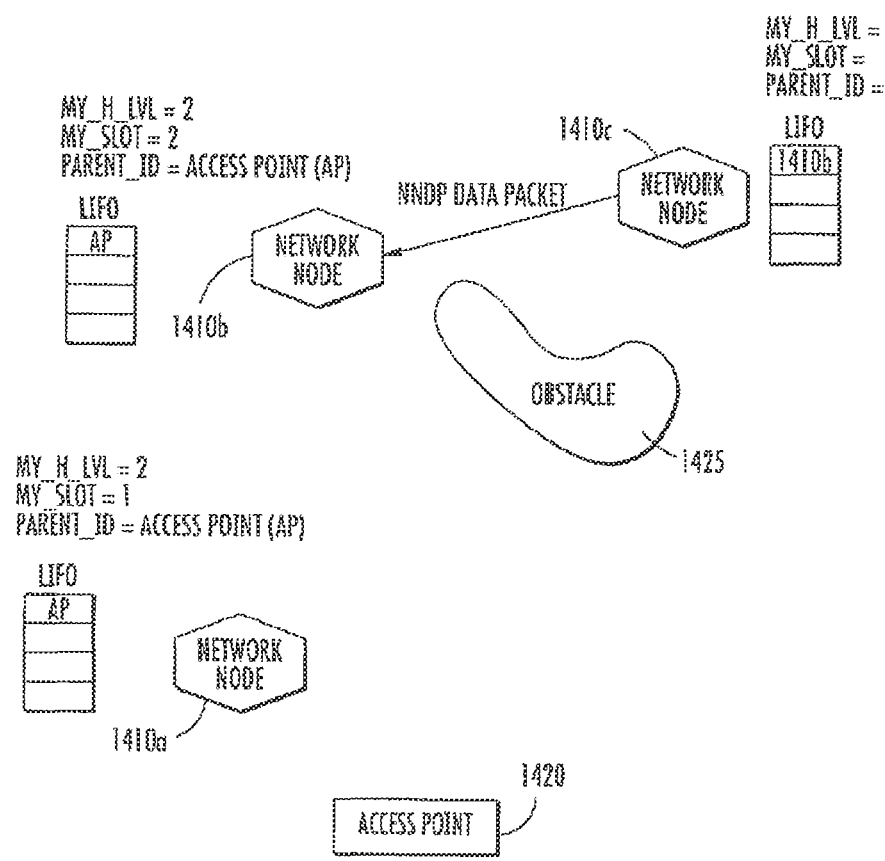
Figure 14J:
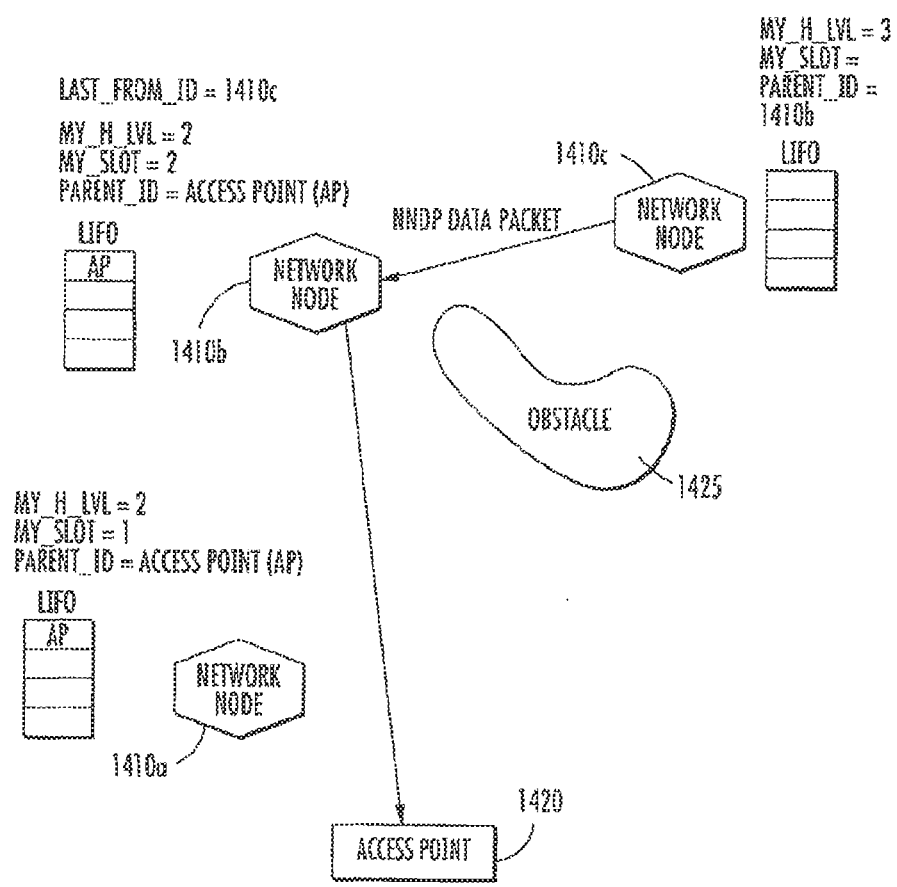

For exemplary purposes only, as shown in FIG. 14*i*, network node 1410*c* transmits a single NNDP data packet during random access time slot 220*a*. Since a PARENT_ID has not yet been assigned, network node 1410*c* transmits the NNDP data packet to the network node whose ID is stored at the top of the stack (i.e., the ID of network node 1410*b*). Then, as shown in FIG. 14*j*, network node 1410*b* retransmits the NNDP data packet to the access point 1420 (NOTE: since network node 1410*c* transmitted the NNDP data packet to the ID at the top of the LIFO stack, this ID has been removed from the stack). At this point, the retransmission of the NNDP by network node 1410*b* to the access point 1420 acts as an acknowledgment to network node 1410*c* that network node 1410*b* has received the NNDP data packet transmitted by network node 1410*c* to network node 1410*b*. Thus, network node 1410*c* assigns network node 1410*b* as the PARENT_ID and assigns itself a hierarchal level (i.e., MY_H_LVL) equal to the hierarchal level of network node 1410*b* incremented by 1 (i.e., 2+1="3"). All subsequent transmissions of NNDP data packets from network node 1410*c* will be transmitted to the network node identified by the PARENT_ID, until communications are lost or until a new network node with a lower hierarchal level is detected and placed on the LIFO stack.

Upon retransmitting the NNDP data packet to the access point 1420, network node 1410*b* saves the from_ID 625 as the LAST_FROM_ID. This step is required so that the network node 1410*b* is able to properly route the subsequent CDP data packet transmitted by the access point 1420 to the network node 1410*c*.

Figure 14K:
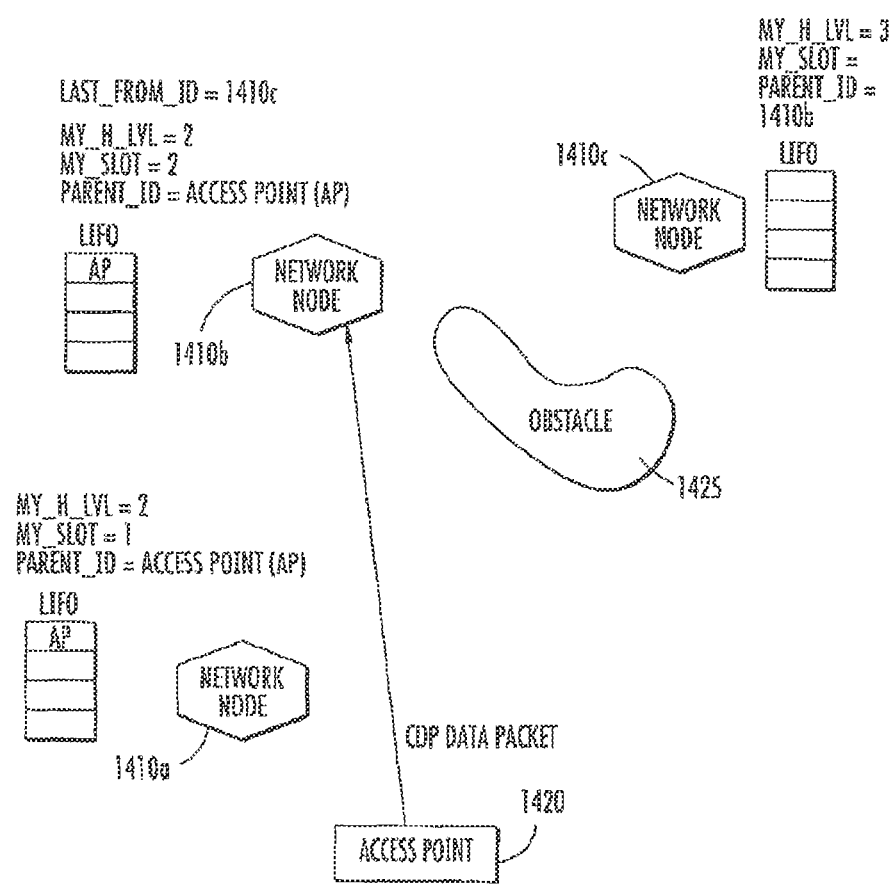

As shown in FIG. 14*k*, the access point 1420 transmits a CDP data packet to acknowledge the receipt of the NNDP data packet transmitted by network node 1410*c*. For this purpose, the access point 1420 uses the same transmission chain as was used to route the NNDP data packet to the access point 1420, except in reverse order. Thus, the access point 1420 transmits the CDP data packet destined for network node 1410*c* to network node 1410*b* (i.e., the to_ID 615 is set to the ID of network node 1410*b* and the destination ID 910 is set to the ID of network node 1410*c*).

Figure 14L:
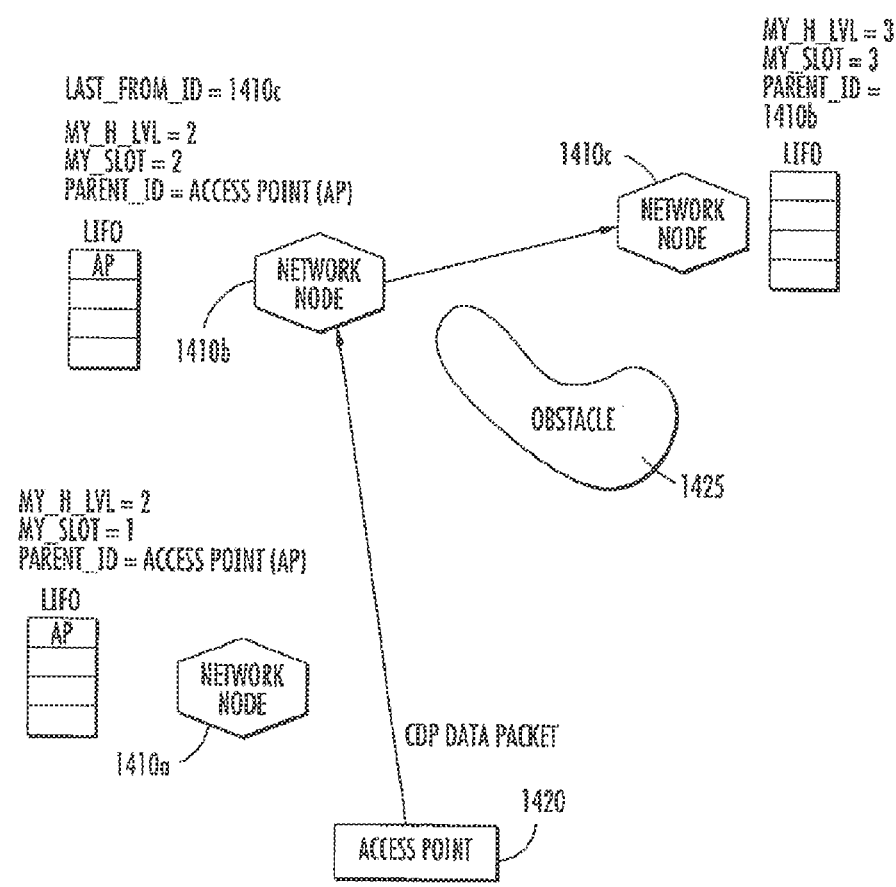

As shown in FIG. 14*l*, after receiving the CDP data packet destined for network node 1410*c*, network node 1410*b* retransmits the CDP data packet to the network node identified by LAST_FROM_ID, i.e., network node 1410*b* retransmits the CDP data packet to network node 1410*c*. After network node 1410*c* receives the CDP data packet, it copies the time_slot information 920 to MY_SLOT. In this manner, network node 1410*c* is assigned one of the assignable time slots 215*a*, 215*b*, 215*c*, . . . , 215*n*. In this exemplary embodiment, network node 1410*c* is assigned the 3rd time slot 215*c*.

In another exemplary embodiment according to the present invention, the source network node retransmits the CDP acknowledgment data packet with a To_ID 615, a From_ID 625, and a Destination_ID 910 equal to MY_ID, i.e., the source network node ID, when the source network node receives the CDP acknowledgment data packet. This retransmission of the CDP acknowledgment data packet may be used by neighboring network nodes, for example, to help determine an assigned time slot. The reliability of the CDP acknowledge message may be increased, for example, by allowing the source network node to retransmit the CDP acknowledge data packet with lower power. In this case, the CDP acknowledge data packet would be received only by neighboring network nodes, the communication links of which permit reliable communication with the source network node.

It should be appreciated that each of the network nodes 1410*a*, 1410*b*, 1410*c* may transmit more than one NNDP data packet within its respective time slot. For example, with respect to the exemplary embodiment discussed immediately above, network node 1410*c* may transmit a plurality of NNDP data packets within its assigned time slot 215*c*. Of course, the present invention permits for any number of NNDP data packets to be transmitted within an assignable time slot 215*a*, 215*b*, 215*c*, . . . , 215*n* or random access time slot 220*a*, 220*b*, 220*c*, . . . , 220*n* by ensuring that each assignable time slot 215*a*, 215*b*, 215*c*, . . . , 215*n* or random access time slot 220*a*, 220*b*, 220*c*, . . . , 220*n* is large enough to accommodate the desired number of NNDP data packets and the maximum number of retransmission required during a chain communication. However, for exemplary purposes only, network node 1410*c* transmits three NNDP data packets within its assigned time slot 215*c*.

To communicate the three data packets during time slot 215*c*, network node 1410*c* may transmit all three NNDP data packets to network node 1410*b* before network node 1410*b* retransmits all three NNDP data packets to access point 1420. By waiting until all three NNDP data packets are received before retransmission of the NNDP data packets, network node 1410*b* avoids collisions which may occur if network node 1410*c* transmits a successive NNDP data packet while network node 1410*b* is retransmitting a previously received NNDP data packet. However, this method of communicating multiple NNDP data packets may be time-consuming if the number of network nodes involved in the chain communication between network node 1410*c* and access point 1420 is too large, as each network node involved in the chain transmission would require a dedicated block of time to receive all NNDP data packets before retransmission.

To avoid such excessive delays, in an alternative embodiment, network node 1410*c* transmits each NNDP data packet in succession with a time delay between transmission of successive NNDP data packets. This time delay should be made large enough to ensure that a network node receiving the NNDP data packet retransmission (i.e., network node 1410*b* in this example) has enough time to retransmit the NNDP data packet to the next device in the chain (i.e., access point 1420 in this example) and to receive an "acknowledgement" packet from the next device before network node 1410*c* transmits the next NNDP data packet. It should be appreciated that, although network node 1410*b* is capable of communicating directly with access point 1420, a similar delay between successively transmitted NNDP data packets would be required if network node 1420*b* could not communicate directly with access point 1420, but rather could only communicate directly with another network node, for example, network node 1410*a*. In this case, the "acknowledgement" packet received by network node 1410*b* would be the NNDP data packet retransmitted by network node 1410*a* to access point 1420. In either case, the time delay between successively transmitted NNDP data packets should be made large enough to ensure that the network node receiving the NNDP data packet in the chain transmission (i.e., network node 1410*b* in this example) has enough time to retransmit the NNDP data packet and to receive an NNDP "acknowledgement" packet before network node 1410*c* transmits subsequent NNDP data packets. In doing so, several packets may be transmitted simultaneously and not interfere with each other. Having several non-interfering packets transmitted by different network nodes at the same time shortens the time required for chain transmission of multiple packets in a time slot.

Figure 16:
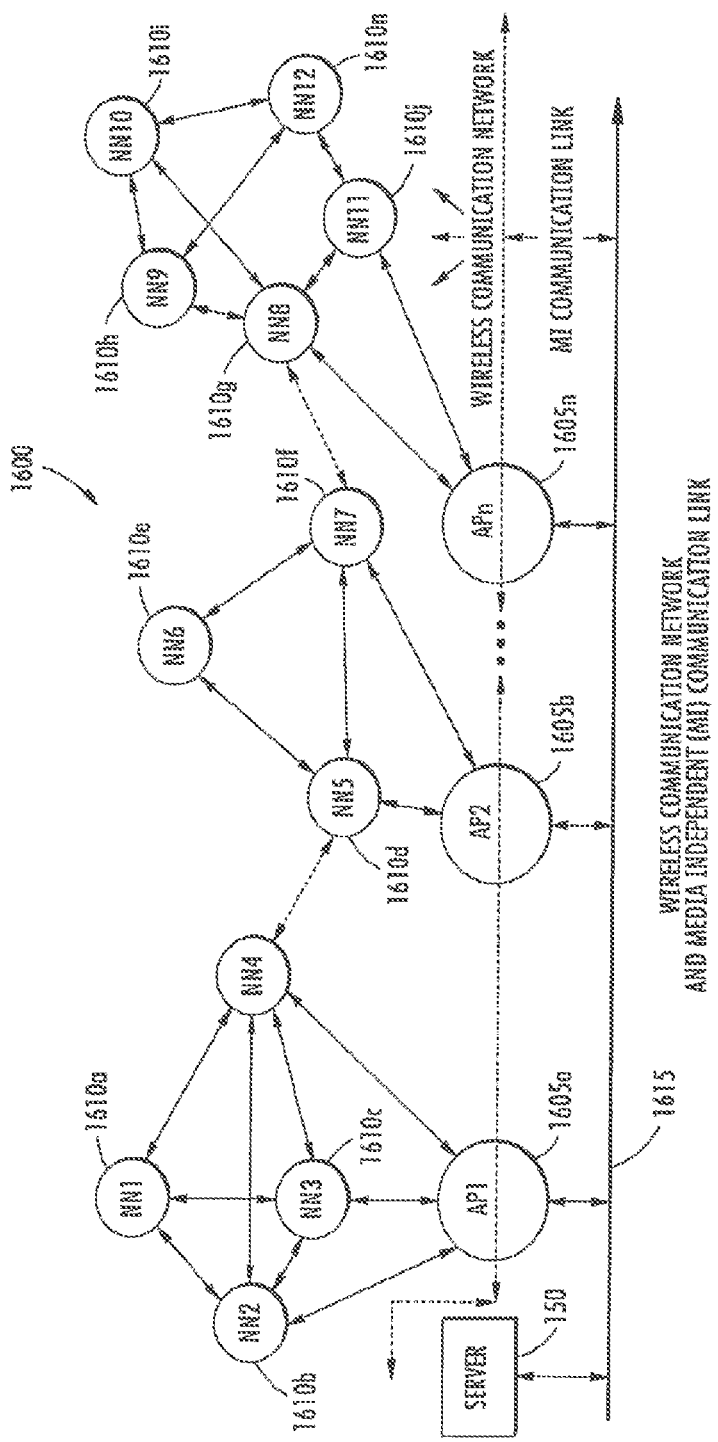
FIG. 16 shows an example timely-organized ad hoc network having multiple access points, according to the present invention.

Referring now to FIG. 16, there is seen an exemplary timely organized ad hoc network 1600 having multiple access points 1605*a*, 1605*b*, . . . , 1605*n*, local server 150 and network nodes 1610*a*, 1610*b*, 1610*c* . . . , 1610*n* operable to communicate BCDP, NNDP and command data packets (CDP) with access points 1605*a*, 1605*b*, . . . , 1605*n*. Multiple access points 1605*a*, 1605*b*, . . . , 1605*n* may be required, for example, when not every network node 1610*a*, 1610*b*, 1610*c* . . . , 1610*n* is capable of communicating with one access point. This may occur, for example, when network nodes are blocked by obstacles; when groups of network nodes 1610*a*, 1610*b*, 1610*c* . . . , 1610*n* are separated by large distances; and/or when a chain communication (the routings) between a network node and an access point may require a large number of intermediate transmissions.

All of the access points 1605*a*, 1605*b*, . . . , 1605*n* are communicatively coupled to each other over a media-independent communication link 1615 (hereinafter "MI link 1615"), which is, in turn, coupled to a local server (with database) 150. MI link 1615 may include, for example, a local area network, a wide area network, the Internet, an Intranet, an Ethernet network, a wireless network, an optical communication link, a power-line communication network, or any other network or medium operable to permit access points 1605*a*, 1605*b*, . . . 1605*n* and server 150 to communicate information with one another.

MI link 1615 is used by each device connected to link 1615, including access points 1605*a*, 1605*b*, . . . 1605*n* and local server 150 to inform the remaining devices connected to link 1615 (e.g., access points 1605*a*, 1605*b*, . . . 1605*n* and/or local server 150) of each transmission or receipt of data packets. In this manner, the server 150 and/or all of the access points 1605*a*, 1605*b*, . . . , 1605*n* are kept aware of the state of the entire ad hoc network 1600 at any given time. This "awareness" ensures that access points 1605*a*, 1605*b*, . . . 1605*n* do not simultaneously transmit information and/or do not assign the same assignable time slot 215*a*, 215*b*, 215*c*, . . . 215*n* to different network nodes 1610*a*, 1610*b*, 1610*c* . . . , 1610*n*. With respect to one exemplary embodiment according to the present invention, each access point 1605*a*, 1605*b*, . . . 1605*n* transmits a copy on MI link 1615 of all data packets wirelessly transmitted and/or received to or from network nodes 1610*a*, 1610*b*, 1610*c*, . . . , 1610*n*. For example, if access point 1605*a* transmits a BCDP or CDP data packet, access point 1605*a* will retransmit a copy of the BCDP or CDP data packet on link 1615. Likewise, if access point 1605*a* receives an NNDP data packet, access point 1605a will retransmit a copy of the NNDP data packet on MI link 1615.

When timely organized ad hoc network 1600 is turned on for the first time, access points 1605a, 1605b, . . . 1605n and other devices connected to MI link 1615 transmit BCDP data packets in sequence within the broadcast time interval 210c of data collection cycle 200. Thus, the broadcast interval 210c must be large enough to accommodate sequential transmission of respective broadcast packets by multiple access points 1605a, 1605b, . . . 1605 and to ensure that all network nodes 1610a, 1610b, 1610c . . . , 1610n in all hierarchal levels retransmit the BCDP data packets within the Broadcast Time Interval 210c. The length of the broadcast interval will be determined by the number of devices on MI link 1615 and/or by the number of hierarchical levels (whichever is bigger) in ad hoc network 1600. With respect to one exemplary embodiment, broadcast interval 210a is made large enough to accommodate all access points in ad hoc network 1600 (i.e., access points 1605a, 1605b, . . . 1605n), as well as all network nodes 1610a, 1610b, 1610c, . . . , 1610n dispersed across all hierarchal levels. It should be appreciated that ad hoc network 1600 may include any number of access points or network nodes and, as such, broadcast interval 210c may be made as large or as small as required to accommodate all devices in ad hoc network 1600.

With respect to one exemplary embodiment according to the present invention, each device connected to the MI link 1615 (e.g., each access point 1605a, 1605b, . . . 1605n and/or server 150) is assigned a different "time-out" period, after which the BCDP data packet is transmitted. Each respective time-out period may be determined, for example, in accordance with the unique ID (i.e., MY_ID) assigned to each access point 1605a, 1605b, . . . 1605n. If the time-out period of a particular access point 1605a, 1605b, . . . 1605n expires, that access point will wirelessly transmit a BCDP data packet, while simultaneously (or some time thereafter) transmitting a copy of the BCDP data packet to the remaining access points 1605a, 1605b, . . . , 1605n via link 1615. Once a particular access point transmits its BCDP data packet, that particular access point remains dormant until the end of the broadcast interval (i.e., until the synchro_delay expires). The remaining access points 1605a, 1605b, . . . , 1605n, however, do not remain dormant. Rather, upon receiving the BCDP data packet over link 1615, each of the remaining access points 1605a, 1605b, . . . , 1605n restarts its time-out period, and the BCDP transmit cycle repeats within the broadcast interval 210c until all remaining access points 1605a, 1605b, . . . , 1605n transmit a BCDP data packet. Each of access points 1605a, 1605b, . . . , 1605n transmits a similar BCDP data packet, except that the FROM_ID and the AP_ID of each transmitted BCDP packet is changed to the ID of the particular access point transmitting the packet. Furthermore, each of access points 1605a, 1605b, . . . , 1605n (except the first one—i.e., the originator of the first BCDP data packet) adjusts the Synchro_Delay number 715 by an appropriate amount to account for the amount of time required to retransmit a BCDP data packet after receiving the BCDP data packet over MI link 1615. For example, with respect to one exemplary embodiment, each of access points 1605a, 1605b, . . . , 1605n subtracts an appropriate amount of time (e.g., time units) from the Synchro_Delay number 715 representing a time delay between receipt of a BCDP data packet over MI link 1615 and retransmission of the BCDP data packet to network 1600. Each of access points 1605a, 1605b, . . . , 1605n also adjusts the total number of assigned time slots 215a, 215b, 215c, . . . , 215n within the assigned time_slotted communications interval 210a to separate the Random Access Time Slotted Interval 210b established by previous access points. In this case, every access point establishes a respective random access time intervals 210b, which does not overlap with other time intervals 210b established by other access points.

Figure 17A:
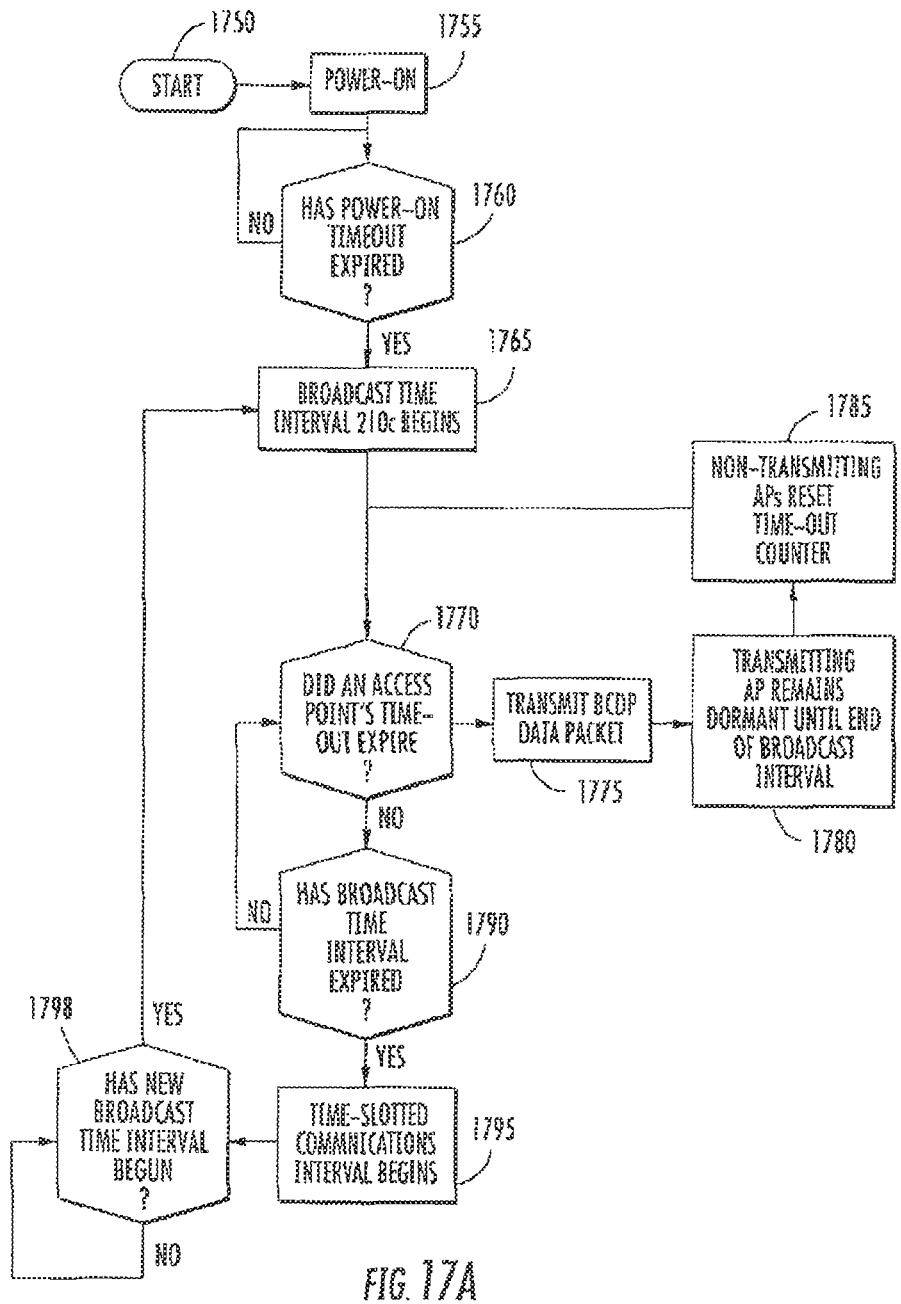
FIG. 17a shows an operational flow of BCDP transmission in a multiple access point, timely organized ad hoc network according to the present invention.

Referring to FIG. 17a, there is seen an operational flow of BCDP transmission in a multiple access point timely organized ad hoc network 1600. The sequence begins at start step 1750, and progresses to step 1755 upon power-up. After ad hoc network 1600 powers up, all devices connected to MI link 1615 (e.g., access points 1605a, 1605b, . . . , 1605n and/or server 150) begin a power-on timeout counter to ensure that all access points 1605a, 1605b, . . . , 1605n have enough time to initialize. After the power-on timeout expires (see step 1760), broadcast time interval 210c begins in step 1765. At this stage of the sequence, each device connected to MI link 1615 (e.g., access points 1605a, 1605b, . . . , 1605n and/or server 150) resets an internal clock to begin countdown of an internal "time-out" period, which is used to mark a transmit time for a BCDP data packet. Since the time-out periods differ from one another (see above), no two time-out periods will expire at the same time.

Once the time-out period of one of the access points 1605a, 1605b, . . . , 1605n expires (see step 1770), that access point, for example, access point 1605a, wirelessly transmits a BCDP data packet to the network nodes 1610a, 1610b, 1610c, . . . , 1610n (see step 1775) and then remains dormant for the remainder of the broadcast time interval 210c (see step 1780).

In addition to wirelessly transmitting each BCDP to the network nodes 1610a, 1610b, 1610c, . . . , 1610n, access point 1605a transmits a copy of the BCDP data packet to the remaining access points 1605b, 1605c, . . . , 1605n via MI link 1615. In this manner, access points 1605a, 1605b, . . . , 1605n are kept aware of all packets transmitted and/or received by other access points 1605a, 1605b, . . . , 1605n. Thus, the dynamic self-routing protocol employed by ad hoc network 1600 permits each access point to individually determine the total number of hierarchal levels and access points 1605a, 1605b, . . . , 1605n in ad hoc network 1600. For example, after transmitting its own BCDP data packet, access point 1605a will listen to MI link 1615 during the remainder of the broadcast interval 210c. By simply counting the number of BCDP packets communicated over MI link 1615 during the broadcast time interval, access point 1605a can determine the total number of access points 1605a, 1605b, . . . , 1605n in ad hoc network 1600, and by "listening" to transmitting network nodes 1610a, 1610b, 1610c, . . . , 1610n over the wireless network and the MI link 1615 during data collection cycle 200, access point 1605a can determine the total number of network nodes and hierarchal levels within network 1600.

After the remaining access points 1610b, 1610c, . . . , 1610n receive the copied BCDP data packet transmitted by access point 1605a over MI link 1615, the remaining access points 1610b, 1610c, . . . , 1610n reset their time-out counters, thereby restarting their respective time-out periods (see step 1785). The sequence then proceeds back to step 1770. As can be readily appreciated, the above-described sequence will repeat until all access points 1605a, 1605b, . . . , 1605n transmit a BCDP data packet during the broadcast time interval 210c.

As each access point 1605a, 1605b, . . . , 1605n transmits a BCDP data packet, an appropriate amount of time unit delay is subtracted from the synchro_delay number 715 (Byte 6) of successively transmitted broadcast data packets BCDPs. This is required to ensure that all devices within network 1600 (e.g., network nodes 1610a, 1610b, 1610c, . . . , 1610n, access points 1605a, 1605b, . . . , 1605n, and/or server 150) are "synchronized" in the sense that all the devices begin the time slotted communication interval 210a at the same time.

Access points 1605a, 1605b, . . . , 1605n also monitor the synchro_delay number 715 (i.e., Byte 6 of the Broadcast Data structure illustrated in FIG. 7) in step 1790 to determine whether the broadcast time interval 210c has ended. If so, the time slotted communications interval 210a begins (see step 1795), and BCDP data packet transmission does not resume until the beginning of the next broadcast time interval 210c (or supplementary broadcast time interval 210d—see below) (see step 1798).

Figure 17B:
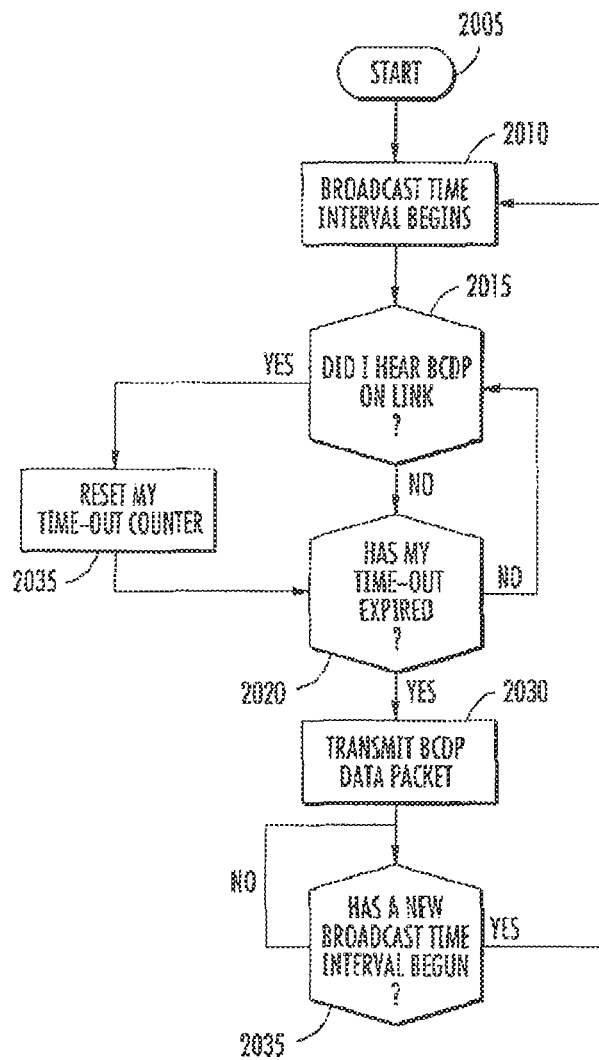
FIG. 17b shows an operational sequence of a single access point during a broadcast time interval.

Referring now to FIG. 17b, there is seen an operational sequence of a single access point, for example, access point 1605a, during broadcast time interval 210c. The sequence begins at step 2005 and proceeds to step 2010, at which time the broadcast time interval 210c (or supplemental broadcast time interval 210d) begins. At this time, access point 1605a restarts its time-out interval and listens to MI link 1615 in step 2015 to determine whether any other access points 1605b, 1605c, . . . , 1605n transmitted a BCDP data packet. If not, the sequence proceeds to step 2020, during which access point 1605a checks whether its time-out interval has expired. If the interval did not expire, the sequence proceeds back to step 2015. If access point 1605a detects a BCDP transmission from another access point in step 2015, access point 1605a restarts its time-out interval counter (see step 2025) and then proceeds to step 2020.

If access point 1605a determines that its time-out interval has expired (see step 2020), access point 1605a transmits a BCDP data packet in step 2030 and then waits until the beginning of the time slotted communications interval 210a to begin processing NNDP and CDP data packets. Access point 1605a will not transmit additional BCDP data packets until the beginning of the next broadcast time interval (i.e., until the beginning of the next normal or supplementary broadcast time interval—see below). Once a new broadcast time interval is detected (see step 2035), the sequence repeats by proceeding back to step 2010.

Figure 18A:
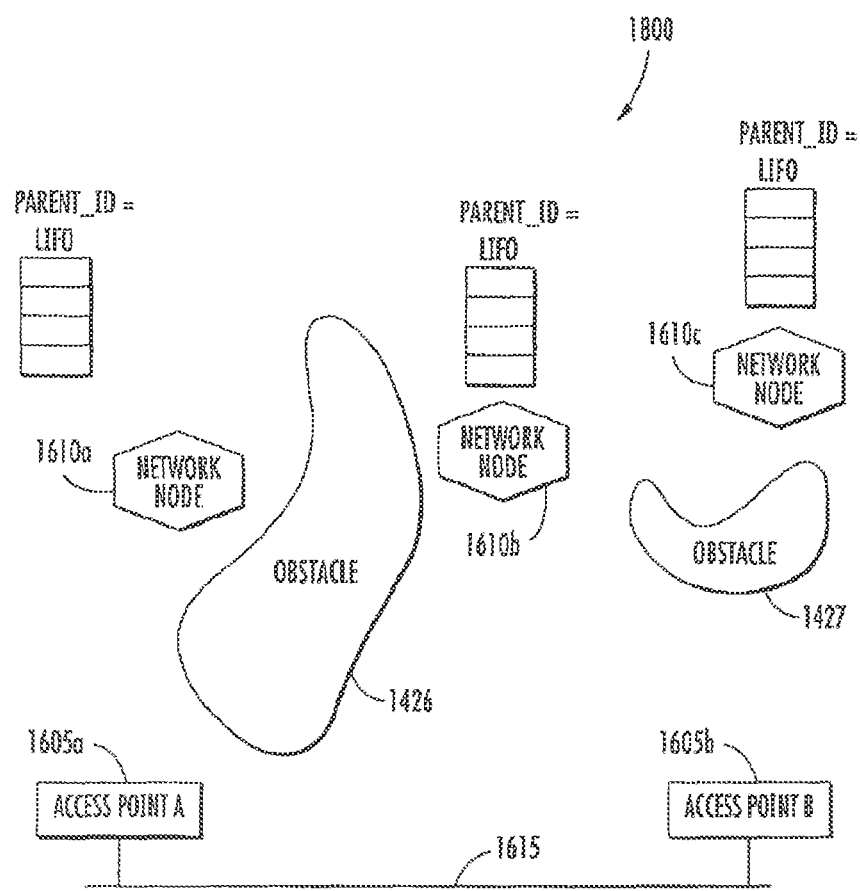
FIGS. 18a through 18i show an example timely organized ad hoc wireless network having multiple access points according to the present invention.

Referring now to FIGS. 18a through 18i, there is seen an exemplary timely organized ad hoc wireless network 1800 having multiple access points upon power up. As shown in FIG. 18a, the network 1800 includes network nodes 1610a, 1610b, and 1610c, as well as access points (A and B) 1605a, 1605b communicatively coupled to one another via MI link 1615. In this exemplary embodiment, network node 1610a is capable of directly communicating only with access point 1605a, and network node 1610b is capable of communicating only with access point 1605b, due to obstacle 1426. Network node 1610c is capable of communicating only with network node 1610b, since obstacles 1426, 1427 prevent network node 1610c from directly communicating with both access points 1605a, 1605b, as well as network node 1610a.

As shown in FIG. 18a, upon power up, none of the network nodes 1610a, 1610b, 1610c has assigned itself a hierarchal level, a PARENT_ID, or Access Point Affiliation AP_ID. Also, none of the network nodes 1610a, 1610b, 1610c has a network node ID or AP_ID at the top of its respective LIFO stack. Similar to the ad hoc network of FIGS. 14a through 14l, upon power up, each of the network nodes 1610a, 1610b, 1610c is in a "listening" state, in which it waits for a BCDP data packet to be received.

Figure 18B:
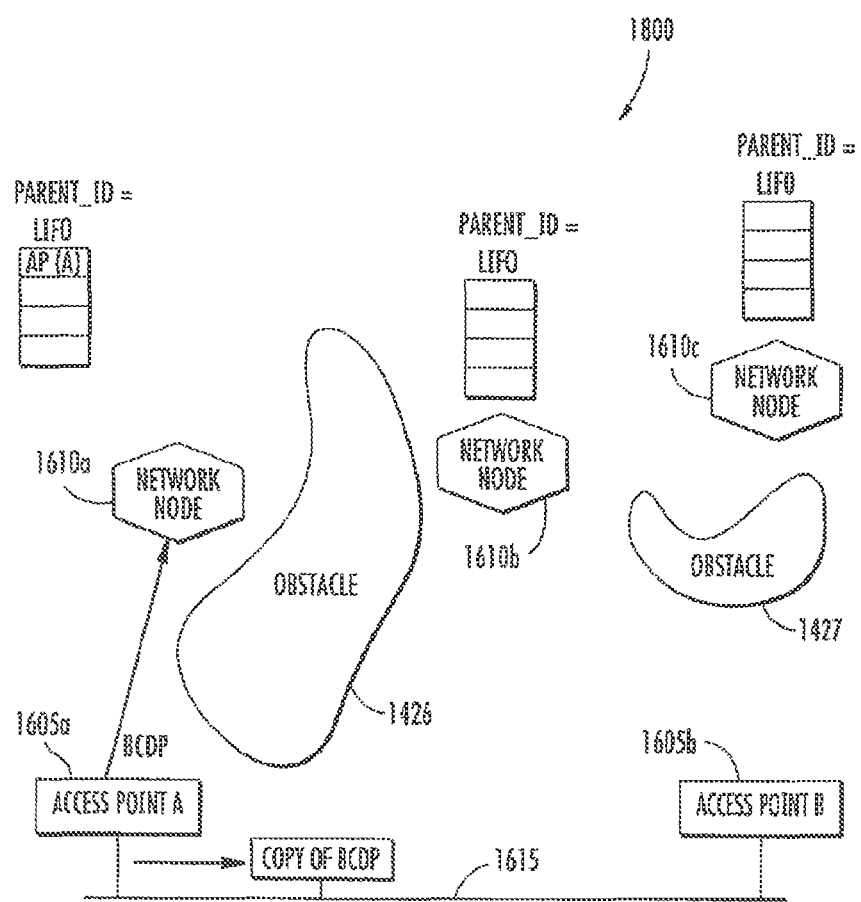

Referring now to FIG. 18b, access point 1605a transmits the first BCDP data packet wirelessly toward network nodes 1610a, 1610b, 1610c and over link 1615 to access point 1605b, in a manner more fully described above. The BCDP data packet is received only by network node 1610a, which processes the BCDP data packet according to step 1120 of FIG. 11. In this manner, network node 1610a determines that the BCDP data packet was transmitted by access point 1605a (Access Point A), since the from_ID 625 of the BCDP data packets identifies access point 1605a. With respect to the exemplary embodiment of FIGS. 18a through 18i, access points 1605a, 1605b are assigned unique MY_IDs so that network nodes 1610a, 1610b, and 1610c can determine from which access point a particular BCDP data packet was transmitted. As shown in FIG. 18b, network node 1610a copies the FROM_ID 625 of access point 1605a and pushes the from_hierarchal_level 620 (i.e., level "1" for access points) of the BCDP data packet to the top of the LIFO stack. Network node 1610a also pushes the Affiliated Access Point's AP_ID to the top of its LIFO stack.

Figure 18C:
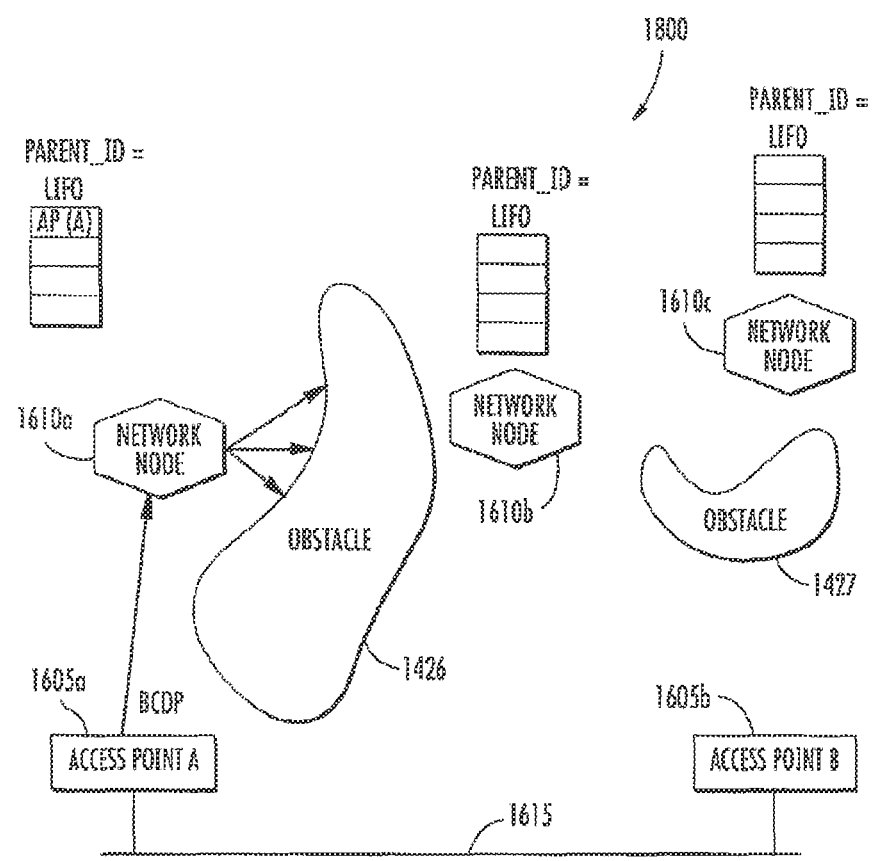

Then, as shown in FIG. 18c, network node 1610a retransmits the BCDP after a random delay. As described above, this is required to ensure that all devices within network 1600 (e.g., network nodes 1610a, 1610b, 1610c, . . . , 1610n, access points 1605a, 1605b, . . . , 1605n, and/or server 150) are "synchronized" in the sense that all the devices end the broadcast time interval 210c and begin the time slotted communication interval 210a at the same time. However, since neither network node 1610b nor network node 1610c can communicate with network node 1610a or access point 1605a, network nodes 1610b, 1610c neither receive nor retransmit the BCDP transmitted by access point 1605a.

Figure 18D:
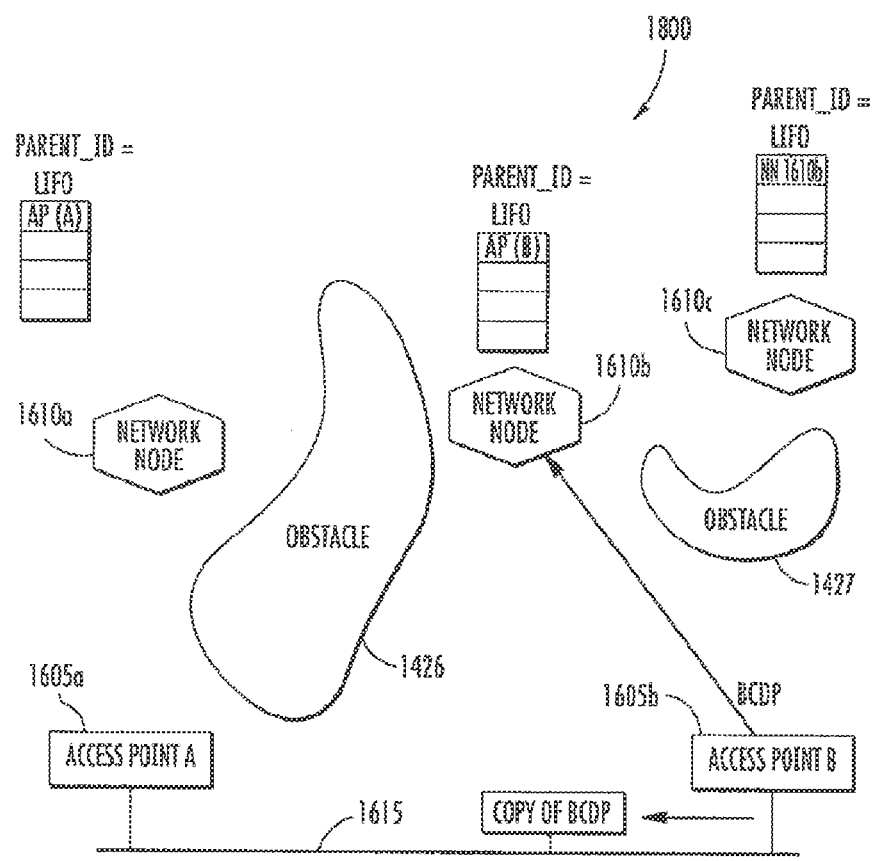

Next, as shown in FIG. 18d, access point 1605b transmits a second BCDP data packet toward network nodes 1610a, 1610b, 1610c and over MI link 1615 to access point 1605a. The BCDP data packet is received only by network node 1610b, which processes the BCDP data packet according to step 1120 of FIG. 11, as described above. In this manner, network node 1610b determines that the BCDP data packet was transmitted by access point 1605b, since the from_ID 625 of the BCDP identifies access point 1605b. Network node 1610b then copies the from_ID 625 of access point 1605b and the from_hierarchal_level 620 (i.e., level "1" for access points) of the BCDP data packet to the top of the LIFO stack, as shown in FIG. 18d. Network node 1610b also pushes the Affiliated Access Point's AP_ID (i.e., access point 1605b) to the top of its LIFO stack.

Figure 18E:
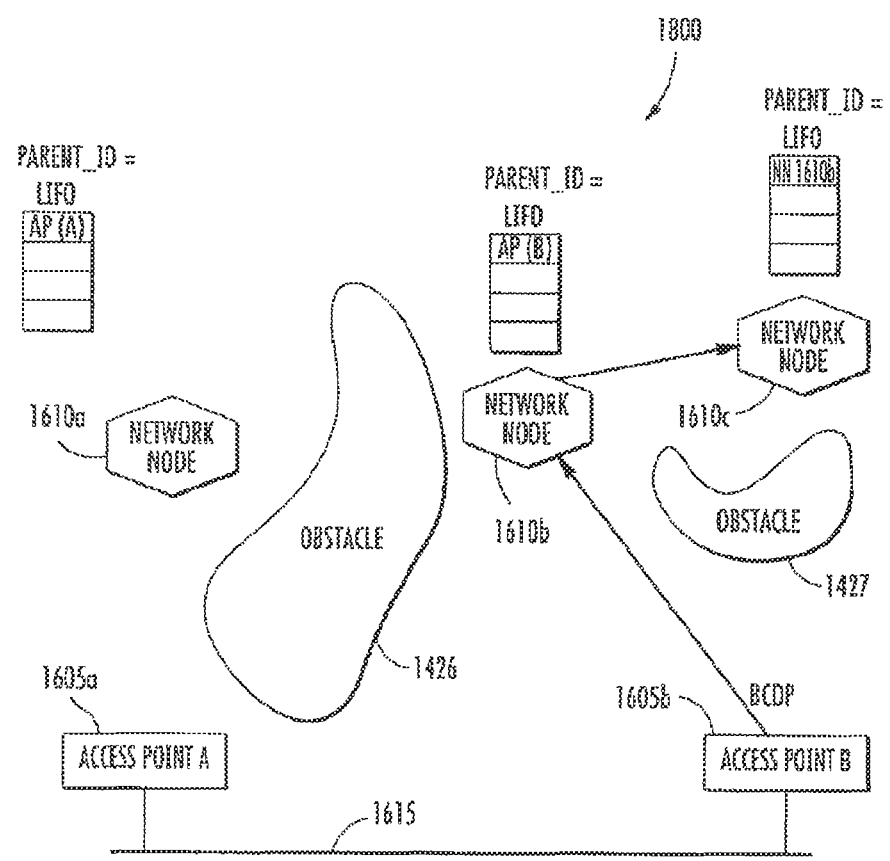

Then, as shown in FIG. 18e, network node 1610b retransmits the BCDP after a random delay, as described above. Network node 1610c receives the retransmitted BCDP data packet, which contains the AP_ID 710, the FROM_ID 625 of network node 1610b, and the hierarchal level of network node 1610b (e.g., level "2"). Network node 1610c pushes this information to the top of its LIFO stack and retransmits the BCDP data packet in a manner more fully described above with respect to the exemplary embodiment illustrated in FIGS. 14a through 14l. The retransmissions of BCDP packets could be performed with power reduction (0 dB or more) to ensure that the parent ID, which is derived from BCDP packets and used by network nodes for routings, is most reliable.

After the broadcast time interval 210c ends, each of the network nodes 1610a, 1610b, and 1610c begins to transmit NNDP data packet(s) during one of the random access time slots 220a, 220b, 220c, . . . , 220d of the random access communications interval 210b, since none of the network nodes 1610a, 1610b, or 1610c has yet been assigned one of the assignable time slots 215a, 215b, 215c, . . . , 215n of the time slotted communications interval 210a.

Figure 18F:
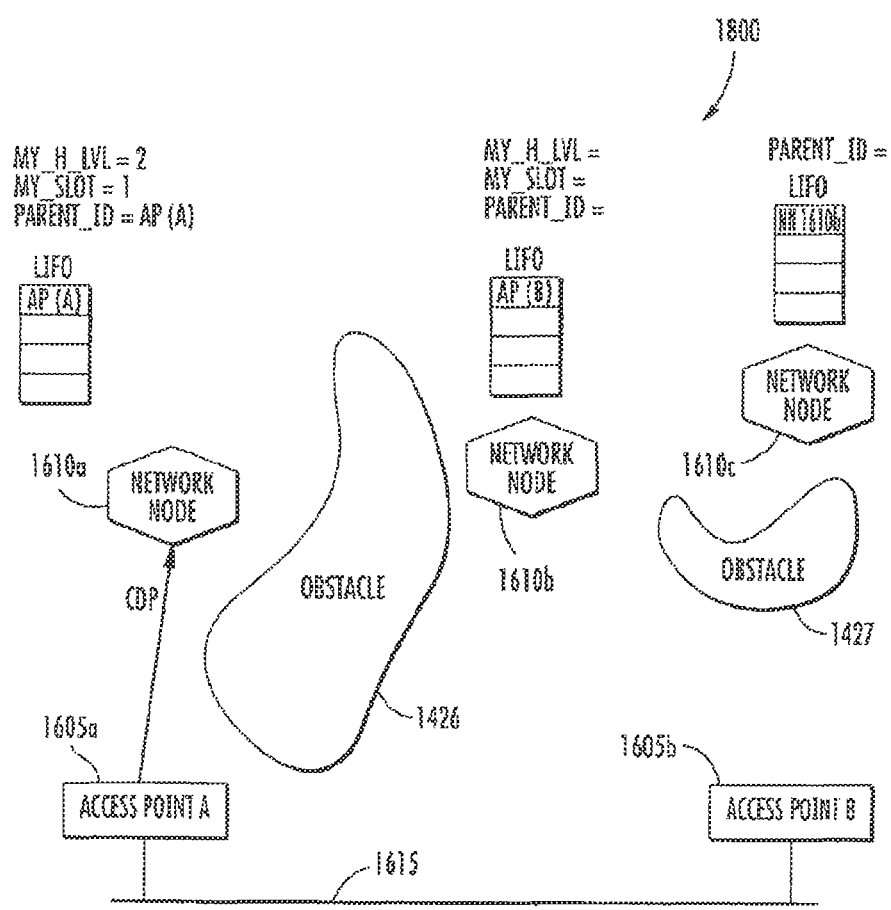

For exemplary purposes only, access point 1605a receives the NNDP data packet(s) of network node 1610a first, for example, during the first random access time slot 220a. At this point, as shown in FIG. 18f, the access point 1605a transmits a CDP data packet to network node 1610a during the first random access time slot 220a. After the network node 1610a receives the CDP data packet, it copies the time_slot information 920 to MY_SLOT. In this manner, network node 1610a is assigned one of the assignable time slots 215a, 215b, 215c, ..., 215n. In this exemplary embodiment, network node 1610a is assigned the 1st time slot 215a. Network node 1610a also assigns the ID of access point 1605a as the PARENT_ID and assigns the hierarchal level of access point 1605a (e.g., level "1") to the PARENT_H_LVL, as well as assigning itself an incremented hierarchal level of the hierarchal level of access point 1605a (i.e., 1+1="2"). Network Node 1610a retransmits the received CDP data packet with reduced power (0 db or more) to "announce" to network 1600 a successful communication session. Neighboring network nodes that receive (i.e., hear) the retransmission of the CDP data packet, may (but not necessarily) push the ID of the retransmitting network node (i.e., network node 1605a in this example) to the top of their respective LIFO stacks, as receipt of the retransmitted CDP may indicate that the transmitting network node (i.e., network node 1605a in this example) may be used in part of a subsequent chain communication (routing).

Figure 18G:
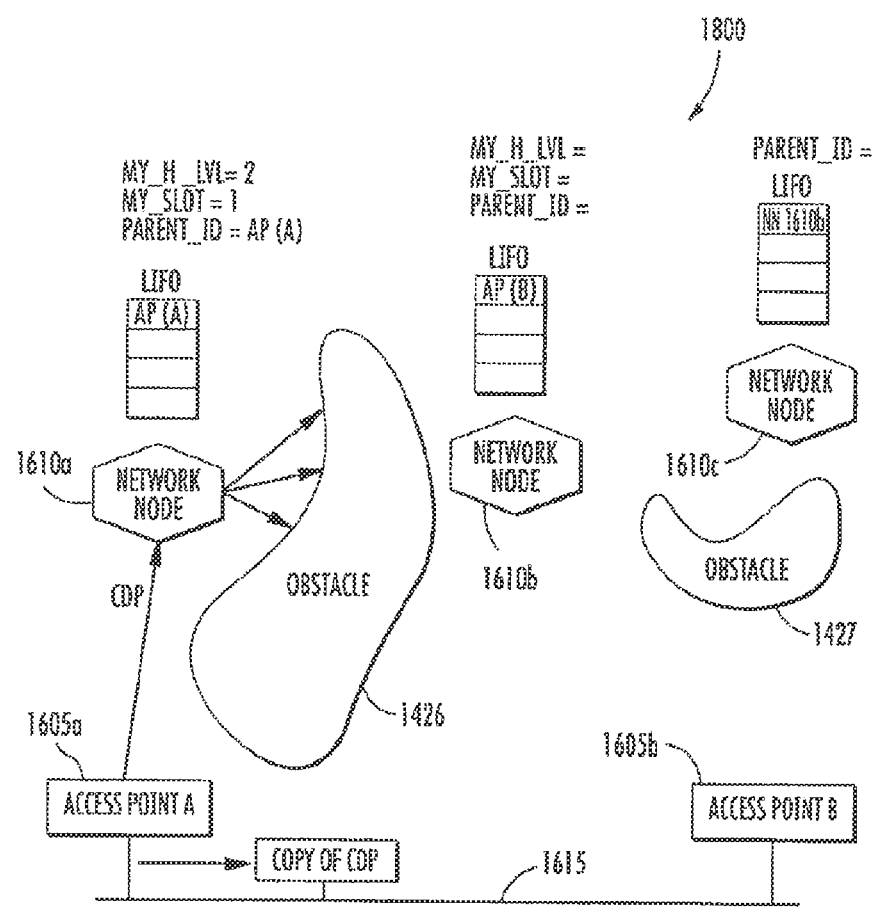

At the same time or immediately thereafter, access point 1605a transmits a copy of the CDP data packet over link 1615, as shown in FIG. 18g. The copied CDP data packet is received by access point 1605b, thereby enabling access point 1605b to determine that the 1st time slot 215a has now been assigned.

Sometime thereafter, access point 1605b receives the NNDP data packet(s) of network node 1610b, for example, during the third random access time slot 220c. At this point, the access point 1605b transmits a CDP data packet to network node 1610b during the third random access time slot 220c. Network Node 1610b retransmits the received CDP data packet with reduced power (0 dB or more) to "announce" to network 1600 a successful communication session. Neighboring network nodes that receive (i.e., hear) the retransmission of the CDP data packet, may (but not necessarily) push the ID of the retransmitting network node (i.e., network node 1605b in this example) to the top of their respective LIFO stacks. After the network node 1610b receives the CDP data packet, it copies the time_slot information 920 to MY_SLOT. In this manner, network node 1610b is assigned one of the assignable time slots 215a, 215b, 215c, ..., 215n. In this exemplary embodiment, network node 1610b is assigned the 2nd time slot 215b. Network node 1610b also assigns the ID of access point 1605b as the PARENT_ID and assigns the hierarchal level of access point 1605b (e.g., level "1") to the PARENT_H_LVL and also assigns itself an incremented hierarchal level of the hierarchal level of access point 1605b (i.e., 1+1="2").

Figure 18H:
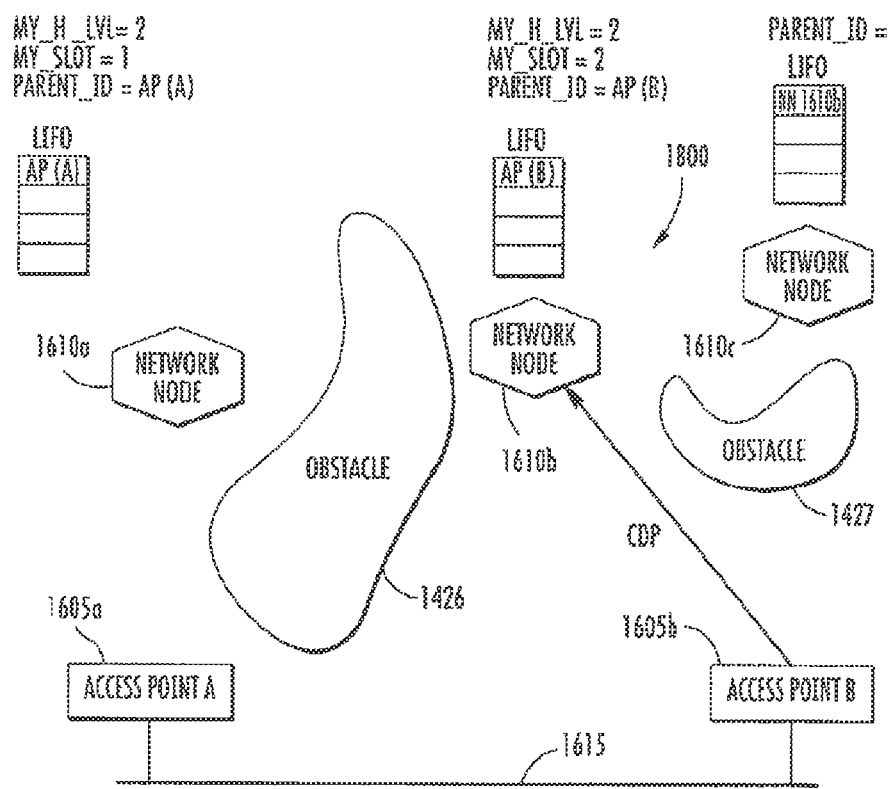
Figure 18I:
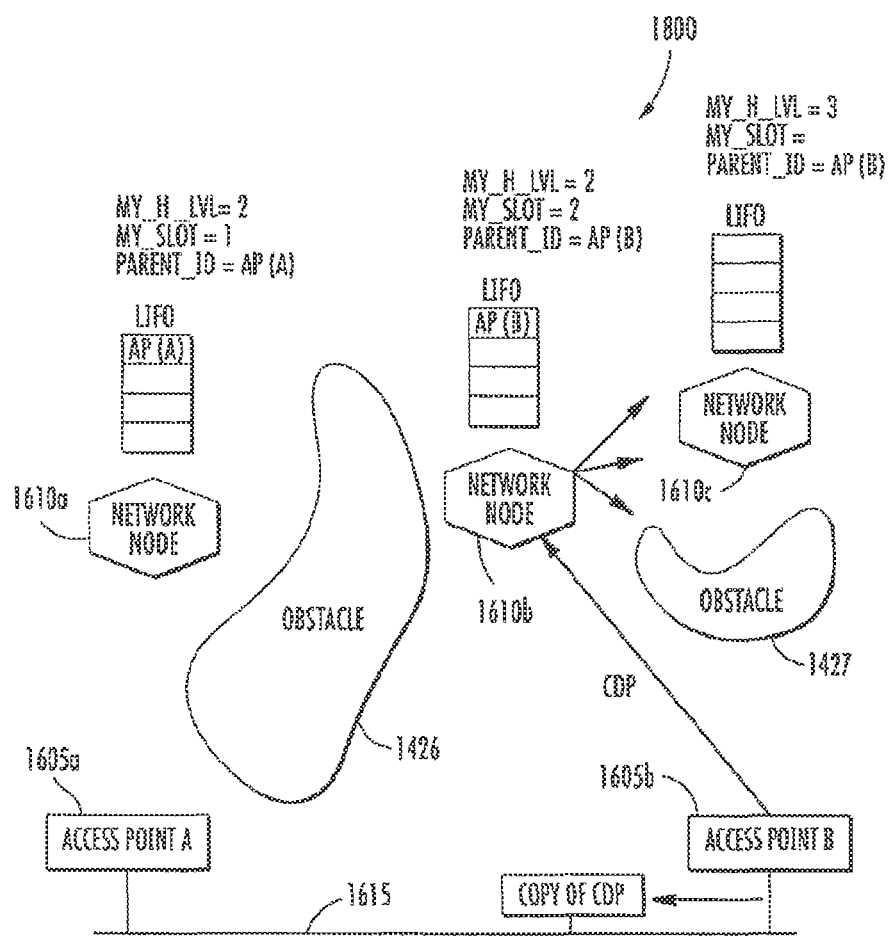

At the same time or immediately thereafter, access point 1605b transmits a copy of the CDP data packet over link 1615, as shown in FIG. 18i. The copied CDP data packet is received by access point 1605a, thereby enabling access point 1605a to determine that the 2nd time slot 215b has been assigned.

Then, access point 1605b receives the NNDP data packet(s) of network node 1610c through network node 1610b, for example, during the random access time slot 220n. At this point, as shown in FIG. 18h, the access point 1605b transmits a CDP data packet with destination address of 1610c (destination_ID 910) to network node 1610b, and network node 1610b retransmits the CDP packet to network Node 1610c during the random access time slot 220n. Network Node 1610c retransmits the received CDP data packet with reduced power to "announce" to network 1600 a successful communication session. Neighboring network nodes that receive (i.e., hear) the retransmission of the CDP data packet, may (but not necessarily) push the ID of the retransmitting network node (i.e., network node 1610c in this example) to the top of their respective LIFO stacks, as receipt of the retransmitted CDP may indicate that the transmitting network node (i.e., network node 1610c in this example) may be used in part of a subsequent chain communication routing. Subsequent communication with network node 1610c in a chain communication need not be performed at reduced power. Measuring the received signal strength indication (RSSI) or measuring the received data bit error rate (BER) by the network node is used also or in place of reduced power transmission as an indicator for reliable Network Node partner for routings.

After the network node 1610c receives the CDP data packet, it copies the time_slot information 920 to MY_SLOT. In this manner, network node 1610c is assigned one of the assignable time slots 215a, 215b, 215c, ..., 215n. In this exemplary embodiment, network node 1610c is assigned the 3rd time slot 215c. Network node 1610c also assigns the ID of network node 1610b as the PARENT_ID and assigns the hierarchal level of network node 1610b (e.g., level "2") to the PARENT_H_LVL and also assigns itself an incremented hierarchal level of the hierarchal level of NN 1610b (i.e., 2+1="3").

At the same time or immediately thereafter, access point 1605b transmits a copy of the CDP data packet over link 1615, as shown in FIG. 18i. The copied CDP data packet is received by access point 1605a, thereby enabling access point 1605a to determine that the 3rd time slot 215c has been assigned.

At this point, the first data collection cycle 200 ends and the 2nd data collection cycle begins. After each collection cycle 200, access points 1605a, 1605b can determine the number of network nodes in ad hoc network 1600 by the number of assignable time slots 215a, 215b, 215c, ..., 215n assigned during the collection cycle 200. Communication proceeds much the same away as described with respect to the exemplary embodiment of FIGS. 14a through 14l.

The dynamic self-routing protocol described above permits ad hoc network 1600 to synchronize multiple network nodes, regardless of which Access Point was the source of the received broadcast. Since each network node is automatically assigned to an access point, implementation of additional access points and/or the routing of additional network nodes may be achieved without requiring additional complex routing software and/or hardware. Additional access points may be added as desired, with the dynamic self-routing protocol, described above, automatically adapting.

Figure 19:
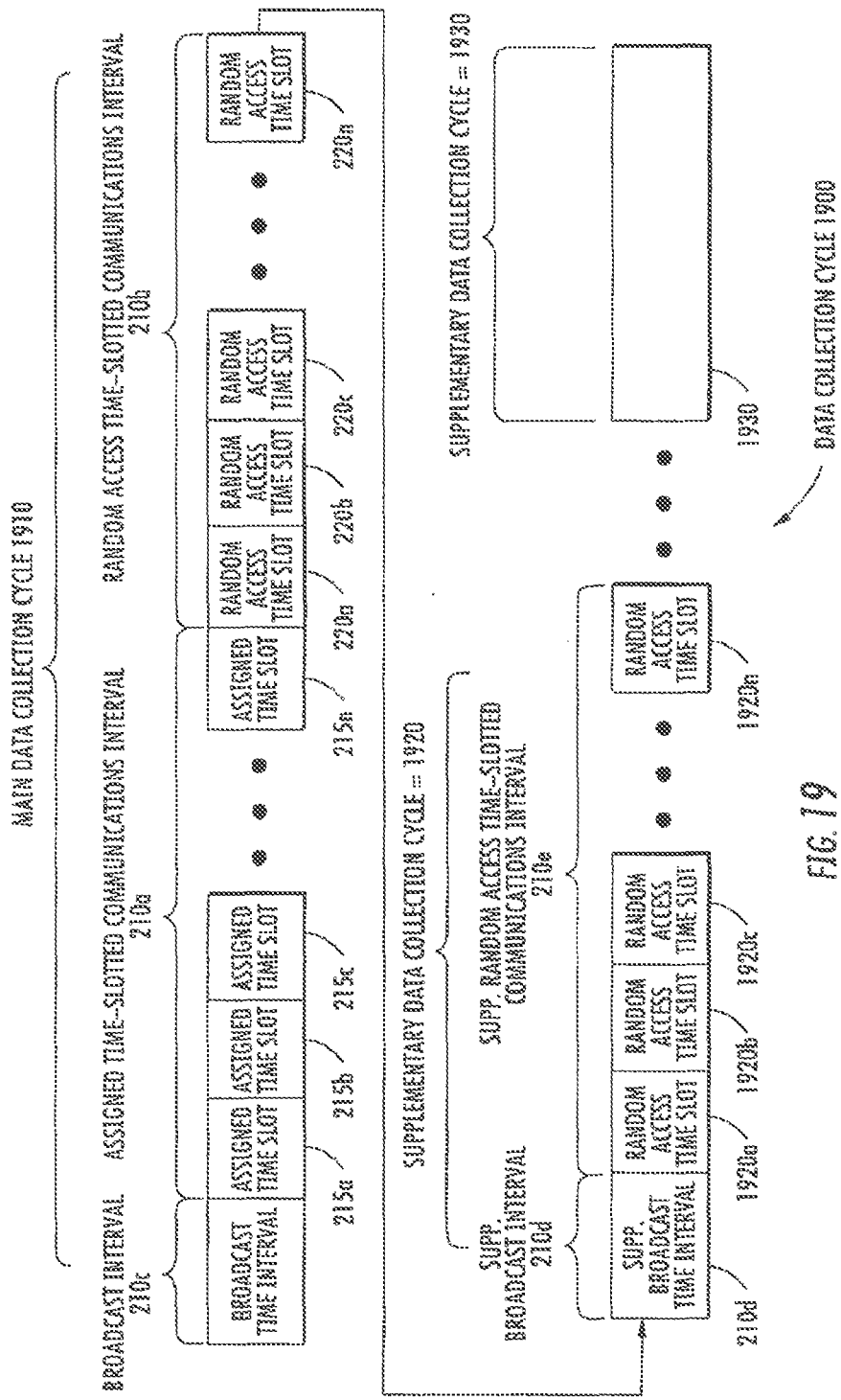
FIG. 19 shows an example of a main data collection cycle and several supplementary data collection cycles that extend the random access time slotted time interval according to the present invention.

Referring now to FIG. 19, there is seen a second exemplary data collection cycle 1900 according to the present invention, data collection cycle 1900 being indefinitely repetitive. Data collection cycle 1900 is divided into a main data collection cycle 1910, supplementary data collection cycle 1920 and one or more additional supplementary data collection cycles 1930. The main collection cycle 1910 further divided into a broadcast interval 210c, an assigned time_slotted communications interval 210a, and a random access time_slotted communications interval 210b. The supplementary data collection cycle 1920 is divided into a supplementary broadcast interval 210d and a supplementary random access time-slotted communications interval 210e having supplementary random access time slots 1920a, 1920b, 1920c, ..., 1920n. As is readily evident, data collection cycle 1900 is similar to data collection cycle 200, with the exception of supplementary broadcast interval 210d and supplementary random access time slotted communications interval 210e. During the supplementary broadcast interval 210d, all access points (e.g., access points 1605a, 1605b, . . . , 1605n of FIG. 16) transmit BCDP data packets in much the same way as the transmission of BCDP data packets during the normal broadcast interval 210c. Any network node that did not receive a BCDP data packet transmitted during the normal broadcast interval 210c or any network node that did not receive a CDP data packet intended for the network node (e.g., due to a transient obstacle) may retransmit an NNDP data packet during one of the supplementary random access time slots 1920a, 1920b, 1920c, . . . , 1920n of the supplementary random access time_slotted communications interval 210e. One of the access points 1605a, 1605b, . . . , 1605n may then transmit an additional CDP data packet to the network node. In this manner, the transmitting access point may assign one of the assignable time slots 215a, 215b, 215c, . . . , 215n to the network node without having to wait until the end of the next data collection cycle 1900.

It should be appreciated that not every data collection cycle 200, 1900 need include the supplementary broadcast interval 210d and the supplementary random access time slotted communications interval 210e. These intervals 210d, 210e are only helpful if at least one network node 1610a, 1610b, 1610c, . . . , 1610n lost synchronization. Access points 1605a, 1605b, . . . , 1605n can determine this event by simply comparing the number of network nodes transmitting NNDP data packets in the previous data collection cycle 200, 1900 to the number of network nodes transmitting NNDP data packets in the current data collection cycle 200, 1900. If the number of network nodes transmitting in the present data collection cycle 200, 1900 is less than the number of network nodes transmitting in the previous data collection cycle 200, 100a, access points 1605a, 1605b, . . . , 1605n may broadcast a supplementary BCDP data packet during the supplementary broadcast interval 210d, in a manner more fully described above. It should also be appreciated that after the current supplementary data collection cycle is completed, additional supplementary BCDP data packet(s) may be transmitted to create additional supplementary data collection cycles in order to collect more NNDP data packets from network nodes 1610a, 1610b, 1610c, . . . , 1610n which did not yet transmit during the current data collection cycle 1900.

Figure 20:
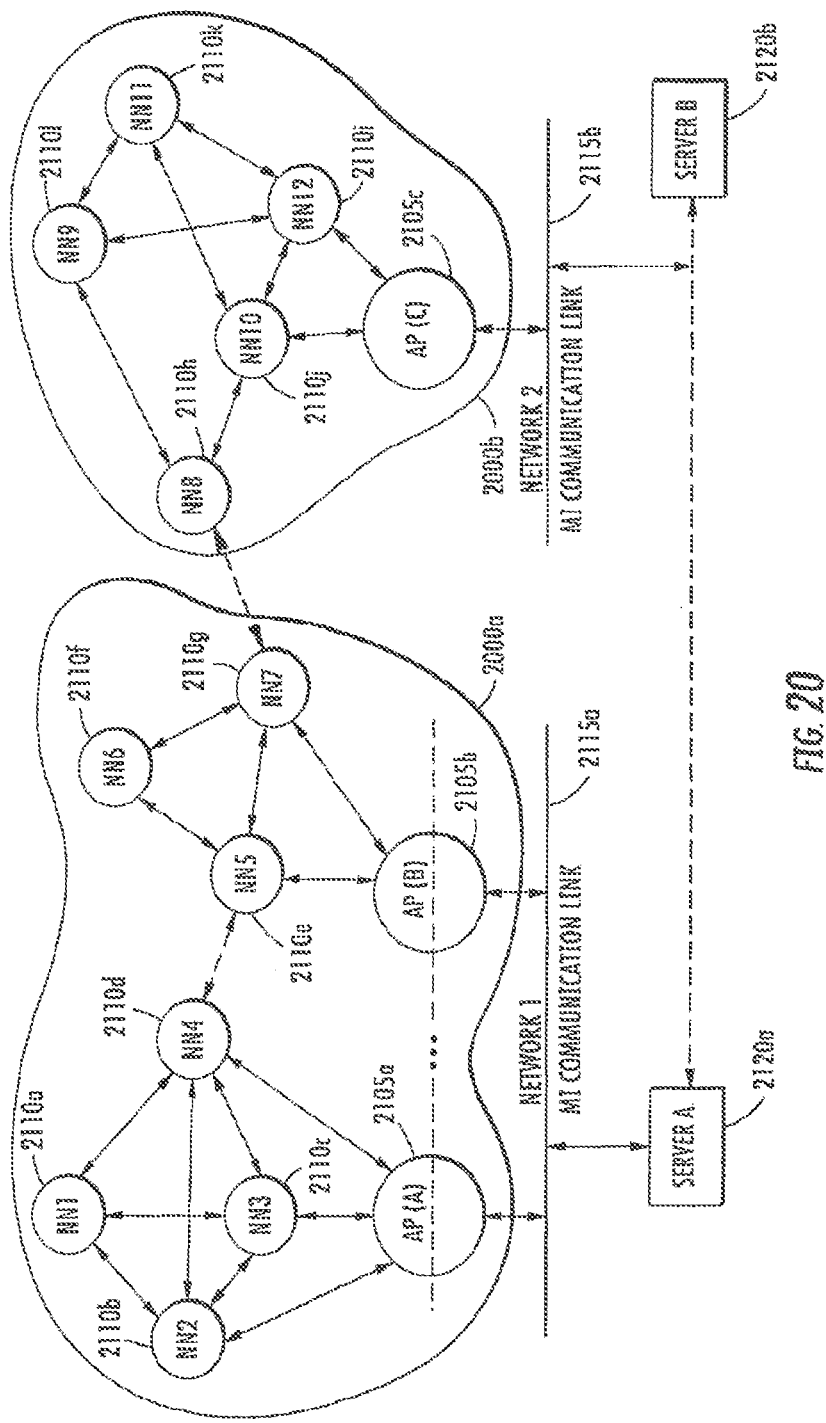
FIG. 20 shows multiple exemplary timely organized ad hoc networks including network nodes having soft dependencies.

Referring now to FIG. 20, there is seen multiple exemplary timely organized ad hoc networks including network nodes having soft dependencies. The exemplary embodiment of FIG. 20 includes two timely organized ad hoc networks 2100a, 2100b.

Network 2100a is a multiple access point network similar to the one illustrated in FIG. 16. Network 2100a includes two access points (A & B) 2105a, 2105b and a server 2120a coupled to one another over media-independent communication link 2115a (hereinafter "MI Link 2115a"). These devices 2105a, 2105b, 2120a communicate with network nodes 2110a, 2110b, 2110c, . . . , 2110g. Network 2100b is a single access point network similar to the one illustrated in FIGS. 14a through 14l. Network 2100b includes one access point 2105c and a server 2120b coupled to one another over media-independent communication link 2115b (hereinafter "MI Link 2115b"). These devices 2105a, 2105b, 2120 communicate with network nodes 2110h, 2110i, 2110j, . . . , 2110l. It should be appreciated, however, that there may exist any number of networks, each of which may include any number of access points, servers, and network nodes. It should also be appreciated that, although networks 2100a, 2100b include separate respective servers 2120a, 2120b at separate locations, servers 2120a, 2120b may be located in the same generally vicinity and/or networks 2100a, 2100b may be managed by a single server.

As can be seen in FIG. 20, network node 2110g is capable of communicating with both networks 2100a, 2100b. That is, network node 2110g is capable of direct communication with access point (B) 2105b of network 2100a and with network node 2110h of network 2100b. As described more fully above, a network node can determine its hierarchal position within a particular network by processing BCDP or CDP data packets transmitted by an access point and/or by processing NNDP data packets transmitted by neighboring network nodes. If a particular network node is capable of communicating with more than one independent network (e.g., network node 2110g in the example illustrated in FIG. 20), that network node can determine its relative hierarchal level within each network, and then dynamically "soft-affiliate" itself to a particular network based on a predefined set of rules. For example, with respect to the exemplary embodiment of FIG. 20, network node 2110g will "soft affiliate" itself with the network requiring the least number of intermediate transmissions (i.e., hops) during a chain communication (i.e., the network within which network node 2110g will have the lowest hierarchal level). However, it should be appreciated that network node 2110g may affiliate itself to a particular network based on other rules, for example, to a particular network requiring the least amount of power to transmit, or to a particular network having at least one desired "type" of network node. Regarding the exemplary embodiment of FIG. 20, network node 2110g is at a hierarchal level of "2" with respect to access point 2105b of network 2100a and at a hierarchal level of "4" with respect to access point 2105c of network 2100b. Thus, as shown in FIG. 20, network node 2110g "affiliates" itself with network 2100a. Of course, upon power-up, a network node (e.g., network node 2110g) does not know its relative hierarchal level with respect to either network 2100a, 2100b. Thus, upon power-up, network nodes may initially affiliate themselves based on other rules (e.g., a network node can affiliate itself with the network from which it receives the first BCDP data packet).

Once affiliated to a network, a particular network node (e.g., network node 2110g in the exemplary embodiment of FIG. 20), that network node will retransmit BCDP data packets only from the affiliated network. That is, network nodes retransmit only those BCDP data packets transmitted from the affiliated network. With respect to the exemplary embodiment of FIG. 20, for example, network node 2110g will retransmit only those BCDP data packets transmitted from affiliated network 2100b. Alternatively, the affiliated network node may monitor data packets from neighboring networks to check if its hierarchal level within a non-affiliated network has changed to a level that is below the hierarchal level in the affiliated network. For example, if a particular network node has a hierarchal level of "3" in a first network and a hierarchal level of "4" in a second network, this network node will affiliate itself with the first network. However, if changing environmental conditions (e.g., interference, jamming, multipath, fadings, moving objects, etc.) cause the network node to have a lower hierarchal level within the second network for certain period of time, the network node can change its affiliation and begin communicating within the second network. By monitoring data packets from both the first and second networks, the network node can dynamically change its affiliation to an access point of a network having better characteristics for chain transmission. The ability to change affiliations from one access point of one network to another access point from another network is referred to herein as "Soft-Dependencies."

According to another exemplary embodiment of the present invention, network nodes are "hard affiliated" (i.e., hard-dependency) with a particular network. Hard dependencies may be required, for example, if two independent wireless networks are located close together, and "cross-communication" between the networks is not desired. For example, if two different owners of two different (but adjacent) apartment complexes employ an ad hoc network according to the present invention, it would not be desirable for one of the owners to be capable of receiving data transmitted by the network of the other owner, and vice versa.

If a particular network node if "hard affiliated" to a particular network, that network node will communicate only within the affiliated network, regardless of whether the network node can receive data packets from a different network, and regardless of whether the hierarchal level of the network node would be lower in a non-affiliated network. With respect to one exemplary embodiment of the present invention, "hard-affiliation" is effectuated by assigning a network identifier to each network node. The identifier uniquely identifies the network within which it must communicate. The identifier may comprise, for example, information identifying a particular access point or groups of access points within a particular network or "authorized" group of networks.

With respect to another exemplary embodiment according to the present invention, extended functionality is achieved by implementing different types of BCDP data packets in addition to the "standard" BCDP data packet structure discussed above. In this manner, different types of communication modes may be initiated (and identified) by the transmission of the respective types of BCDP data packets. For this purpose, each BCDP data packet may include information (data bits) permitting the network nodes in the network to determine the type of BCDP data packet and, hence, the type of communications mode data initiated by the BCDP data packet. This information may be embedded, for example, into at least a portion of the RESERVED space identified in FIG. 7. For example, the first nibble of Byte 8 (RESERVED) of the BCDP data packet may be used to identify the "type" of BCDP data packet, with a "0000" identifying a first type of BCDP data packet, a "0001" identifying a second type of BCDP data packet, and so on. As can be readily appreciated by those in the art, the bit space of the RESERVED nibble of Byte 8 (i.e., four bits) will allow up to 16 different types of BCDP data packets. However, it should be appreciated that any amount of bit space may be utilized to accommodate any desired number of BCDP data packet types. For example, the RESERVED nibble of Byte 7 may be additionally used to expand the number of BCDP data packet types to 256 BCDP data packet types (i.e., 8 bits).

Regardless of which type of BCDP data packet is transmitted, each BCDP data packet is transmitted by the access point(s) during the broadcast time interval 210c, and each BCDP data packet (regardless of type) is received and retransmitted by the network nodes in a manner, similar to that described above, to ensure that all network nodes of the network receive and decode the BCDP data packet.

Of course, the first type of BCDP data packet is the "standard" BCDP data packet described in detail above, and it is this standard BCDP data packet which initiates (and identifies) the beginning of a "standard" communications mode and begins a "standard" data collection cycle 200, 1900. A second "type" of BCDP data packet (called a Device Oriented BCDP data packet) may be used to initiate a special type of communications mode, within which information from only a single "type" of network node is required to be received by an access point. For example, if a timely organized ad hoc network according to the present invention is installed in a large apartment building, each of the network nodes may be operable to monitor one or more parameters in its vicinity using one or more sensors and/or measuring devices. The measured parameters may include, for example, the temperature of a room, lighting conditions of a room, energy usage, smoke and CO detector data, elevator(s) conditions, door activation data, HVAC system parameters, pressure data, vibration data, etc. If, at a particular point in time, the access point required information only from those network nodes capable of monitoring temperature (i.e., a type of network-node capable of measuring temperature), it would be wasteful to initiate a standard communications mode containing a standard data collection cycle 200, 1900, in which all network nodes transmit NNDP data packets to the access point, including those that are not of the type capable of monitoring temperature. Thus, to prevent such wasteful utilization of time and resources, the server or access point(s) may transmit a Device Oriented BCDP data packet to all of the network nodes in the timely-organized ad hoc network, so that only those network nodes of the desired type will respond. This may allow for a shorter data collection cycle if less than the entire number of network nodes in the network are of the type identified by the Device Oriented Node BCDP data packet.

In certain situations, it may be desirable to understand the efficiency of a particular timely-organized ad hoc network. That is, it may be desirable to understand, for example, how many network nodes are capable of communicating directly with the access point(s) without requiring a chain transmission. For this purpose, another type of BCDP data packet, called a Local BCDP data packet, may be employed. Transmission of the Local BCDP data packet will initiate a special type of communications mode (i.e., a local vicinity mode), in which only those network nodes that are capable of communicating directly with the access point(s) (i.e., network nodes having a hierarchal level of "2") transmit NNDP data packets during the assigned or random access time-slotted communications interval 210a, 210b.

In certain situations, it may be desirable to send the same command to every network node. For example, at the start of winter, it may be desirable to raise the thermostat setting of every apartment in a large apartment complex. If a timely-organized ad hoc network according to the present invention is employed in the complex, and the network nodes arranged in the respective apartments are capable of controlling the thermostats, it would be desirable to change the thermostat settings of all apartments to the same level.

If the server and/or access point(s) were to initiate a standard communications mode and standard data collection cycle using a standard BCDP data packet, the thermostat adjustment commands would be communicated to the network nodes using numerous respective CDP data packets, in a manner more fully described above—one CDP data packet for each network node in the ad hoc network. However, by transmitting a Global Command BCDP data packet, the server and/or access point(s) may send the same command to all network nodes using a single packet during a Global Command Communication mode. The Global Command BCDP data packet contains embedded information (data bits) instructing all network nodes to perform the same command, for example, to set all the thermostats of all apartments to the same level.

Since the data collection cycle initiated by the Global Command BCDP data packet is intended only to communicate commands to the network nodes, NNDP data packet transmission from network nodes to access point(s) is not required and, as such, may be dispensed with. However, it should be appreciated that a data collection cycle could be initiated by a Global Command BCDP data packet also. In this case the network nodes will transmit NNDP data packets during either or both of the assigned or random access time-slotted communication intervals 210a, 210b.

Another type of BCDP data packet is the Direct Command BCDP data packet. This packet initiates a communications mode (i.e., the Direct Command communication mode), in which only a single network node, identified by the BCDP data packet, communicates NNDP data packets during either or both of the assigned or random access time-slotted communication intervals 210a, 210b. The remaining network nodes not identified by the Direct Command BCDP data packet will remain dormant until the next BCDP data packet is transmitted.

It should be appreciated that each type of BCDP data packet could also be initiated by any device connected to the media-independent communication link, by one of the plurality of network nodes, or by one of the plurality of device radios.

In accordance with another example embodiment of the present invention, it may be desirable for one or more of the network nodes to communicate important and/or time sensitive information in an "alarm situation"—i.e., a situation of particular importance that may require immediate attention. When a network node or a device radio detects an alarm situation, for example, if the network node detects fire or smoke, a special communications mode (i.e., an Alarm Broadcast communication mode) may be initiated by the network node itself by transmitting a Alarm BCDP data packet. The Alarm BCDP data packet is received and retransmitted by all network nodes in much the same manner as with regular BCDP data packets, in a manner more fully described above. It is believed that the Alarm Broadcast communications mode is a fast and reliable way for a network node or device radio to transmit information relating to the alarm conditions to the access point(s) and/or server. In another example embodiment, an alarm condition "wakes up" the device radio from sleep or idle mode and the device radio generates the Alarm Broadcast BCDP data packet containing the alarm information. The Alarm broadcast could be addressed to certain Access Points from the network if the alarm information is important only for the selected access points only.

Figure 21:
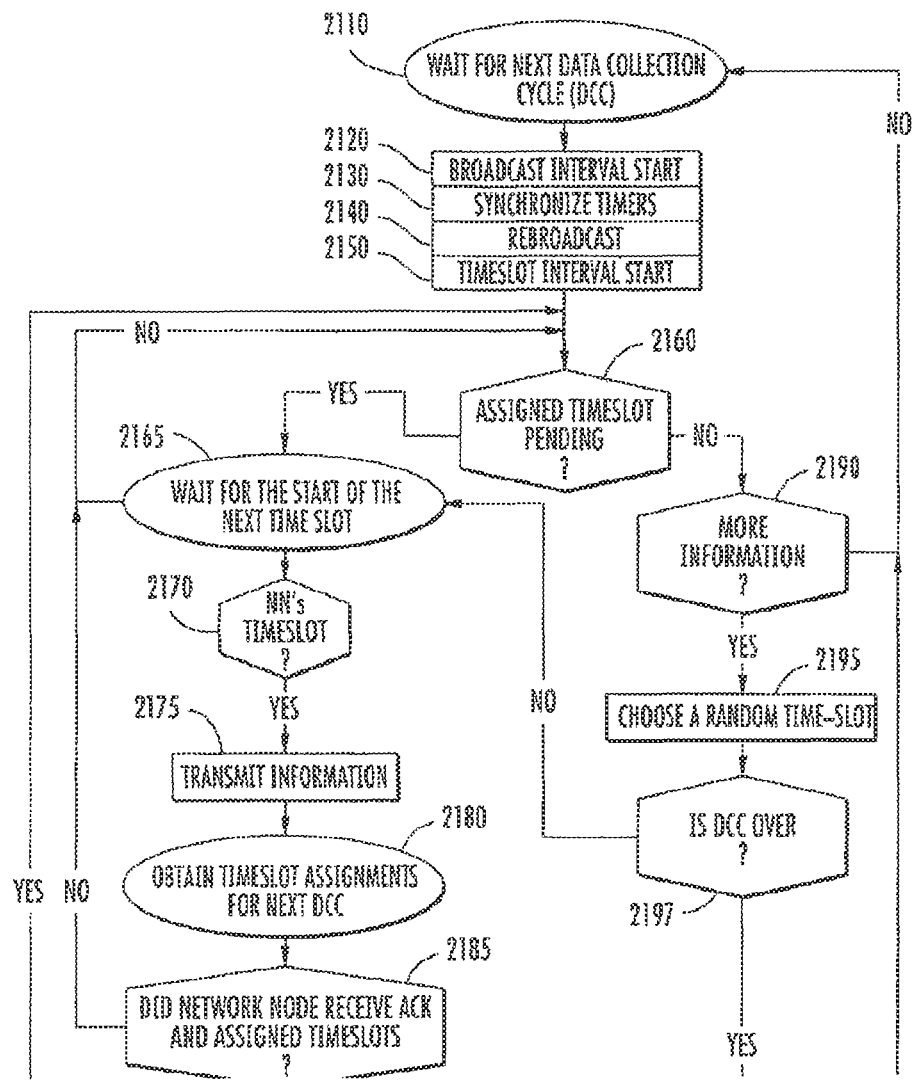
FIG. 21 shows an operational flow for data communication during a data collection cycle where one or more nodes can be assigned more than one time slot according to the present invention.

In an alternative preferred embodiment, one or more network nodes can be assigned more than one time slot. FIG. 21 illustrates an operational flow diagram for data communication during an exemplary data collection cycle where one or more nodes can be assigned more than one time slot according to the present invention.

FIG. 21 illustrates a repeating data cycle. Entering the cycle at step 2110, the network waits for the next data collection cycle. In step 2120, a new data collection cycle starts and a broadcast interval starts. The access points transmit the broadcast communications data packet data packet during the broadcast interval. The BCDP data packet are then received by network nodes. Each of network nodes processes the BCDP data packet to determine the specific access point that originally sent the packet, since a section of a BCDP identifies a transmitting access point.

Timers are synchronized in step 2130 so that the server, the access points and the network nodes are aware of the temporal position within the cycle. In step 2140, the network nodes rebroadcast. During rebroadcast, the network nodes transmits a copy of the NNDP data packet to the access points. This "retransmission" is received by network nodes, thereby permitting the network nodes to acknowledge that the NNDP data packet transmitted from network node was actually received by network node. That is, the retransmitted NNDP data packet is also an "acknowledgment" NNDP data packet.

The time-slotted communications interval begins in step 2150.

In step 2160, if the network node does not have a pending assigned time slot, then the cycle skips to step 2190. If there is a pending assigned time slot, the cycle continues to step 2165. In step 2165, the network nodes wait for the next time slot to begin.

In step 2170, the network node checks whether the current time slot belongs to it. Either the current time slot is assigned to the network node, or the node has chosen the time slot during the random access interval, as explained further below. If the time slot does not belong to the network node, the method continues with step 2160.

In step 2175, if the timeslot belongs to the network node, the network node transmits its node information message in one or more data packets during the time slot. In step 2180, the node obtains one or more assigned time slots for the next data collection cycle. In step 2185, the network node checks that its transmissions were acknowledged and that it obtained assigned time slots for the next data collection cycle. If any transmissions were not acknowledged or time slots in the next cycle were not assigned, processing continues at step 2160.

Turning to step 2190, a network node determines whether it has more information to transmit. If not, processing passes to the next cycle at step 2110. If so, in step 2195 the node chooses a time slot in the random access interval. Then in step 2197, the node checks whether the current data collection cycle has expired. If not, control passes to step 2165 where the node waits in steps 2160-2170 until the chosen random access time slot occurs so that the node can transmit information in step 2175. Additional supplementary data collection cycles can occur after the main data collection cycle has ended. Each supplementary data collection cycle comprises additional random access time slots that the network node can choose from.

Figure 22:
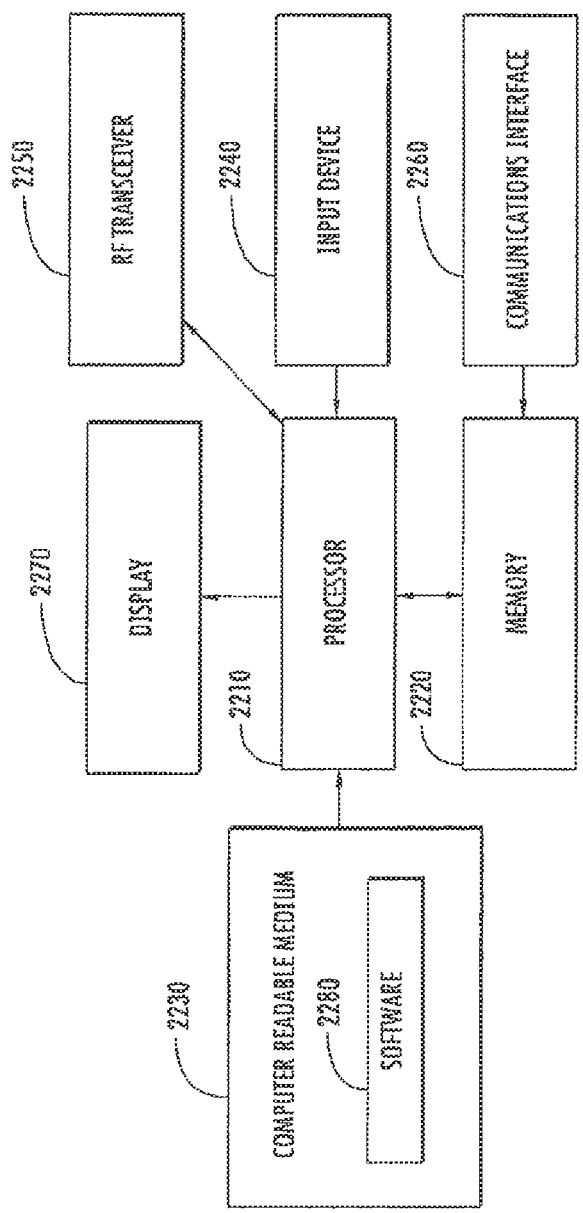
FIG. 22 is a block diagram illustrating basic hardware components of a computer system that presents a topographical display generator for an ad hoc network.

FIG. 22 illustrates a block diagram for a topographical display generator for an ad hoc network, also known in a preferred embodiment as the 3-D Radio Links Visualization Application. As shown in FIG. 22, the apparatus comprises a processor 2210, a memory 2220, a computer-readable medium 2230, an input device coupled to the processor 2240, a radio frequency transceiver coupled to the processor 2250; a communications interface coupled to the memory 2260, a display coupled to the processor, and software 2280. When software 2280 is copied from computer-readable medium 2230 into memory 2220 by processor 2210 and executed, it causes processor 2210 to obtain a diagram of a network location from input device 2240 or computer readable medium 2230. Next, processor 2210 will obtain the identities of the devices comprising the network from input device 2240 or computer readable medium 2230 and will determine communication links between network devices, and graphically represent on display 2270 the devices and the connection links in a topological diagram.

Figure 23A:
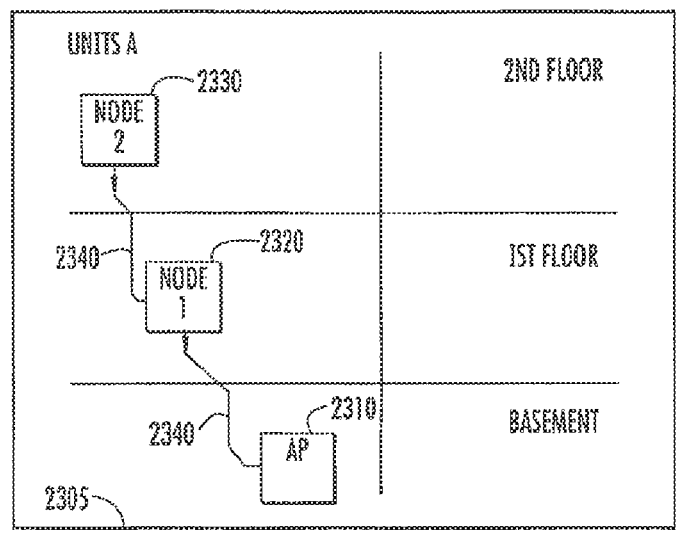
FIGS. 23A and 23B are diagrams illustrating a display generated by the computer system and a floor plan used to generate the display in a preferred embodiment.

FIG. 23A is a diagram illustrating a display generated by the computer system in a preferred embodiment. In more particular detail of the operation of a preferred embodiment, the application creates a graphical representation of a Intech21 radio frequency ad hoc network. In a graphical user interface window 2305 on display 2270, the application displays symbols for access points 2310 and nodes 2320, 2330 of the network, and then generates arrowed poly lines representing communication links 2340 between first nodes 2320 and second nodes 2330 or first nodes 2320 and access points 2310.

Figure 23B:
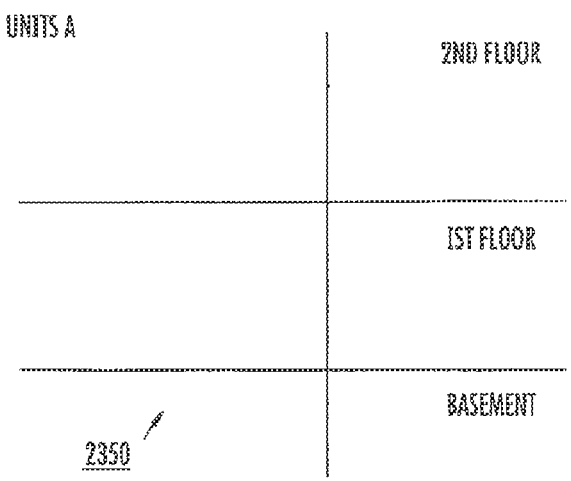

The application allows the user to create a diagram 2350, or import a diagram from an external file, representing the location of the network, e.g., the floor plan of a building. FIG. 23B illustrates an exemplary floor plan. The application also allows the user to input information, or import information from a database, regarding the nodes and access points of the network. The application will then create a symbol corresponding to each of the access points and nodes in the network. The user may then drag and drop each node symbol and access point symbol to its proper location on the diagram.

Using a radio frequency device such as a sniffer, such as that disclosed in copending International PCT Application No. US/2008/06236,entitled "Packet Sniffer for Ad Hoc Network" filed on even date herewith, incorporated by reference herein, the application will obtain data regarding each communication link in the network and store it in an appropriate data structure such as an array. For each communication link between a first node and a second node or access point, the application will draw an arrowed poly line 2340 in the user interface originating at a first node symbol and ending at a second node symbol or access point symbol.

In a preferred embodiment, each arrowed poly line consists of five line segments. As illustrated in FIG. 23A, a first arrowed poly line comprises a first line segment of a predefined length drawn downward from the bottom of the first node symbol, and a second line segment of a predefined length is drawn leftward from the left side of the second node symbol or access point symbol. An undisplayed reference rectangle is created with corners located at the end point of the first line segment (x1, y1), the end point of the second line segment (x2,y2), and the points x1, y2 and x2, y1. A reference line is created between the midpoints of the shorter sides of the rectangle. A third line segment is drawn from the end point of the first line segment (x1, y1) to a point on the reference line such that the third line segment is oriented at a 45-degree angle from the adjoining sides of the reference rectangle. A fourth line segment is drawn from the end point of the second line segment (x2, y2) to a point on the reference line such that the fourth line segment is oriented at a 45-degree angle from the adjoining sides of the reference rectangle. A fifth line segment is drawn from the end point of the third line segment to the endpoint of the fourth line segment along the reference line. An arrow is drawn on the first line segment pointing downward.

In an alternative embodiment, additional line segments may be used to smooth the arrowed poly line or avoid drawing the arrowed poly line over a node or access point symbol.

The communication links displayed in the interface are updated as data is received from the sniffer. The application may keep a history of communication link data for troubleshooting purposes and save it to a file, known as a load file.

A node symbol may display, through graphics, colors, or otherwise, data pertaining to the node, including the signal strength emanating from the node as received by the node to which it is linked; the ID number of the node; the hierarchal level of the node; whether the node is linked properly with the network; and how often the node's transmission is lost. When the user clicks on the node, its communication link to the access point may be highlighted.

The application also allows the user to generate a tree diagram representing the communication links in the network from data obtained from the sniffer or from the load file. The first level of the tree displays the access points, the second level of the tree displays the nodes connected to the access points, and each higher level displays those nodes which are connected to the nodes in the previous level. When the user clicks on a node, all of the nodes on its communication link to the access point may be highlighted.

The user may select only a portion of the load file to be displayed in the tree diagram. Having thus described at least illustrative embodiments of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

What is claimed is:

1. A computer system configured to display a dynamic self-routing topology of an ad hoc network, the computer system comprising:
    a computer having a memory and a processor;
    a radio transceiver configured to receive data from a plurality of devices in the ad hoc network;
    a display unit coupled to said processor; and
    a computer-readable medium configured to store software code, which, when said code is loaded into the memory and executed by said processor, causes said processor to:
        obtain said data from the radio transceiver,
        determine each communication link between the plurality of devices in the ad hoc network, and
        graphically display the dynamic self-routing topology of the ad hoc network on the display unit displaying unit information relating to the following characteristics of a device:
            a) signal strength;
            b) a hierarchal level within the ad hoc network;
            c) whether the access point or node is properly connected to the ad hoc network; and
            d) a frequency indicating how often a data transmission by the access point or node is lost;
    wherein said code further causes said processor to display the dynamic self-routing topology as a plurality of arrowed poly lines representing communication routing links between devices on the display unit; and
    wherein said plurality of arrowed poly lines are updated as data reflecting changes in the routing topology are received from devices in the ad hoc network.

2. The computer system according to claim 1, wherein said code further causes said processor to determine whether a device in the plurality of devices is an access point or a node.

3. The computer system according to claim 2, wherein said code further causes said processor to display symbols on the display unit that represent access points and nodes in the ad hoc network.

4. The computer system according to claim 3, wherein said code further causes said processor to display a first level in the ad hoc network, wherein said first level comprises one or more symbols that represent access points.

5. The computer system according to claim 4, wherein said code further causes said processor to display a second level in the ad hoc network, wherein said second level comprises one or more symbols that represent nodes connected to the access points in the first level.

6. The computer system according to claim 5, wherein said code further causes said processor to display the dynamic self-routing topology having a plurality of subsequent levels in the ad hoc network, wherein each subsequent level consists of one or more symbols that represent nodes and are connected to the one or more nodes in a previous level.

7. The computer system according to claim 6, wherein said code further causes said processor to display each of the plurality of lines such that each line originates at a symbol that represents a first node and ends at a symbol that represents a second node or an access point.

8. The computer system according to claim 7, wherein said code further causes said processor to predict and display the location of a node based on the known location of other nodes in the ad hoc network.

9. The computer system according to claim 1, wherein said code further causes said processor to monitor data passing over the ad hoc network between devices.

10. The computer system according to claim 1, wherein said code further causes said processor to store in said memory a history of data relating to the communication links.

\* \* \* \* \*